United States Patent
Kim et al.

(10) Patent No.: US 12,127,193 B2
(45) Date of Patent: Oct. 22, 2024

(54) METHOD FOR MONITORING SEARCH SPACE BY MEANS OF PRECONFIGURED UPLINK RESOURCE IN WIRELESS COMMUNICATION SYSTEM AND DEVICE THEREFOR

(71) Applicant: LG ELECTRONICS INC., Seoul (KR)

(72) Inventors: Jaehyung Kim, Seoul (KR); Changhwan Park, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 17/608,714

(22) PCT Filed: May 4, 2020

(86) PCT No.: PCT/KR2020/005892
§ 371 (c)(1),
(2) Date: Nov. 3, 2021

(87) PCT Pub. No.: WO2020/226394
PCT Pub. Date: Nov. 12, 2020

(65) Prior Publication Data
US 2022/0232600 A1     Jul. 21, 2022

(30) Foreign Application Priority Data

May 3, 2019 (KR) .................. 10-2019-0052625
Oct. 4, 2019 (KR) .................. 10-2019-0123429

(51) Int. Cl.
*H04W 72/20* (2023.01)
*H04L 1/1812* (2023.01)
(Continued)

(52) U.S. Cl.
CPC ....... *H04W 72/1273* (2013.01); *H04L 1/1812* (2013.01); *H04W 24/08* (2013.01);
(Continued)

(58) Field of Classification Search
CPC . H04W 72/23; H04W 76/27; H04W 56/0045; H04W 72/046; H04W 72/1268;
(Continued)

(56) References Cited

U.S. PATENT DOCUMENTS

2021/0203449 A1* 7/2021 Chatterjee ............... H04L 1/188
2021/0314925 A1* 10/2021 Shin ...................... H04L 5/0053
(Continued)

FOREIGN PATENT DOCUMENTS

CN     101502162     8/2009
EP      3920634     12/2021
(Continued)

OTHER PUBLICATIONS

Extended European Search Report in European Appln. No. 20802372.1, dated May 20, 2022, 11 pages.
(Continued)

*Primary Examiner* — Joseph Arevalo
(74) *Attorney, Agent, or Firm* — Fish & Richardson P.C.

(57) ABSTRACT

The present disclosure relates to a method for monitoring a search space (SS) through a preconfigured uplink resource (PUR) in a wireless communication system, and an apparatus therefor comprising: receiving PUR configuration information related to a repetition number of uplink signal transmission based on the PUR, in a radio resource control (RRC) connected state; transitioning from the RRC connected state to a specific state for a PUR operation; transmitting an uplink signal on a first resource of the PUR based on the repetition number; monitoring a PUR SS after a specific time offset from a transmission timing of the uplink (Continued)

signal; receiving, from the base station, an early acknowledgment (early ACK) for the uplink signal; and stopping, based on a reception of the early ACK, transmission of the uplink signal before a number of transmissions of the uplink signal reaches the repetition number.

13 Claims, 28 Drawing Sheets

(51) Int. Cl.
  *H04W 24/08* (2009.01)
  *H04W 72/1273* (2023.01)
  *H04W 72/23* (2023.01)
  *H04W 72/50* (2023.01)

(52) U.S. Cl.
  CPC ........... *H04W 72/20* (2023.01); *H04W 72/23* (2023.01); *H04W 72/535* (2023.01)

(58) Field of Classification Search
  CPC ..... H04W 72/21; H04W 24/08; H04W 24/10; H04W 72/0446; H04W 72/1273; H04W 72/20; H04W 72/231; H04W 72/51; H04W 72/53; H04W 72/535; H04W 76/30
  USPC ........ 370/329, 311, 252, 328, 316, 242, 330
  See application file for complete search history.

(56) References Cited

U.S. PATENT DOCUMENTS

2021/0352690 A1* 11/2021 Shin ...................... H04L 5/0053
2021/0410166 A1* 12/2021 Shrestha ........... H04W 72/1268
2022/0046573 A1* 2/2022 Takeda .................. H04W 72/23
2022/0141810 A1* 5/2022 Takeda ................ H04W 74/002
  370/330
2022/0217677 A1* 7/2022 Takeda .................. H04W 72/02

FOREIGN PATENT DOCUMENTS

| WO | WO 2015113227 | 8/2015 | |
| WO | 2018/005615 | 1/2018 | |
| WO | WO 2018203722 | 11/2018 | |
| WO | WO 2020/034571 | * 1/2019 | ............. H04L 29/06 |

OTHER PUBLICATIONS

Office Action in Chinese Appln. No. 202080033340.8, mailed on Jul. 27, 2023, 12 pages (with English translation).
Nokia, Nokia Shanghai Bell, "On Configured Grant Enhancements for NR URLLC," R1-1901306, 3GPP TSG RAN WG1 Ad-Hoc Meeting 1901, Taipei, Taiwan, Jan. 21-25, 2019, 12 pages.
Nokia, Nokia Shanghai Bell, "Transmission in preconfigured UL resources," R1-1904177, 3GPP TSF RAN WG1 Meeting #96bis, Xi'an, China, Apr. 8-12, 2019, 6 pages.
PCT International Search Report for International Application No. PCT/KR2020/005892, mailed Aug. 24, 2020, 5 pages.
Qualcomm Incorporated, "Uplink HARQ-ACK feedback," R1-1804915, 3GPP TSG RAN WG1 Meeting #92bis, Sanya, China, Apr. 16-20, 2018, 7 pages.
ZTE, Sanechips, "Summary of Uplink HARQ-ACK Feedback for MTC," R1-1805311, 3GPP TSG Ran WG1 Meeting #92bis, Sanya, China, Apr. 16, 20, 2018, 9 pages.

* cited by examiner

[FIG.1]
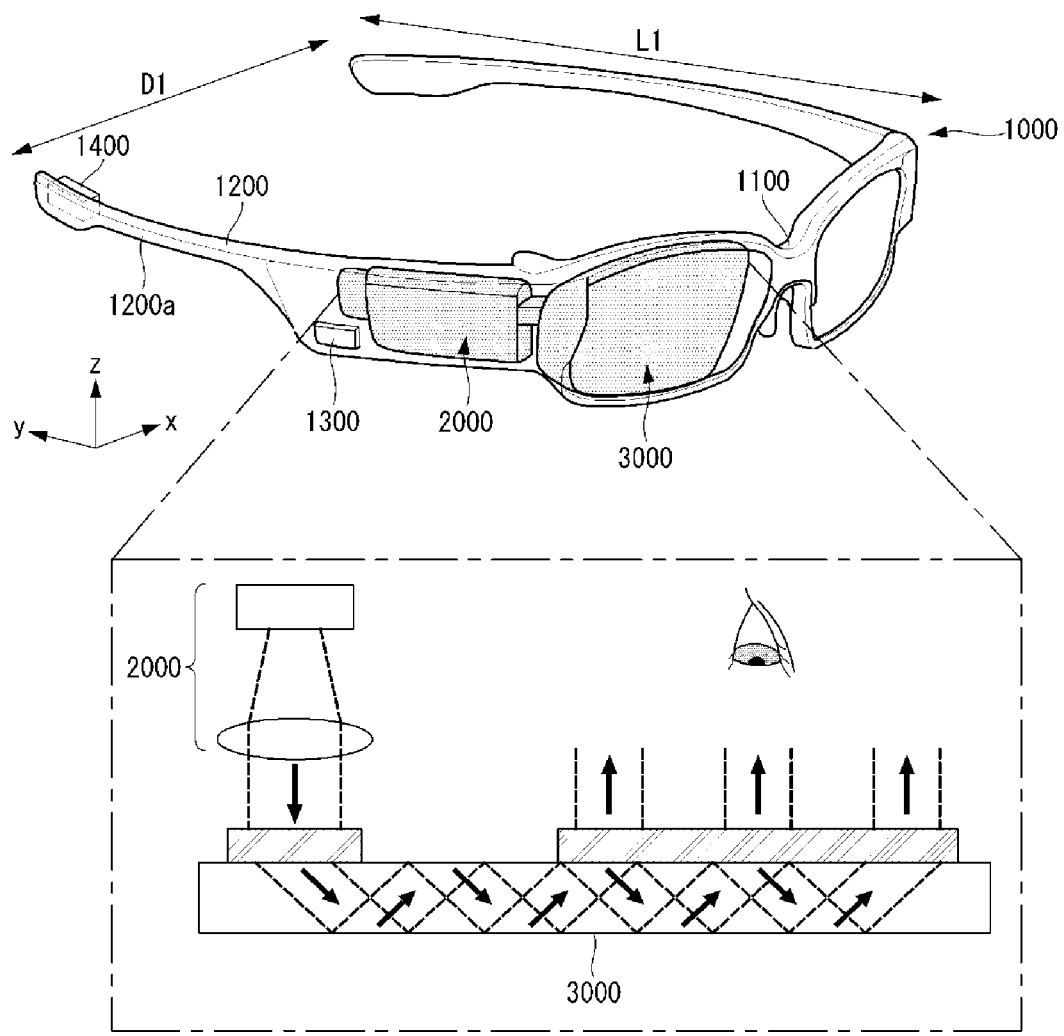

[FIG. 2]
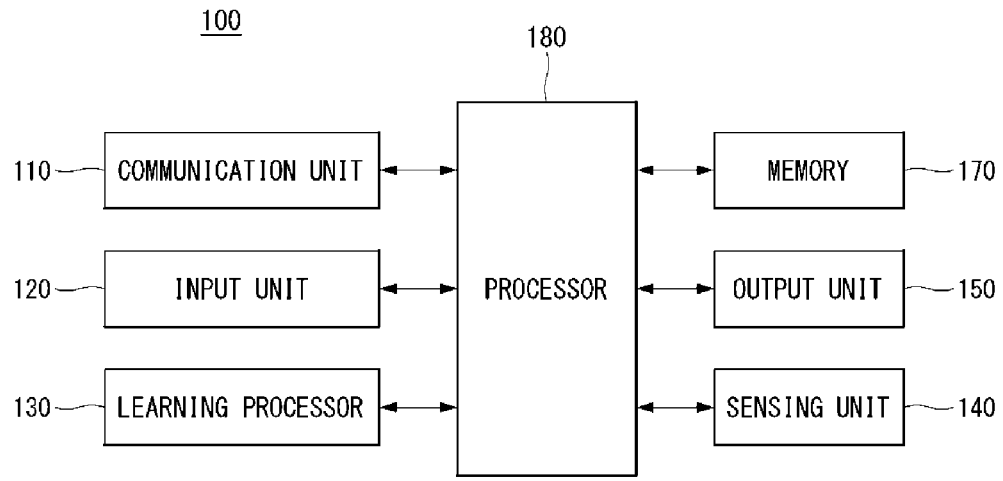
[FIG. 3]
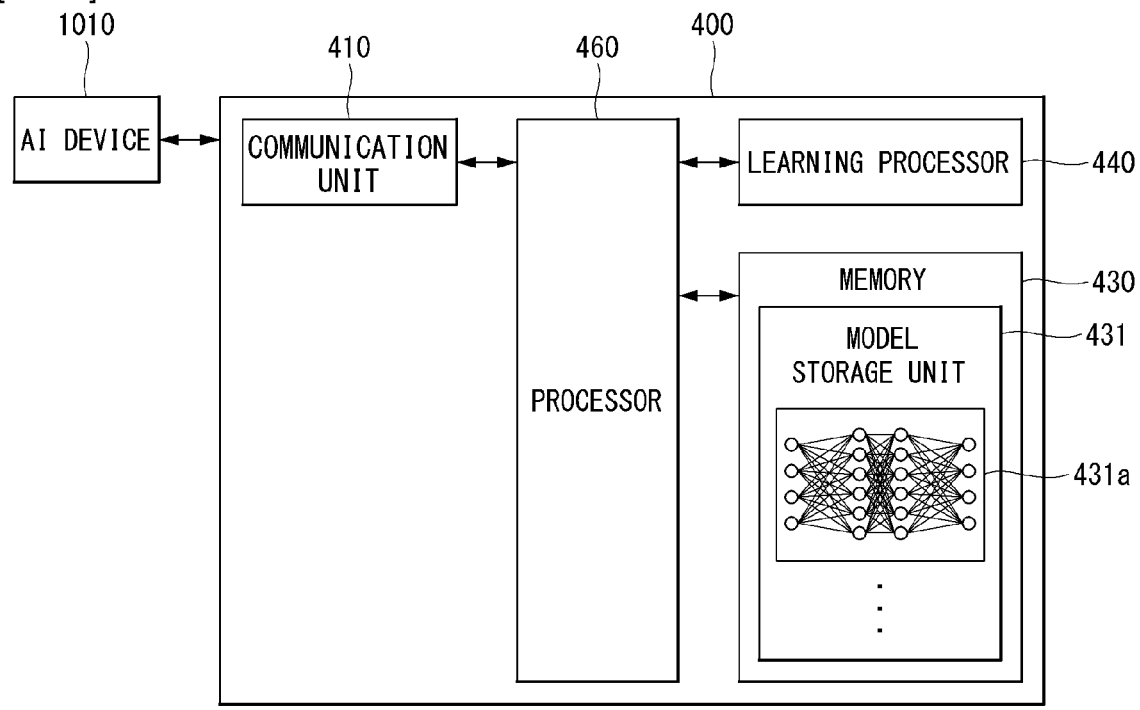

[FIG. 4]
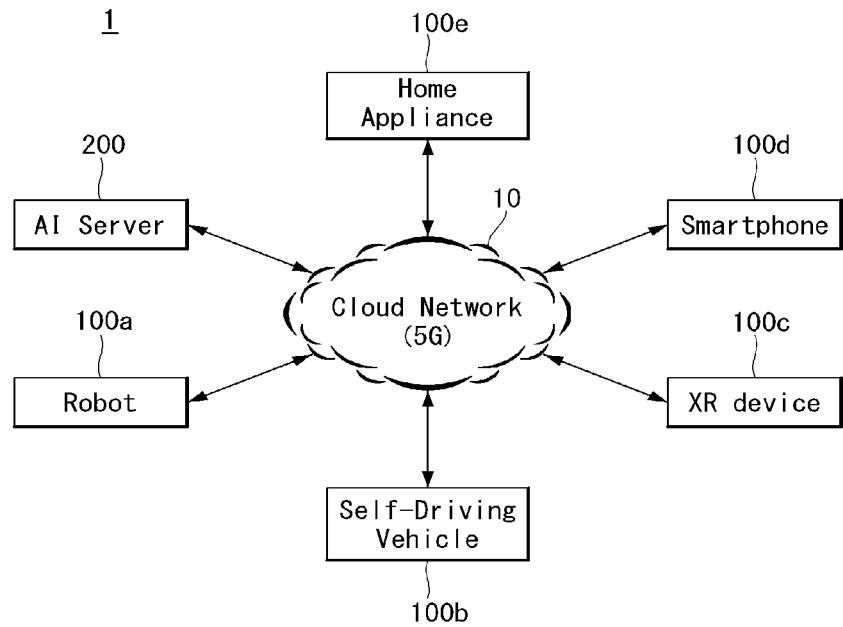
[FIG. 5]
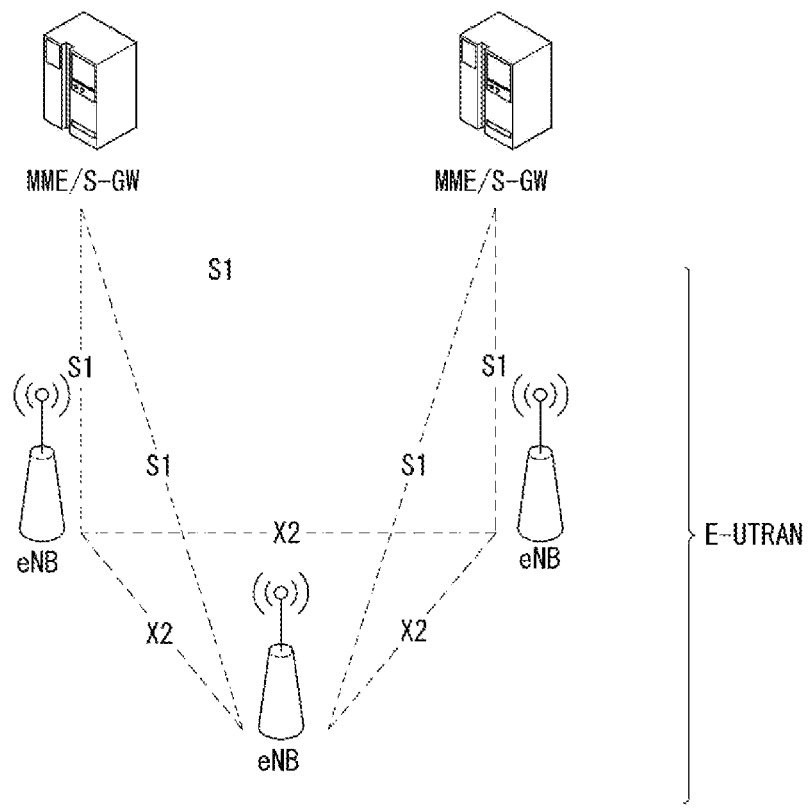

[FIG. 6]
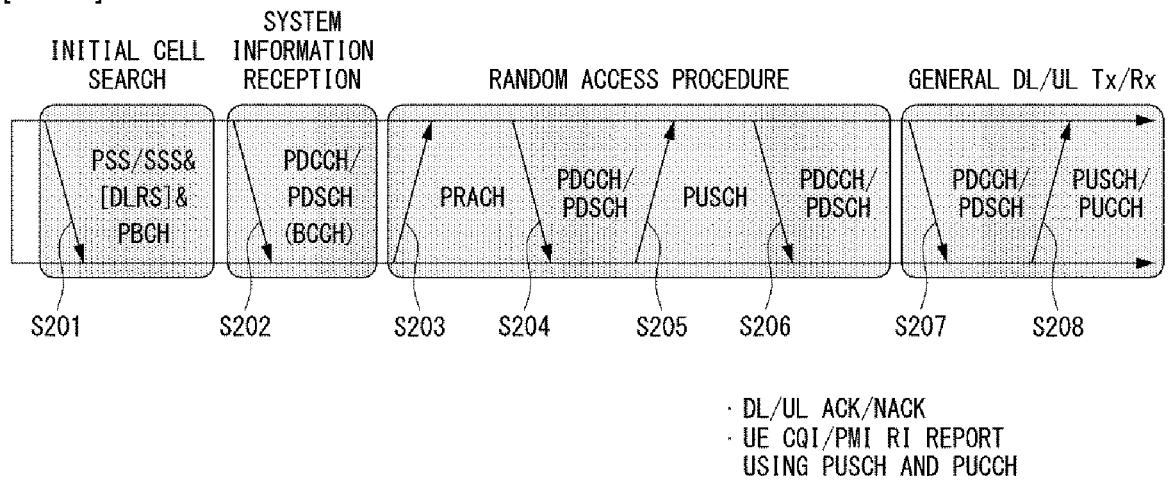
[FIG. 7]
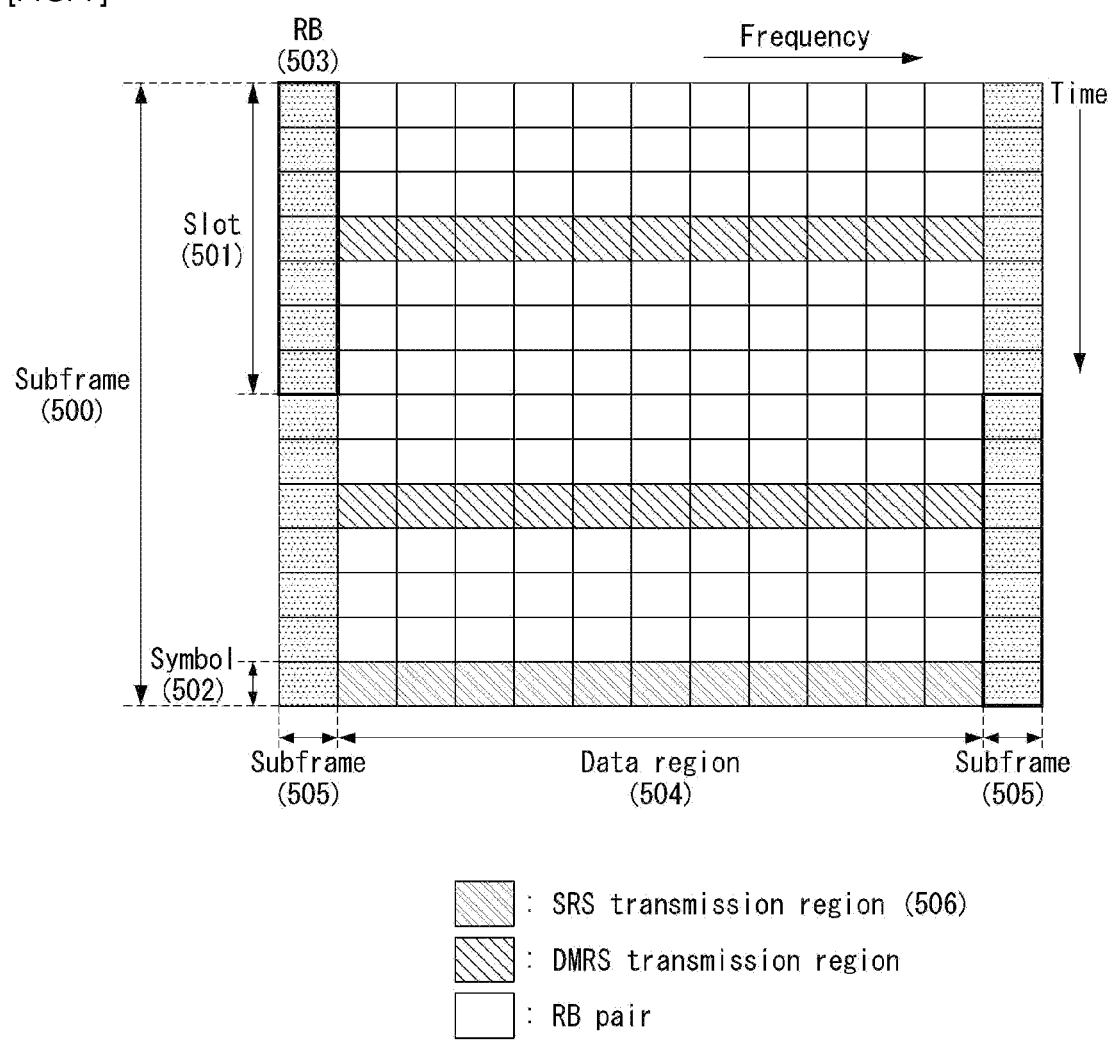

[FIG. 8]
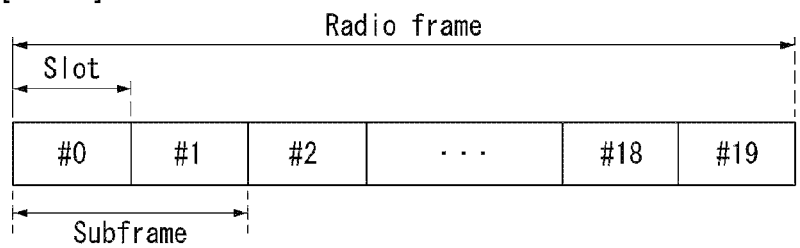
[FIG. 9]
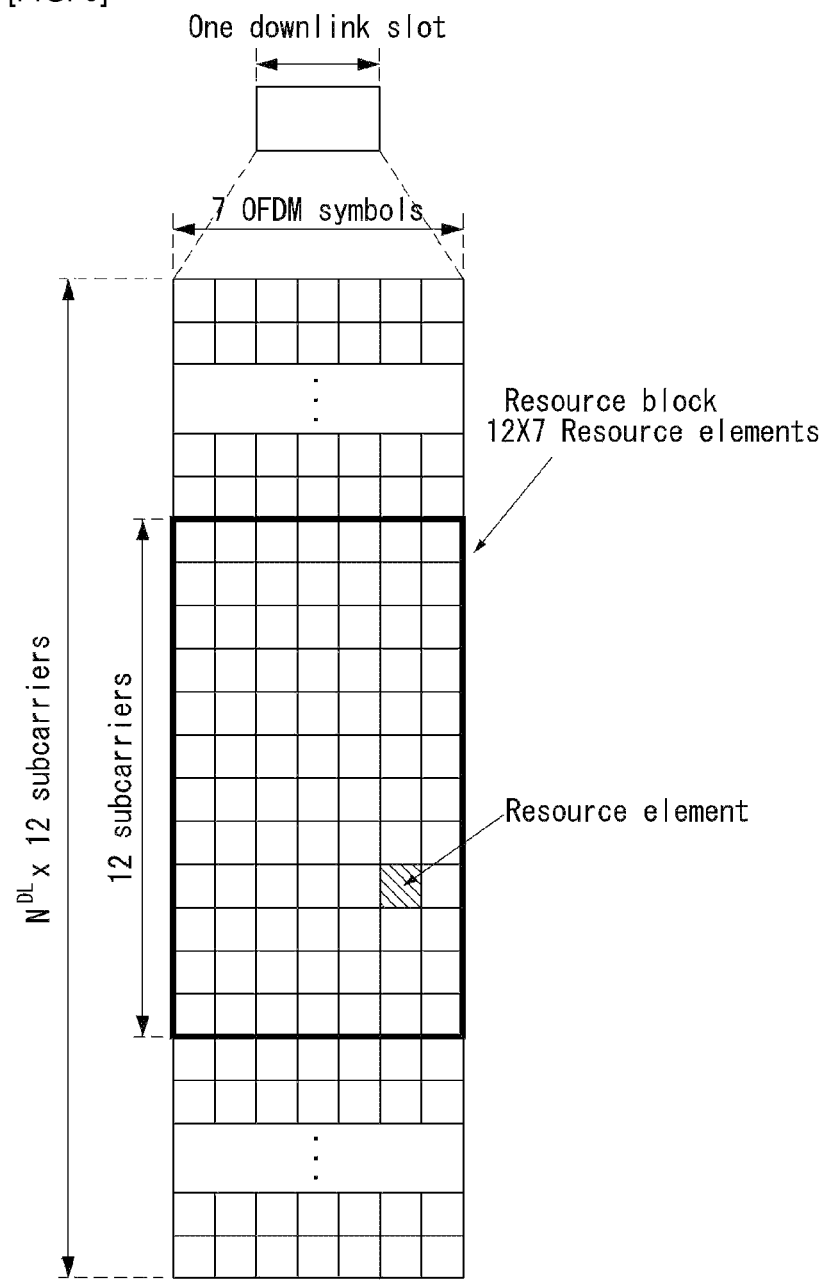

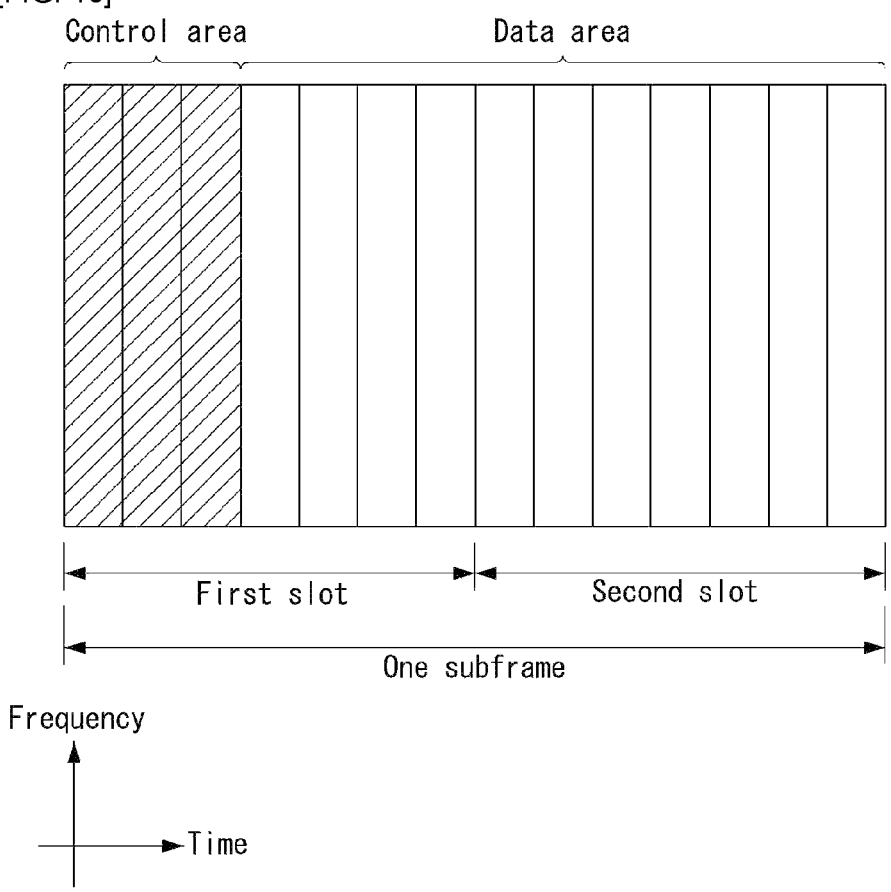

[FIG. 11]
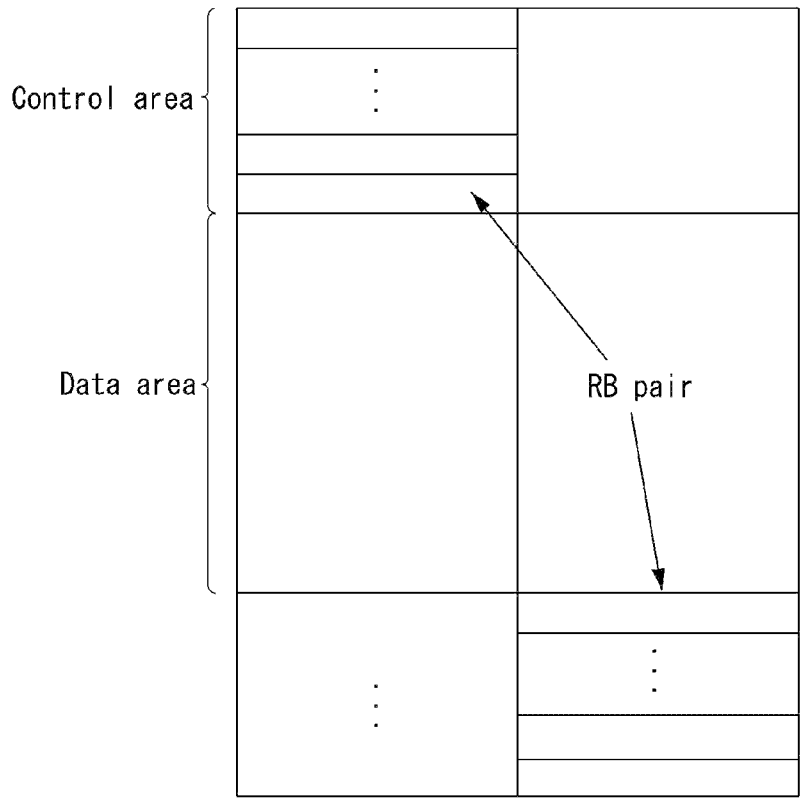
[FIG. 12]
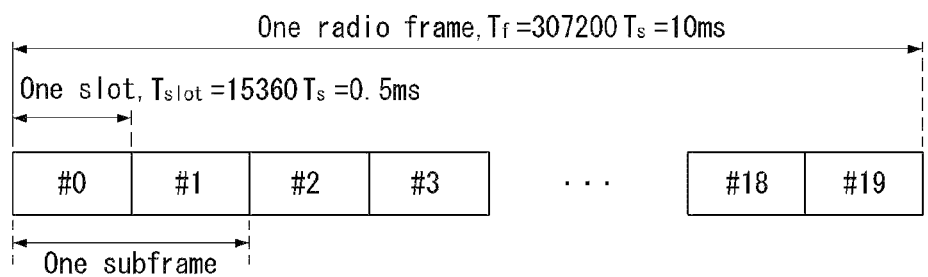

[FIG. 13]
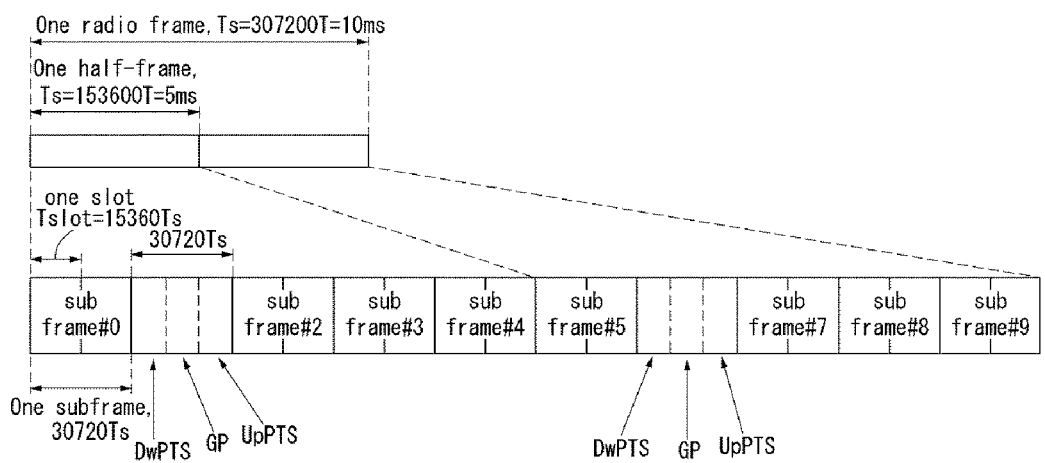

[FIG. 14]
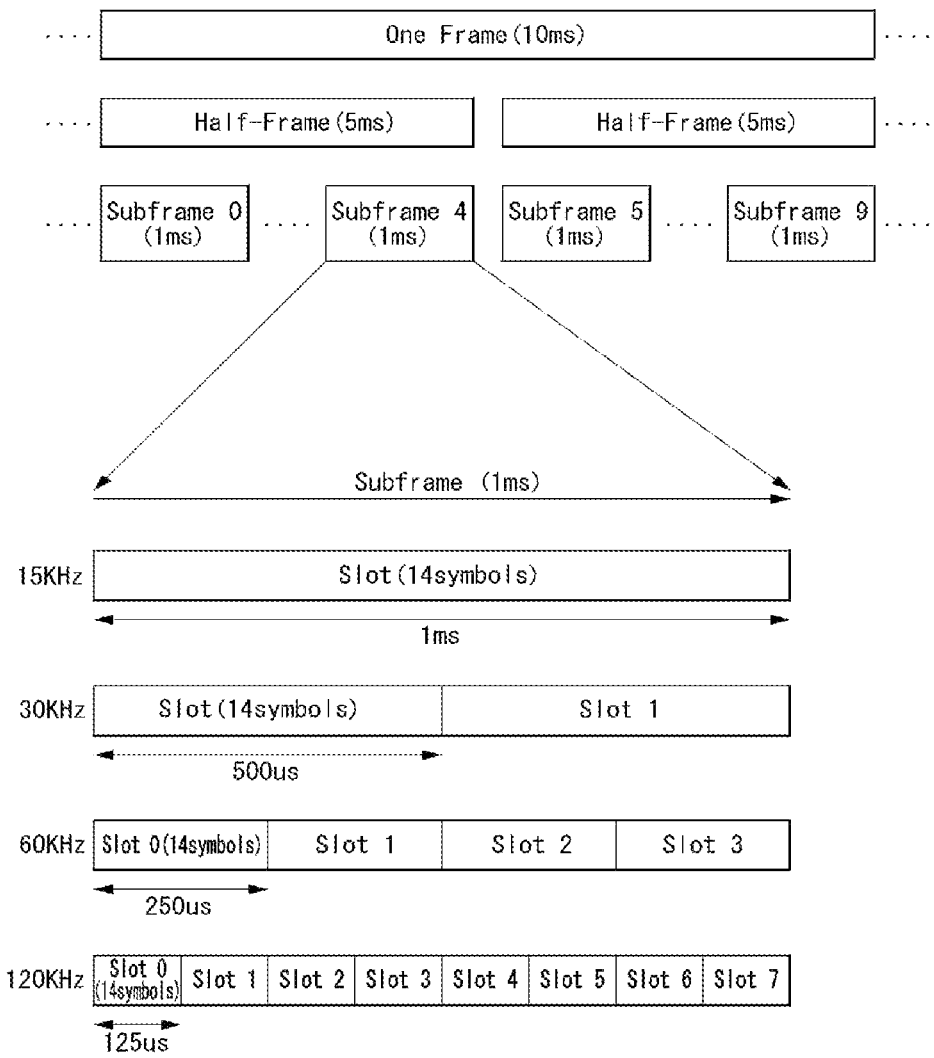

[FIG. 15]
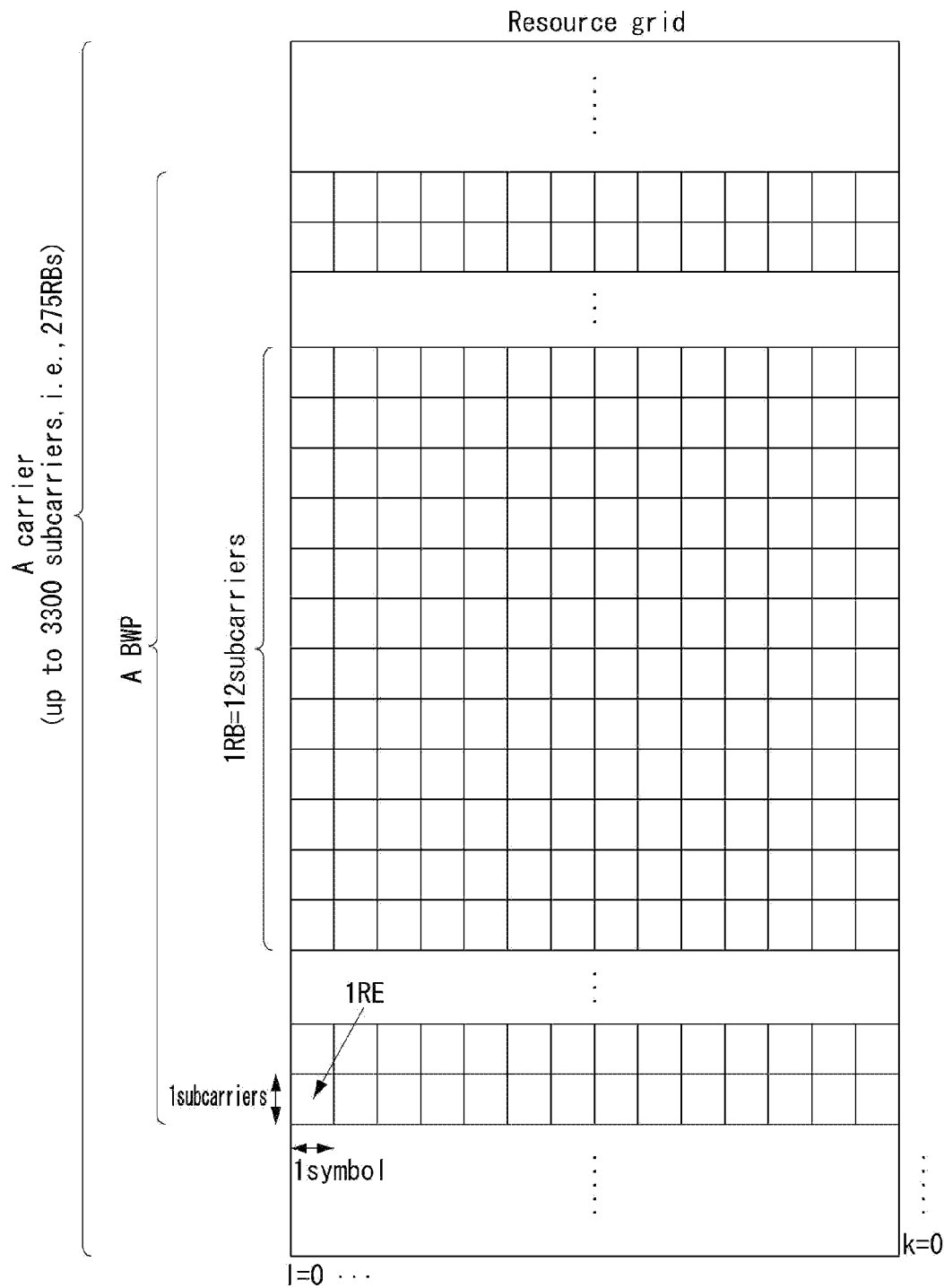

[FIG. 16]
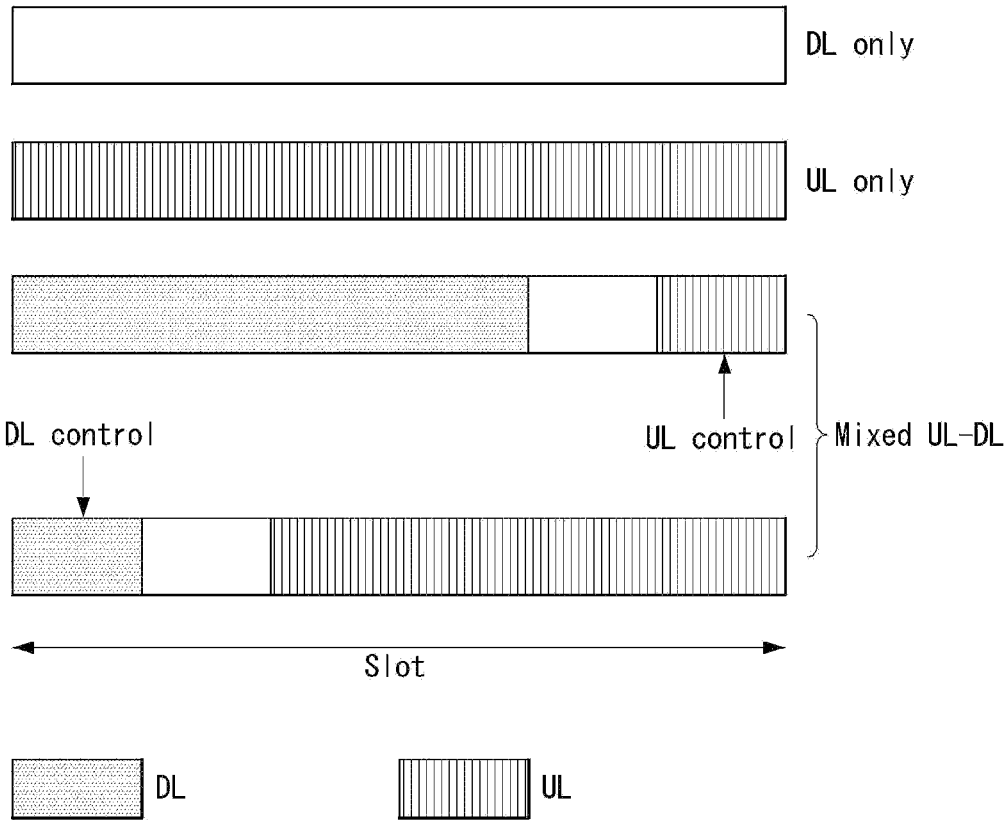
[FIG. 17]
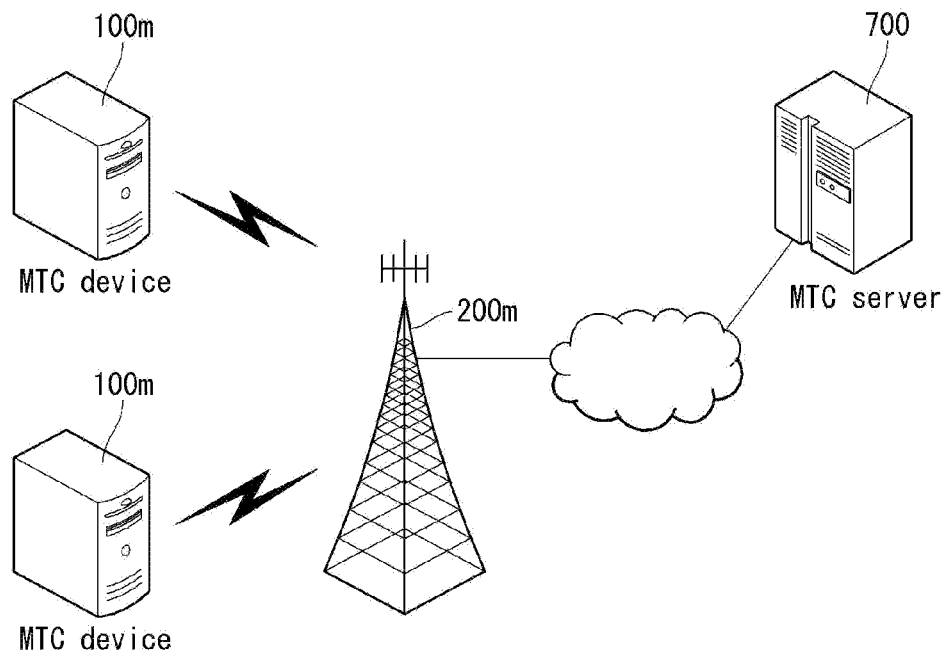

[FIG. 18]
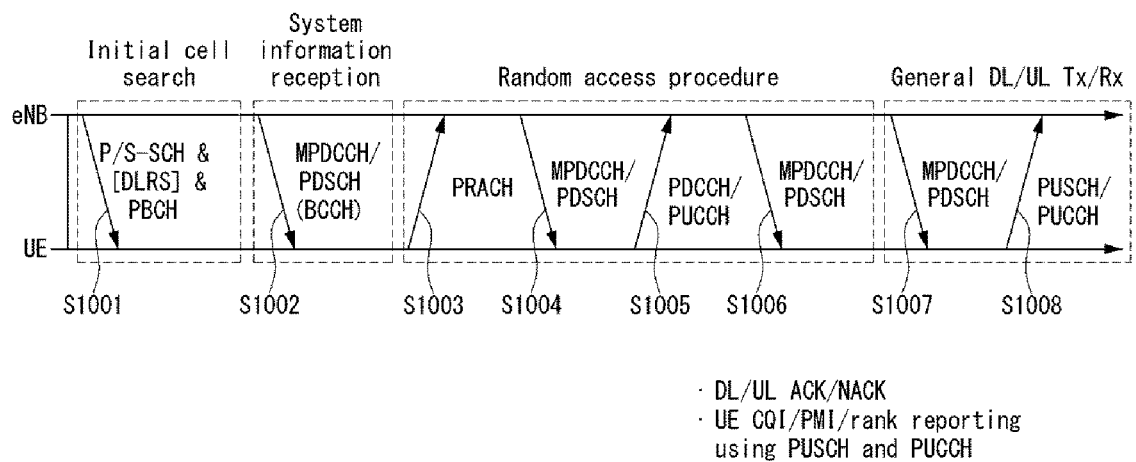
- DL/UL ACK/NACK
- UE CQI/PMI/rank reporting using PUSCH and PUCCH
[FIG. 19]
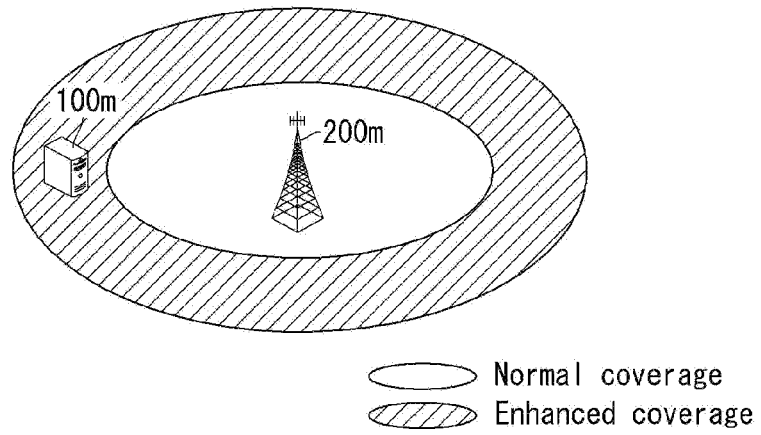
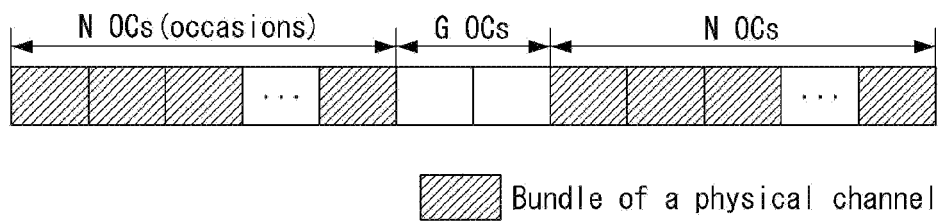

[FIG. 20]
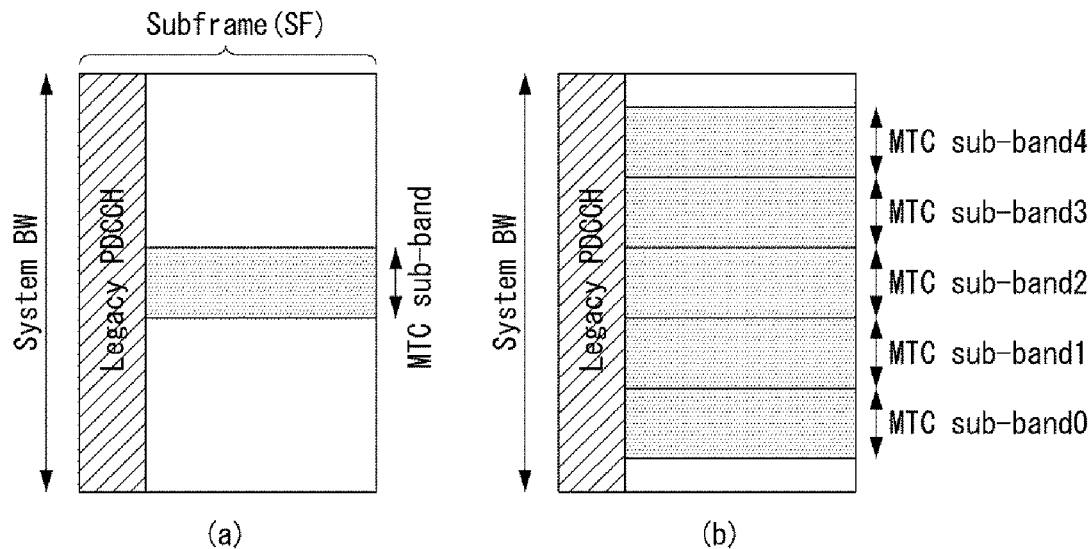
[FIG. 21]
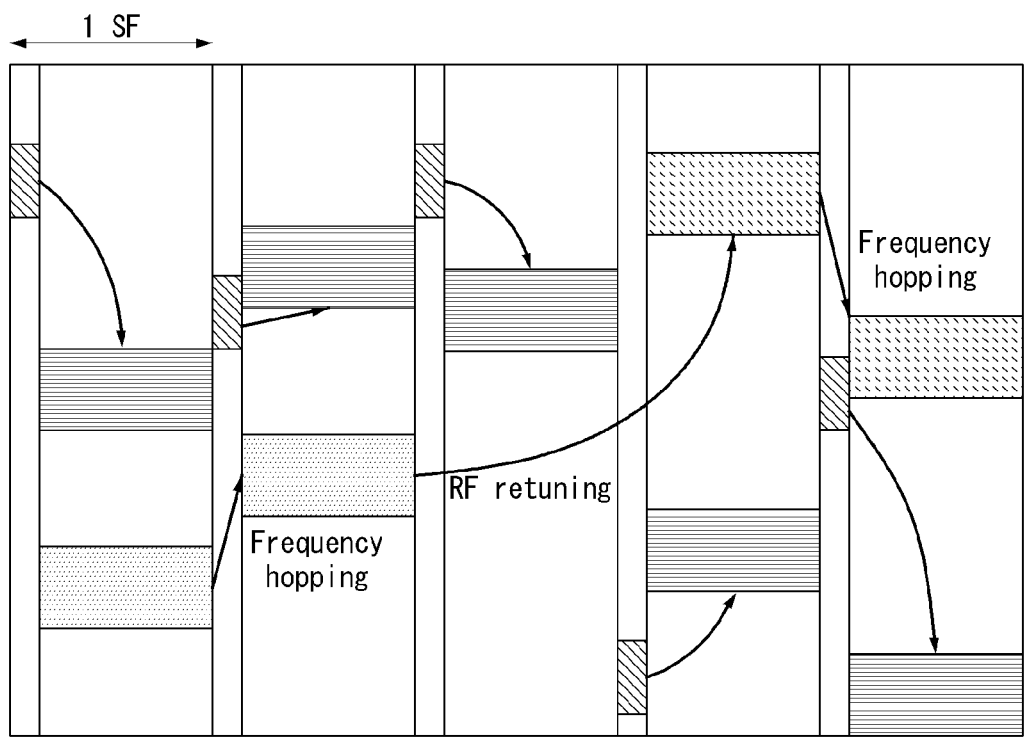

[FIG. 22]
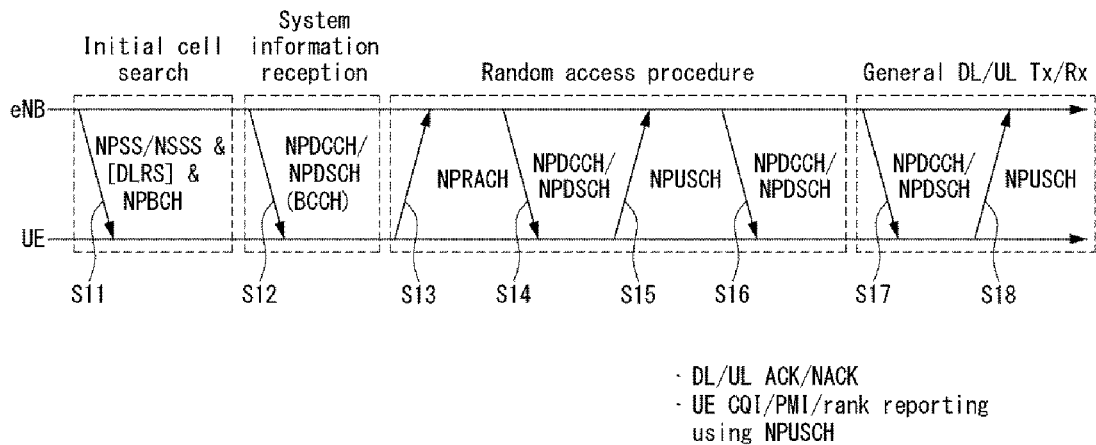
[FIG. 23]
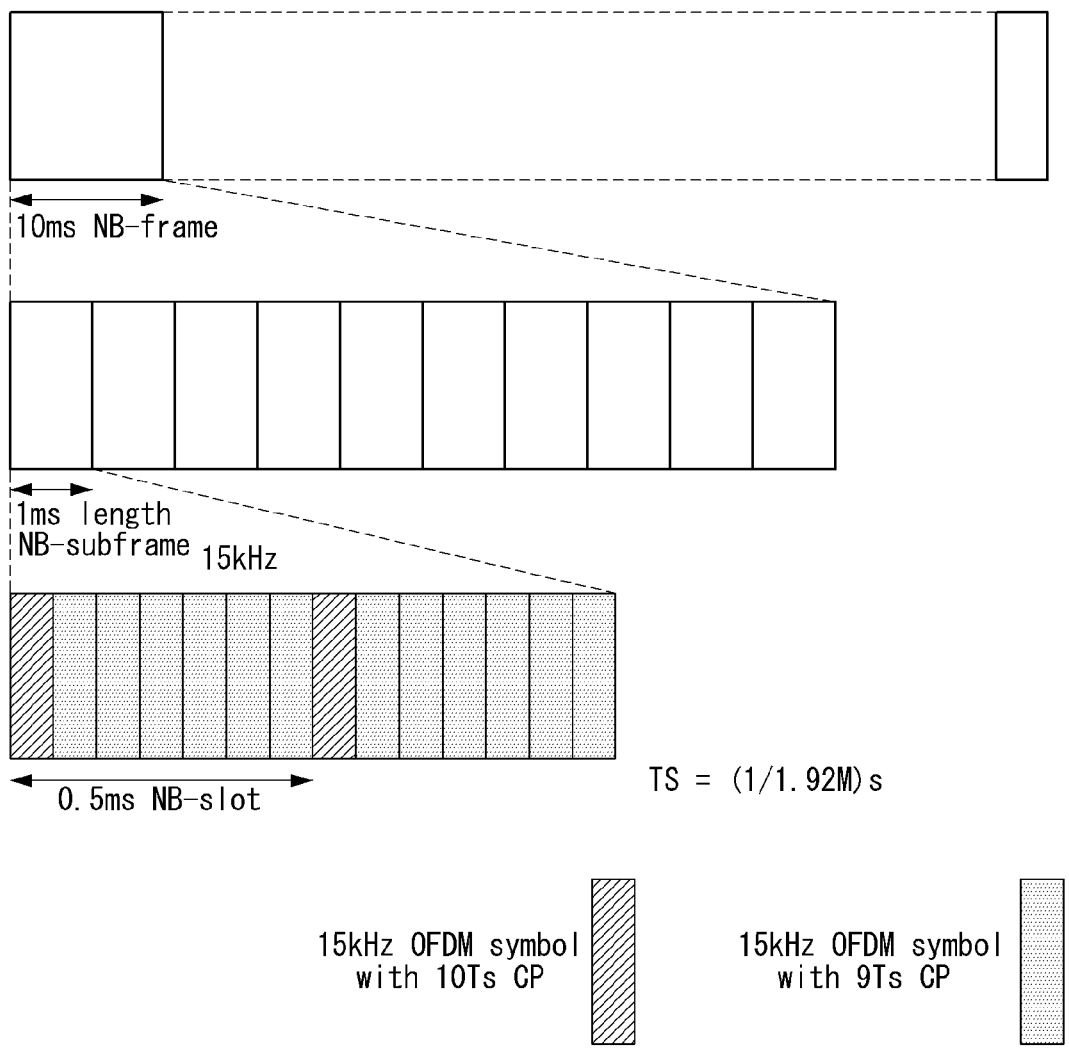

[FIG. 24]
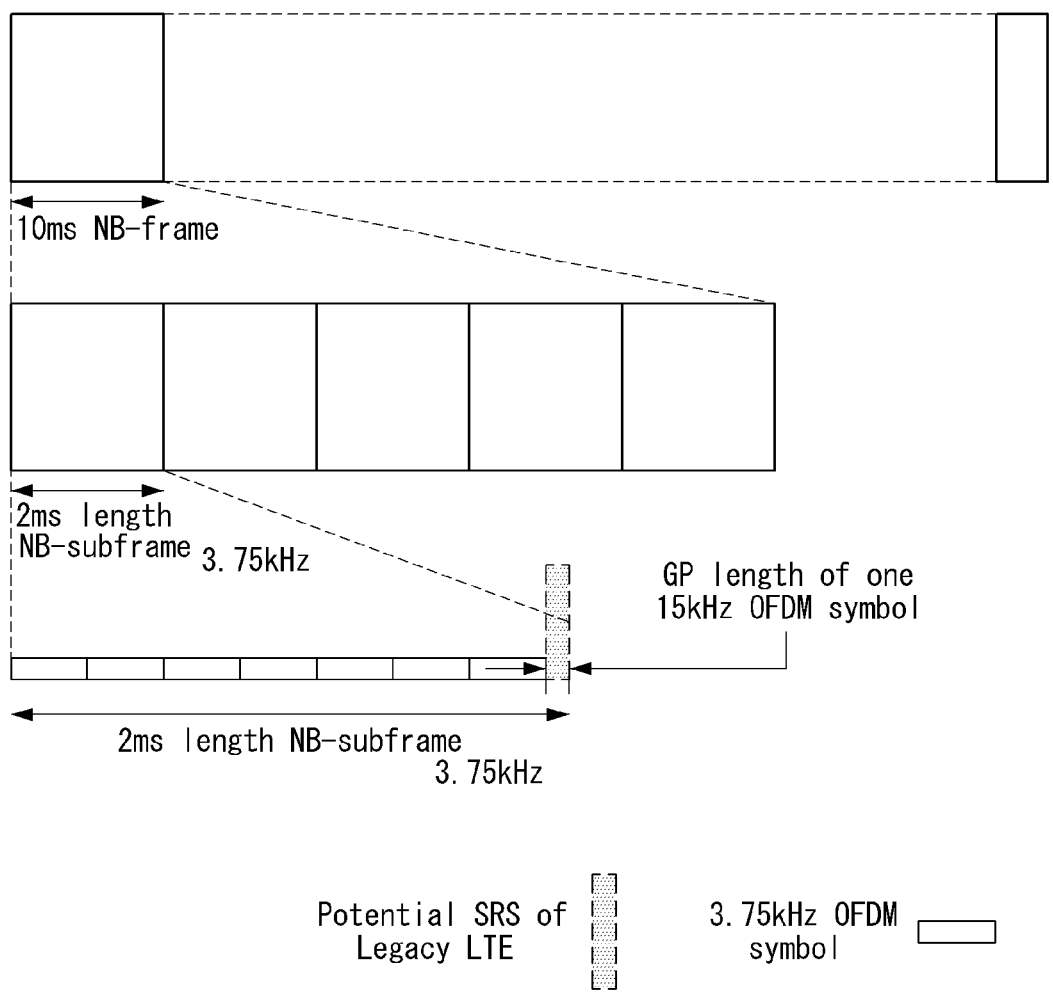

[FIG. 25]
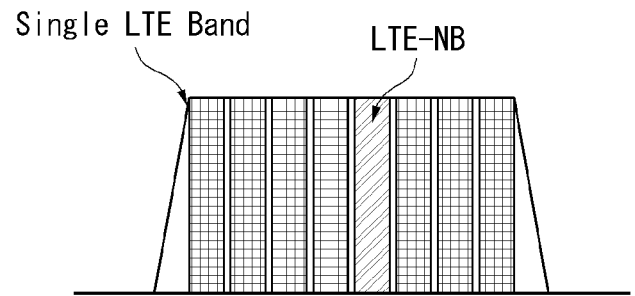
(a) In-band system
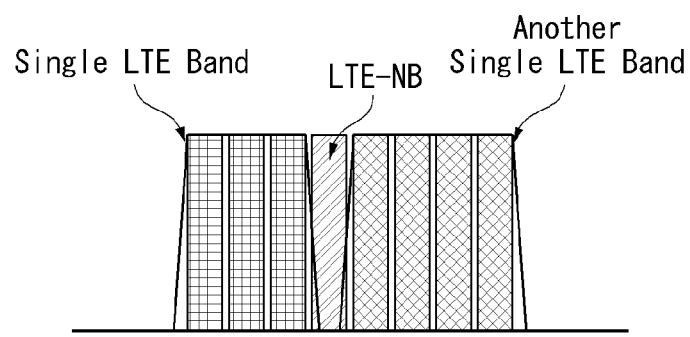
(b) Guard-band system
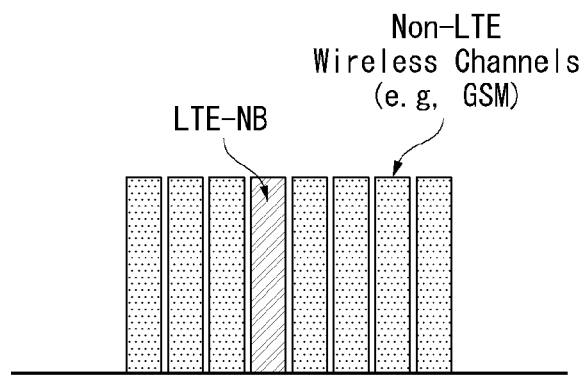
(c) Stand-alone system

[FIG. 26]
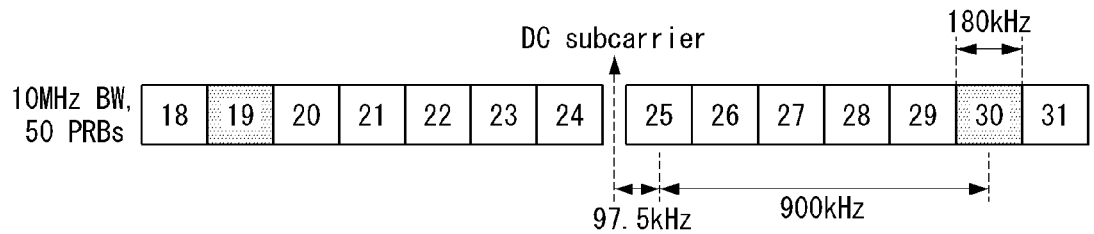
[FIG. 27]
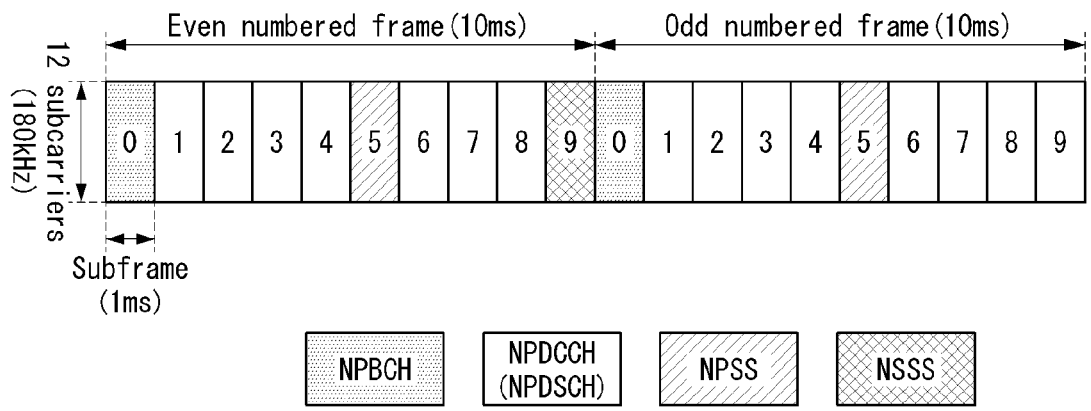
[FIG. 28]
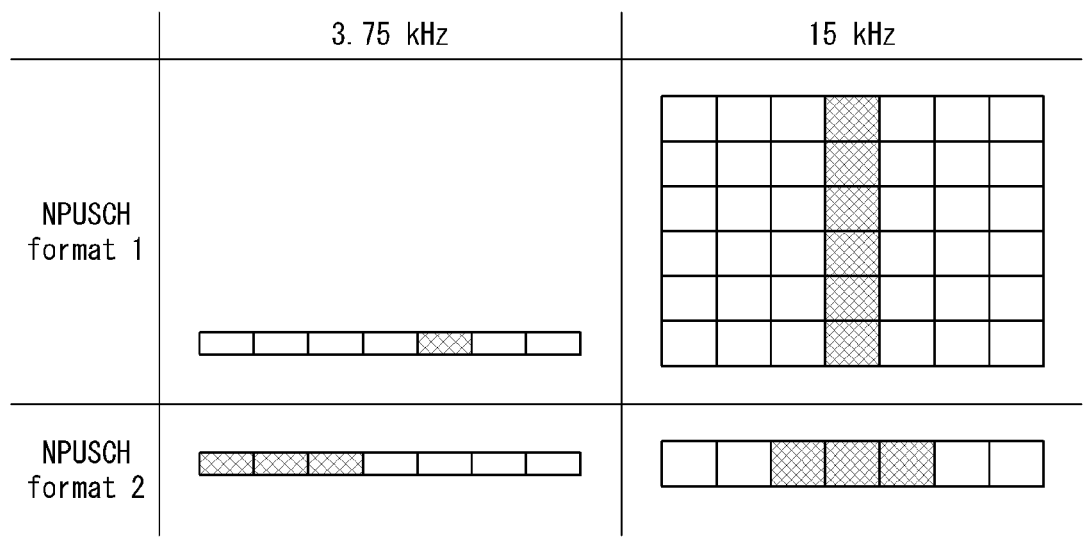

[FIG. 29]
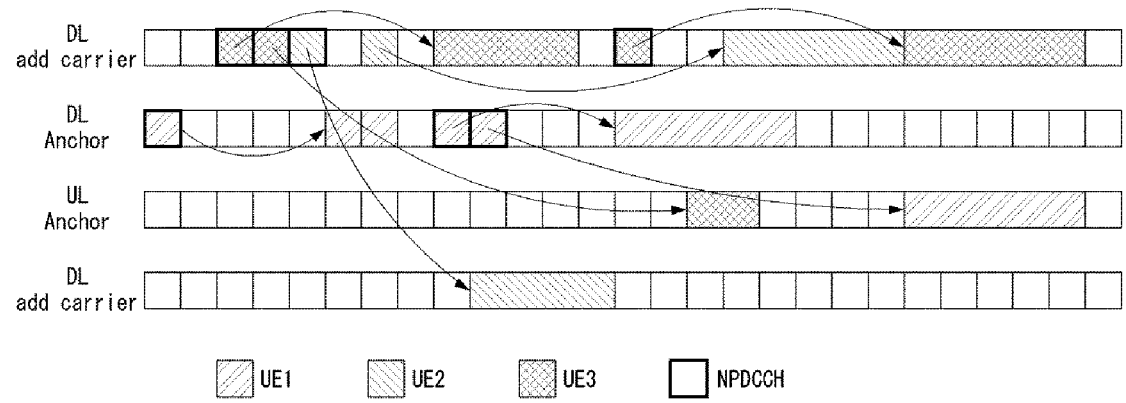
[FIG. 30]
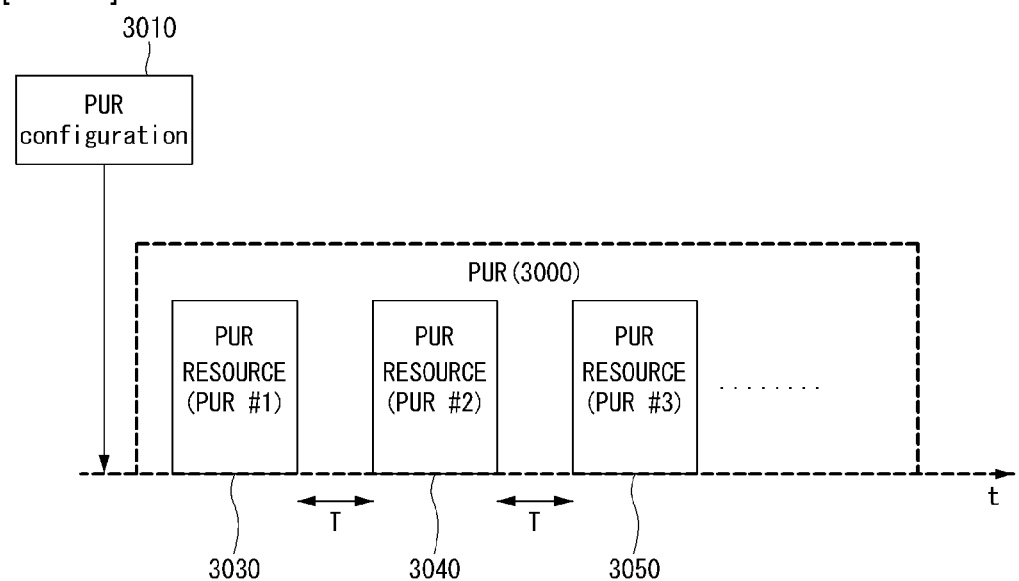

[FIG. 31]
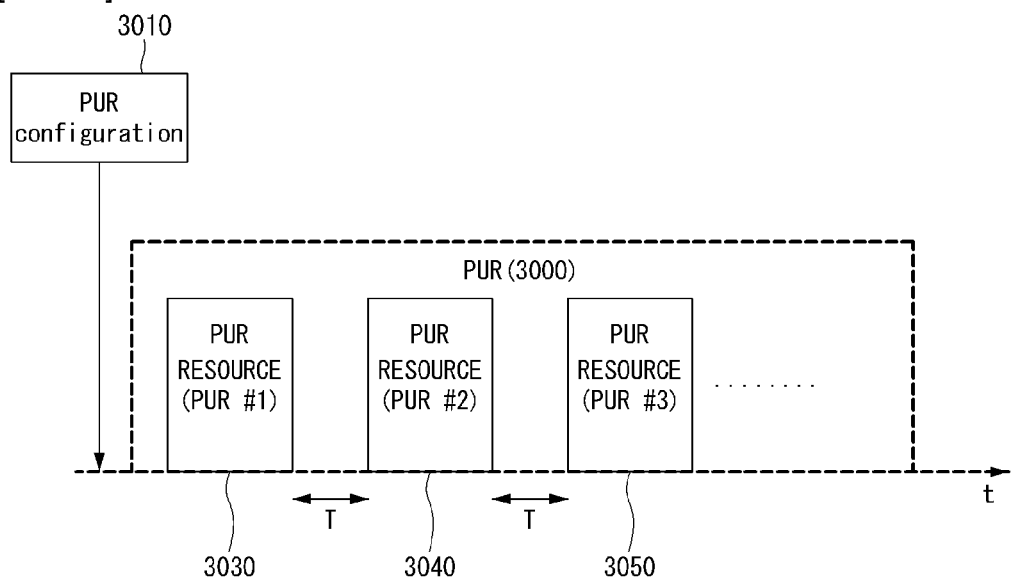
[FIG. 32]
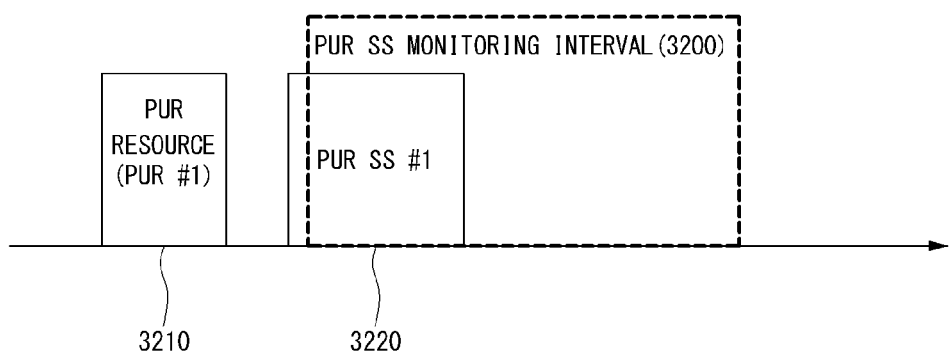

[FIG. 33]
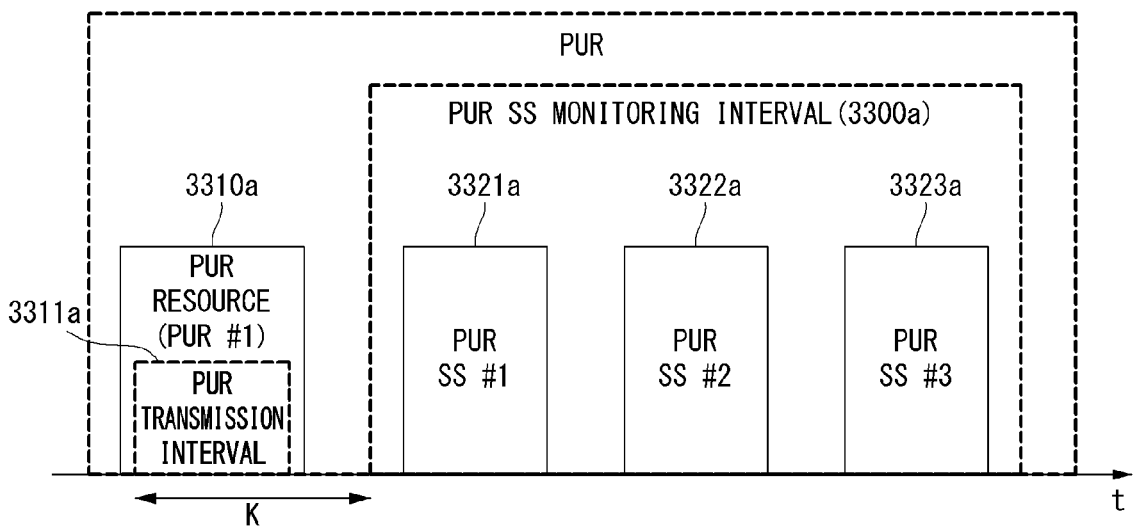
(a)
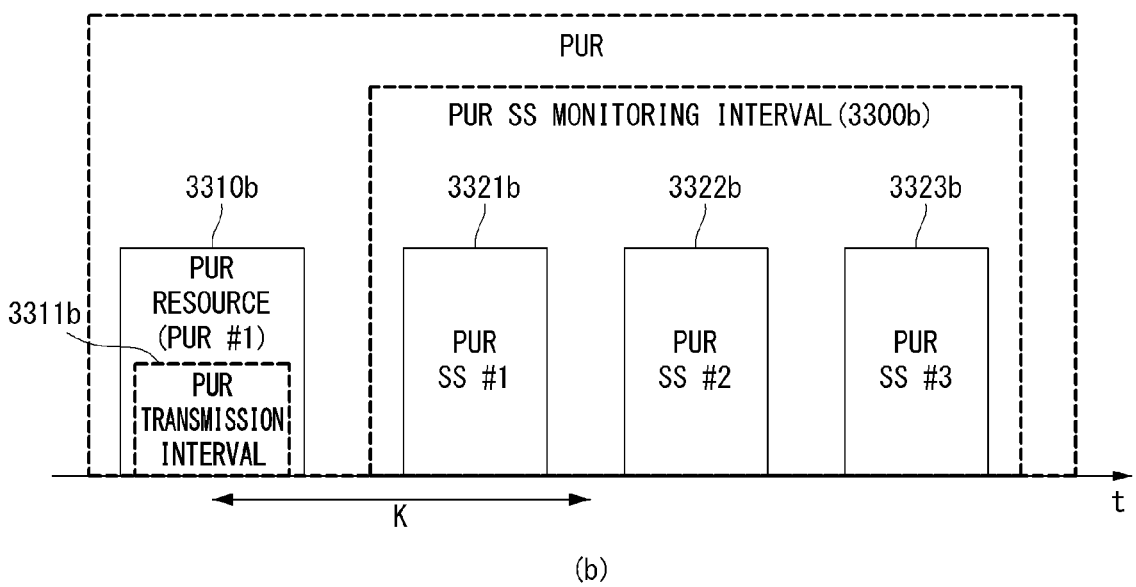
(b)

[FIG. 34]
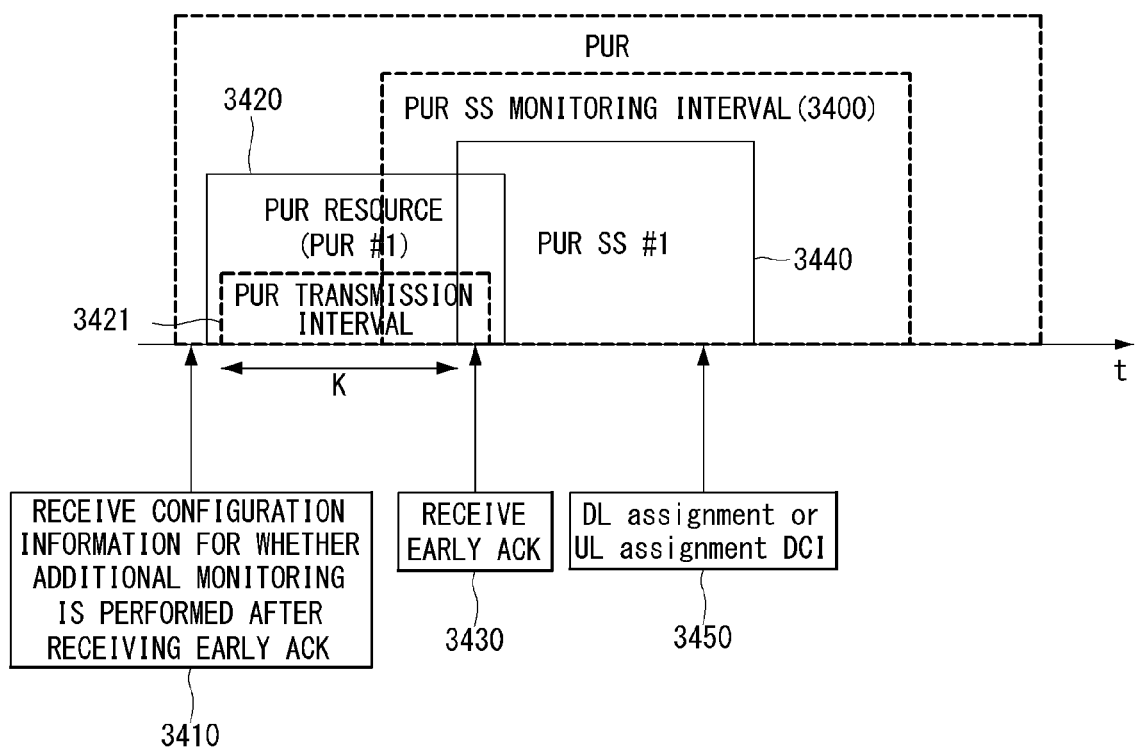

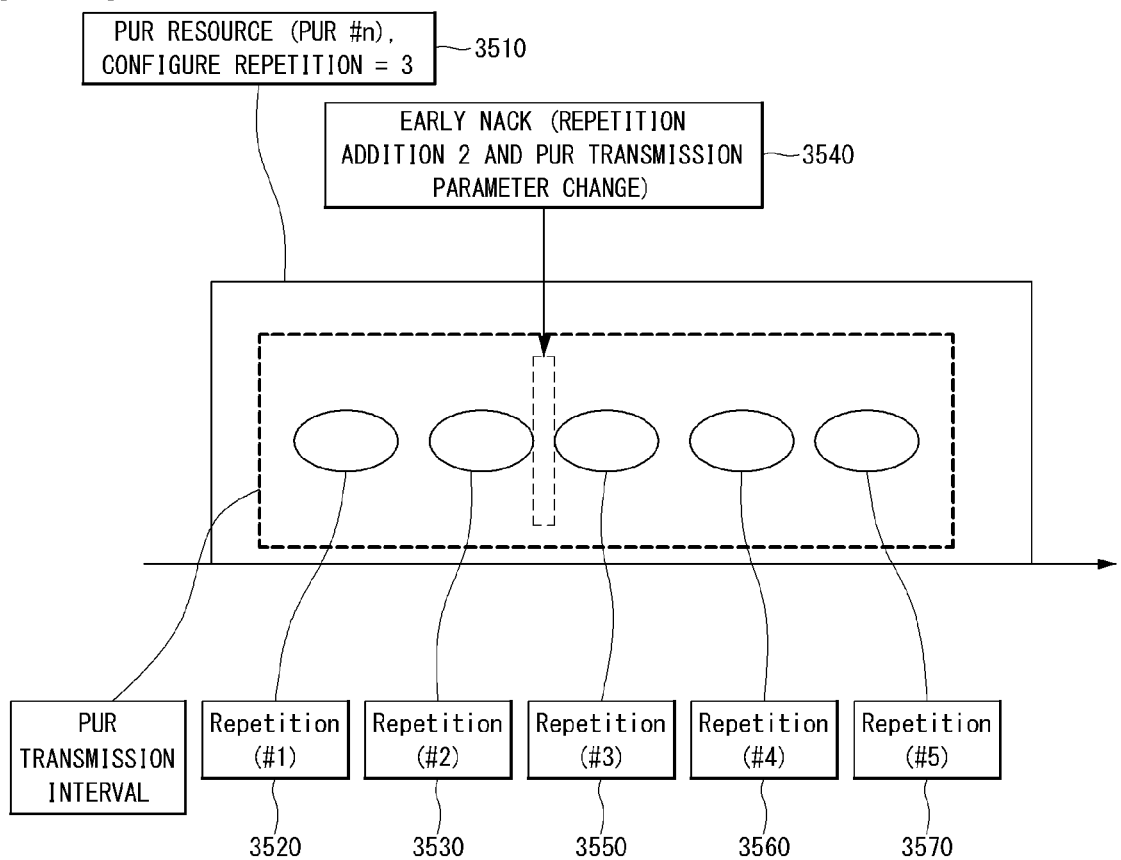

[FIG. 36]
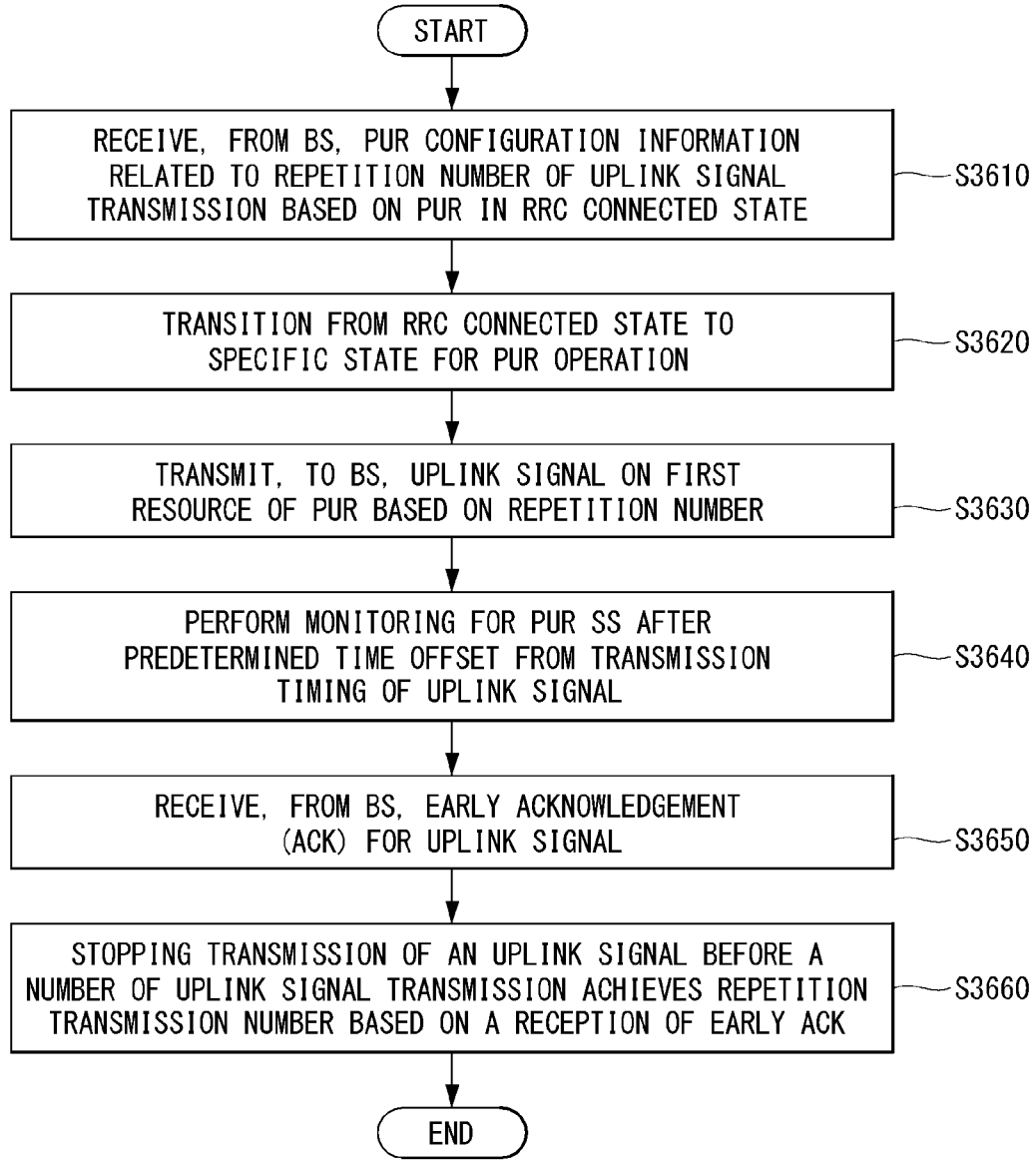

[FIG. 37]
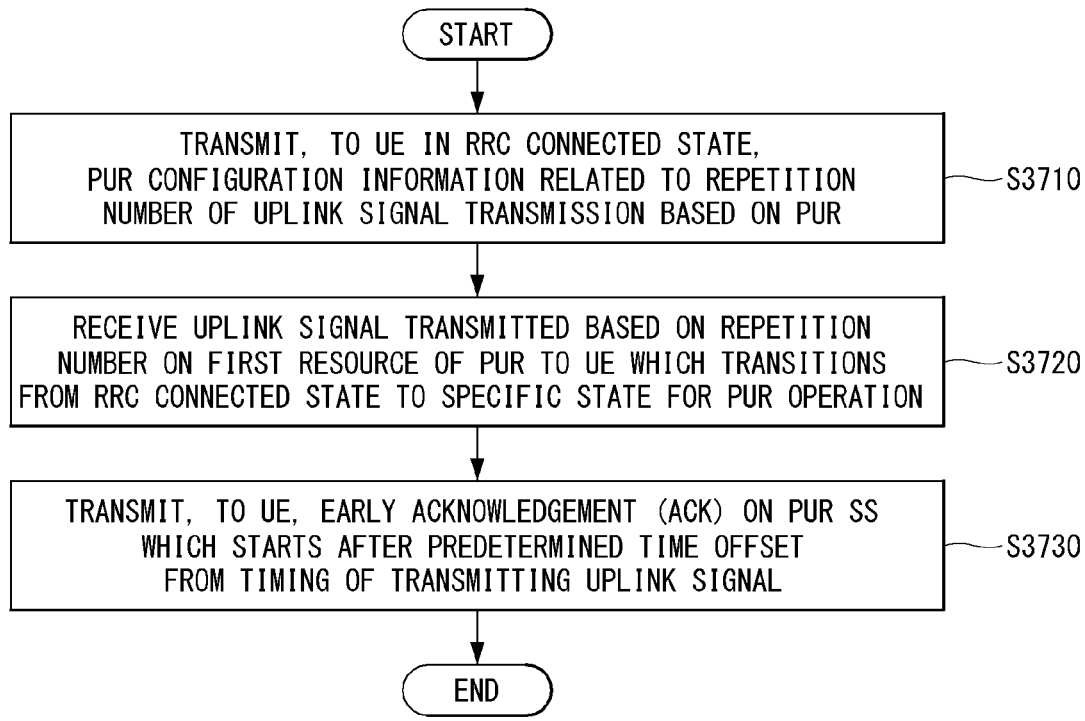
[FIG. 38]
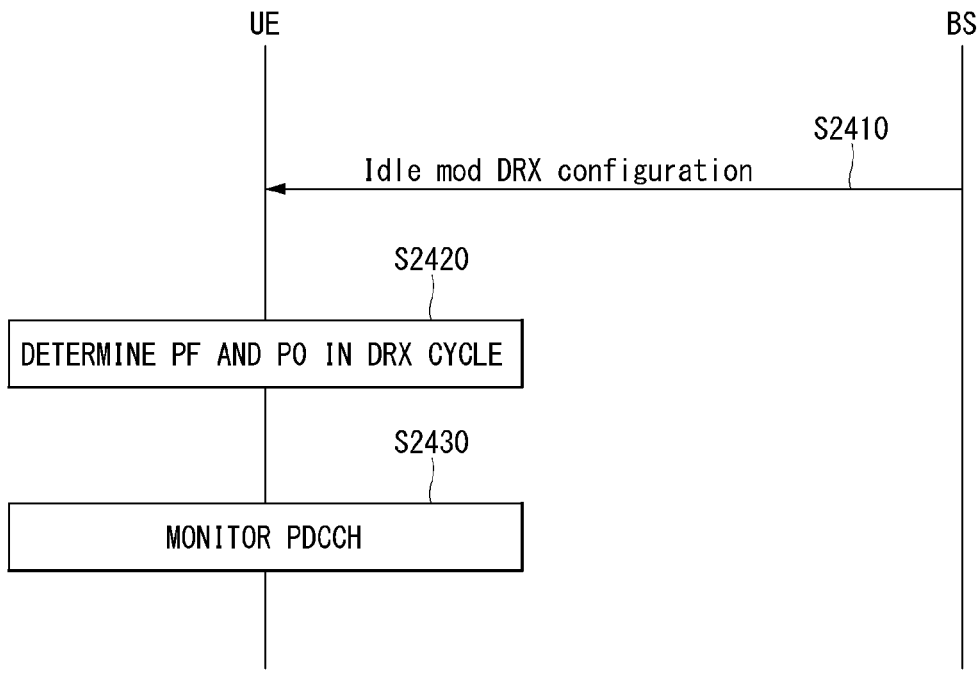

[FIG. 39]
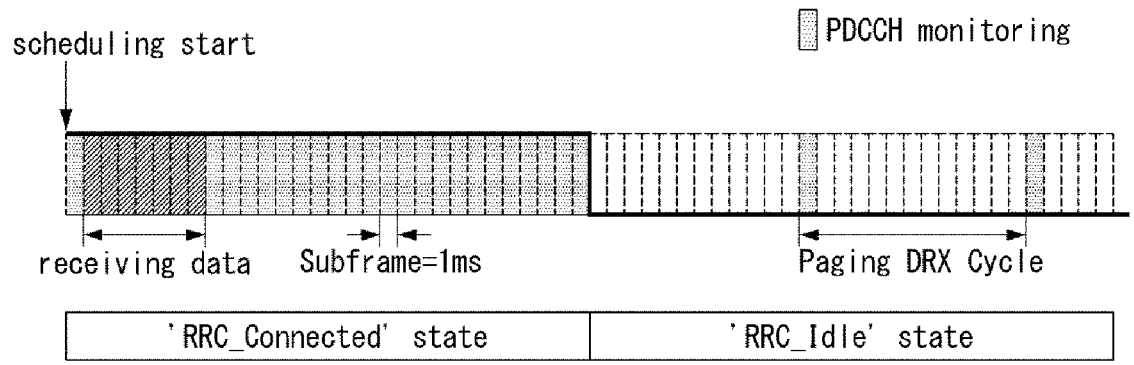
[FIG. 40]
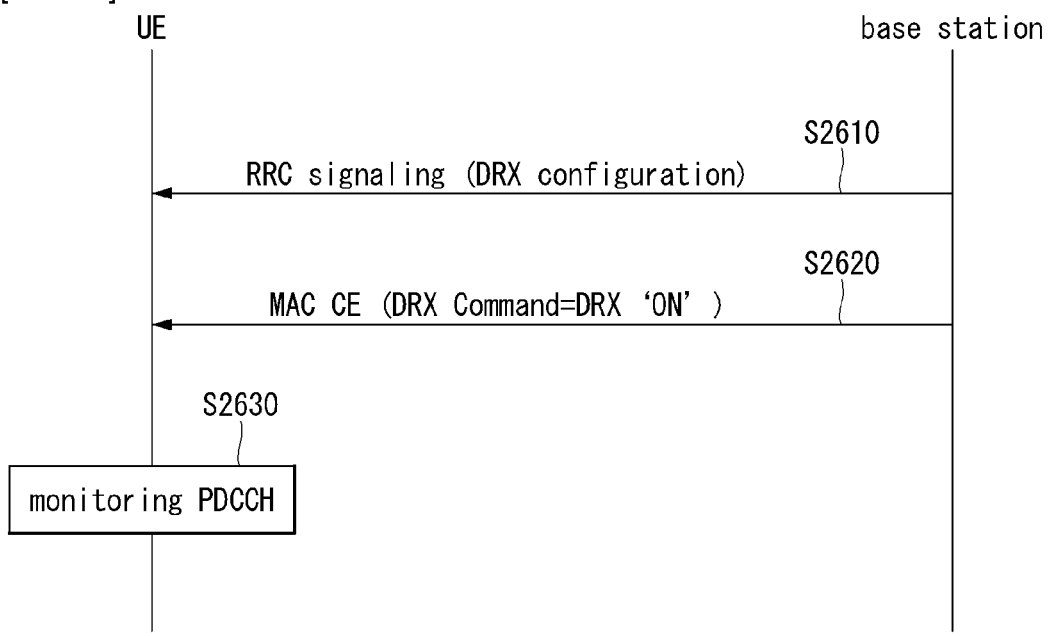

[FIG. 41]
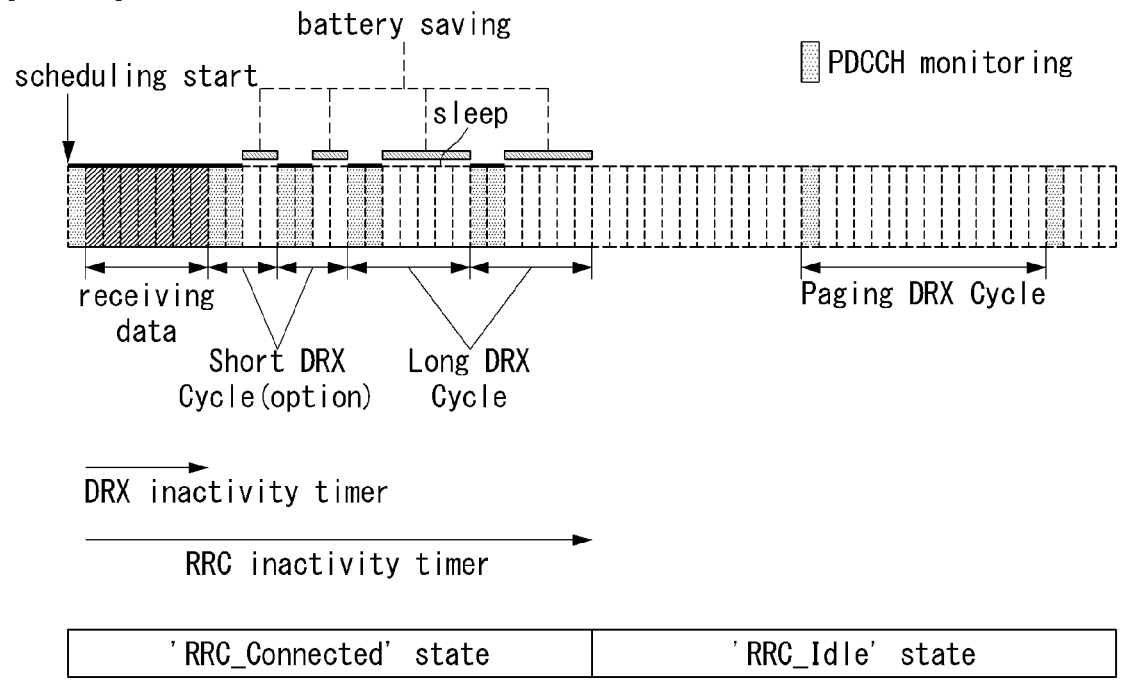
[FIG. 42]
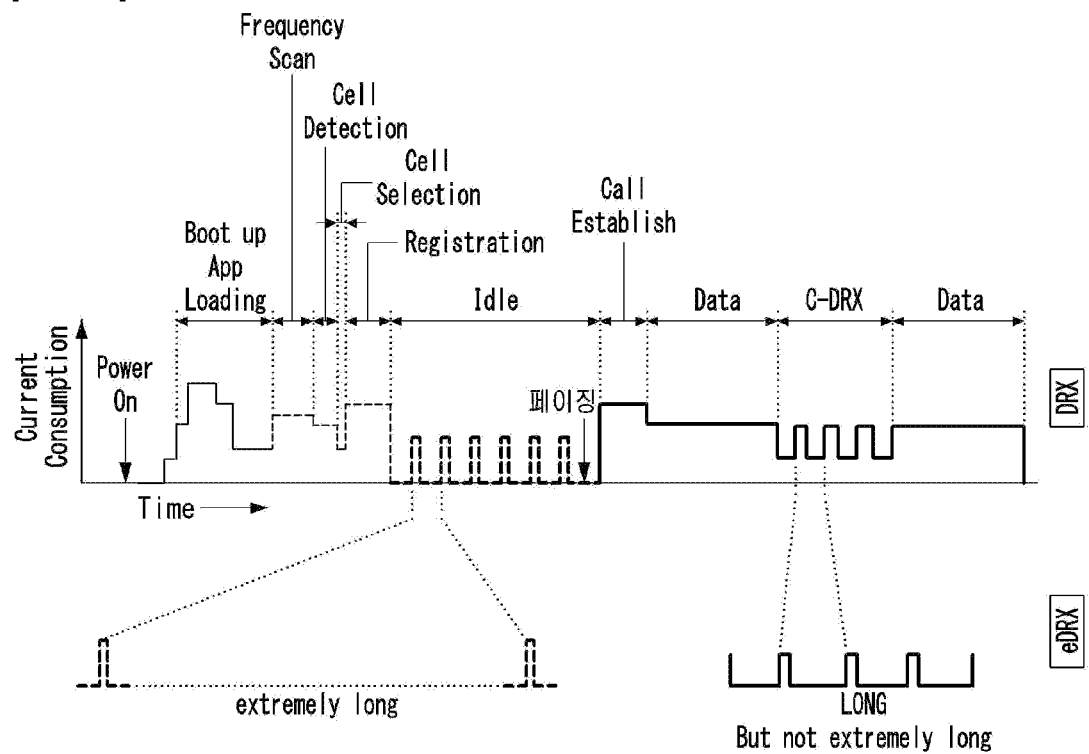

[FIG. 43]
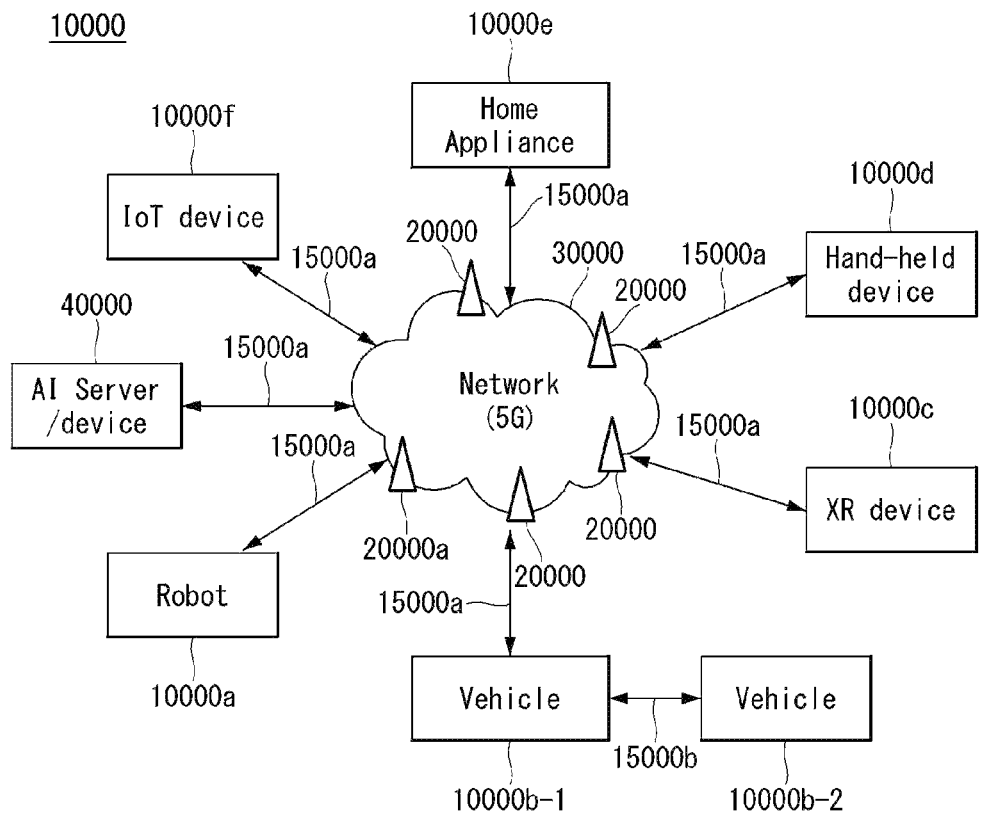
[FIG. 44]
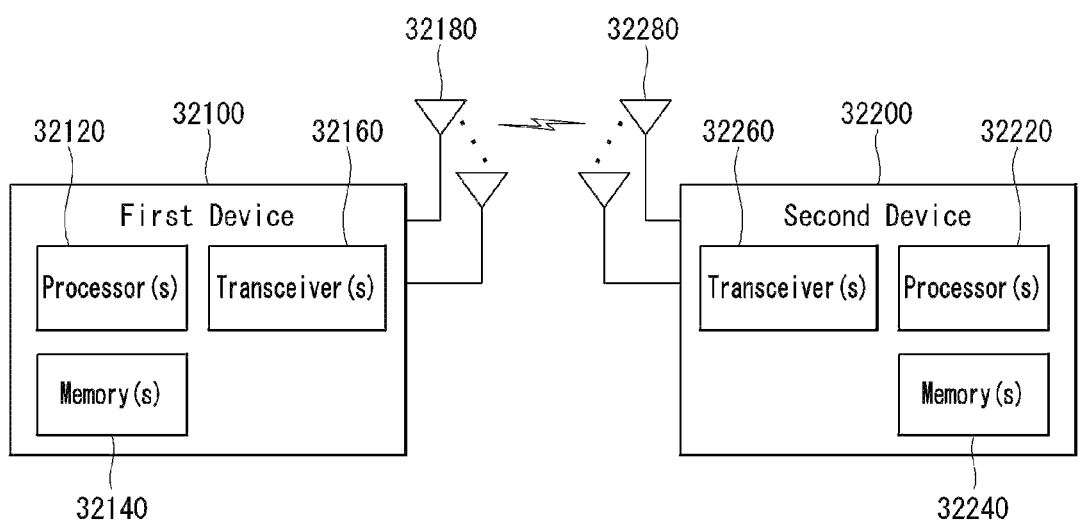

[FIG. 45]
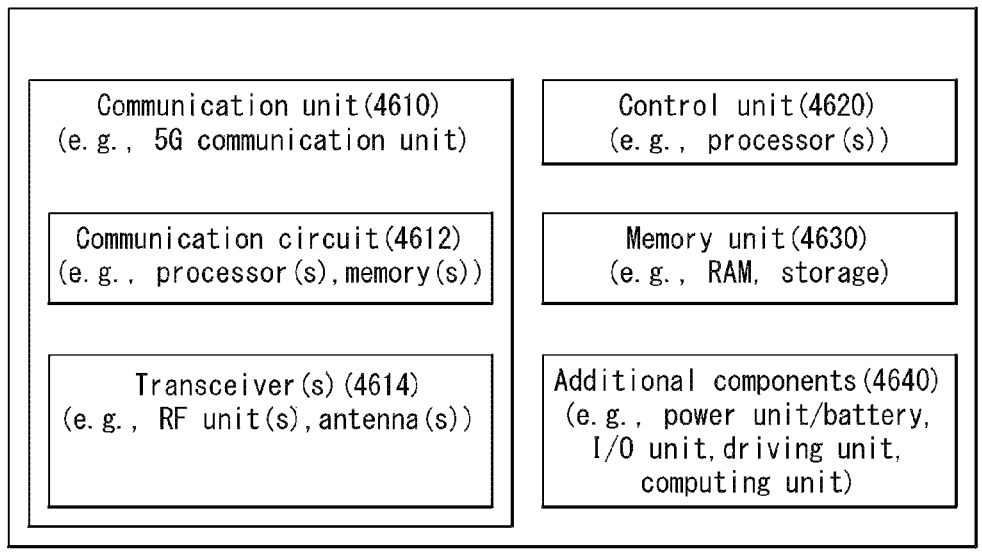
[FIG. 46]
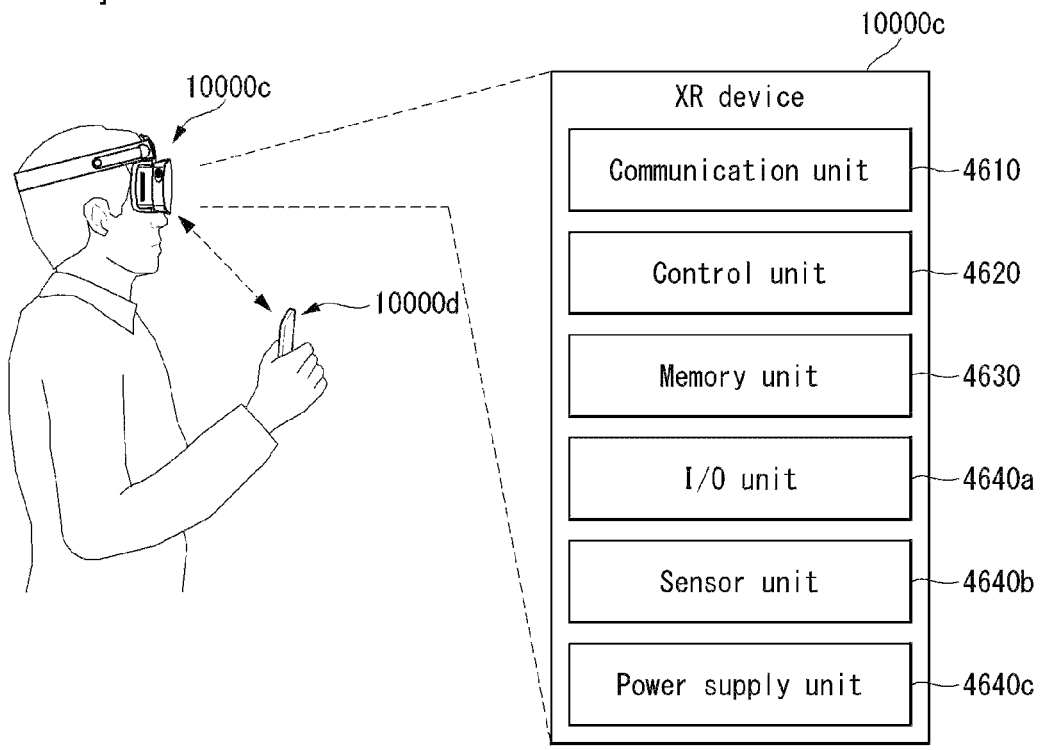

METHOD FOR MONITORING SEARCH SPACE BY MEANS OF PRECONFIGURED UPLINK RESOURCE IN WIRELESS COMMUNICATION SYSTEM AND DEVICE THEREFOR

TECHNICAL FIELD

The present disclosure relates to a wireless communication system, and more particularly, to a method for transmitting a search space through a preconfigured uplink resource in a wireless communication system, and an apparatus therefor.

BACKGROUND ARTS

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

The present disclosure provides a method for monitoring a search space through a preconfigured uplink resource (PUR), and an apparatus therefor.

The present disclosure also provides a method for defining a PUR search space related to uplink data transmission through a preconfigured uplink resource (PUR), and an apparatus therefor.

Further, the present disclosure also provides a method for monitoring a PUR search space based on an early positive acknowledgement (ACK), and an apparatus therefor.

The present disclosure also provides a method for defining a PUR search space, which is capable of avoiding a collision between a PUR search space related to uplink data transmission through a preconfigured uplink resource (PUR) and a search space related to uplink data transmission through a resource other than the PUR, and an apparatus therefor.

The technical objects of the present disclosure are not limited to the aforementioned technical objects, and other technical objects, which are not mentioned above, will be apparently appreciated by a person having ordinary skill in the art from the following description.

Technical Solution

The present disclosure provides a method for monitoring a search space through a preset uplink resource and an apparatus therefor.

In the present disclosure, a method by a user equipment for monitoring a search space (SS) through a preconfigured uplink resource (PUR) in a wireless communication system, the method comprising: receiving, from a base station, PUR configuration information related to a repetition number of uplink signal transmission based on the PUR, in an RRC connected state; transitioning from the RRC connected state to a specific state for a PUR operation; transmitting, to the base station, an uplink signal on a first resource of the PUR based on the repetition number; monitoring a PUR SS after a specific time offset from a transmission timing of the uplink signal; receiving, from the base station, an early acknowledgment (early ACK) for the uplink signal; and stopping, based on a reception of the early ACK, transmission of the uplink signal before a number of transmissions of the uplink signal reaches the repetition number.

Furthermore, in the present disclosure, wherein the specific state is a RRC idle state or a RRC inactive state.

Furthermore, in the present disclosure, wherein the monitoring is performed for all of the PUR SS or part of the PUR SS.

Furthermore, in the present disclosure, wherein based on the monitoring being performed for the part of the PUR SS, the monitoring is performed after the specific time offset from a specific time in a transmission interval in which the transmission of the uplink signal is performed.

Furthermore, in the present disclosure, further comprising: receiving, from the base station, configuration information on whether to perform an additional monitoring on the PUR SS after a reception timing of the early ACK.

Furthermore, in the present disclosure, wherein based on the configuration information indicating not to perform the additional monitoring, the additional monitoring is not performed after the reception timing of the early ACK based on the reception of the early ACK.

Furthermore, in the present disclosure, wherein based on the configuration information indicating to perform the additional monitoring, the additional monitoring is performed after the reception timing of the early ACK.

Furthermore, in the present disclosure, wherein receiving, from the base station, the early ACK further comprising: receiving, from the base station, downlink control information (DCI) for scheduling a physical downlink shared channel (PDSCH) for an update for a PUR configuration based on the PUR configuration information and/or a higher layer ACK transmission, wherein information related to the early ACK is implicitly indicated based on whether the user equipment has received the DCI.

Furthermore, in the present disclosure, wherein based on the base station being configured to schedule a physical downlink shared channel (PDSCH) for an update for a PUR configuration based on the PUR configuration information and/or a higher layer ACK transmission regardless of whether to receive the uplink signal, receiving, from the base station, the early ACK further comprising: receiving, from the base station, downlink control information (DCI) for scheduling the PDSCH, wherein the DCI includes information related to the early ACK.

Furthermore, in the present disclosure, wherein the DCI further includes indication information related to whether to stop the additional monitoring, wherein whether to stop the additional monitoring is determined based on the indication information.

Furthermore, in the present disclosure, further comprising: receiving, from the base station, an early NACK (early negative ACK) indicating an update of a PUR configuration based on the PUR configuration information on a specific PUR SS before a completion of the transmission of the uplink signal, wherein part of all of at least one PUR parameter related to the PUR configuration is updated based on the update of the PUR configuration.

Furthermore, in the present disclosure, receiving, from the base station, the early NACK further comprising: receiving downlink control information (DCI) for scheduling of a physical uplink shared channel (PUSCH), wherein the DCI includes information related to the early NACK and indication information indicating an execution of a random access channel (RACH) procedure for updating a timing advance (TA) related to an uplink transmission timing.

Furthermore, in the present disclosure, based on both a first monitoring stopping method based on a timer for stopping PUR SS monitoring and a second monitoring stopping method based on the early ACK being supported: wherein whether to stop the monitoring is determined based only on the first monitoring stopping method based on the early ACK being not received, and wherein whether to stop the monitoring is determined based on only the second monitoring stopping method regardless of a value of the timer based on the early ACK being received.

Furthermore, in the present disclosure, wherein whether the early ACK and the early NACK are supported in the specific state is configured separately from whether the early ACK and the early NACK are supported in the RRC connection state, and wherein the PUR configuration information further includes specific information related to whether the early ACK and the early NACK are supported during the PUR operation in the specific state.

Furthermore, in the present disclosure, wherein based on whether the early ACK and the early NACK are supported in the specific state being not separately configured, whether the early ACK and the early NACK are supported in the specific state is determined based on whether the early ACK and the early NACK are supported in the RRC connection state.

Furthermore, in the present disclosure, a user equipment for monitoring a search space (SS) through a preconfigured uplink resource (PUR) in a wireless communication system, the user equipment comprising: a transmitter for transmitting a radio signal; a receiver for receiving a radio signal; and a processor operatively coupled to the transmitter and the receiver, wherein the processor is configured to control: the receiver to receive, from a base station, PUR configuration information related to a repetition number of uplink signal transmission based on the PUR, in an RRC connected state; to transition from the RRC connected state to a specific state for a PUR operation; the transmitter to transmit, to the base station, an uplink signal on a first resource of the PUR based on the repetition number; to monitor PUR SS after a specific time offset from a transmission timing of the uplink signal; the receiver to receive, from the base station, an early acknowledgment (early ACK) for the uplink signal; and to stop, based on a reception of the early ACK, transmission of the uplink signal before a number of transmissions of the uplink signal reaches the repetition number.

Furthermore, in the present disclosure, a method for monitoring a search space (SS) through a preconfigured uplink resource (PUR) in a wireless communication system, the method performed by a base station comprising: transmitting, to a user equipment in an RRC connected state, PUR configuration information related to a repetition number of uplink signal transmission based on the PUR; receiving, from the user equipment transitioning from the RRC connected state to a specific state for a PUR operation, an uplink signal on a first resource of the PUR transmitted based on the repetition number; and transmitting, to the user equipment, an early acknowledgment (early ACK) on a PUR SS after a specific time offset from a transmission timing of the uplink signal, wherein reception of the uplink signal is stopped before a number of transmissions of the uplink signal reaches the repetition number based on a transmission of the early ACK.

Furthermore, in the present disclosure, a base station for performing a method of monitoring a search space (SS) through a preconfigured uplink resource (PUR) in a wireless communication system, the base station comprising: a transmitter for transmitting a radio signal; a receiver for receiving a radio signal; and a processor operatively coupled to the transmitter and the receiver, wherein the processor is configured to control: the transmitter to transmit, to a user equipment in an RRC connected state, PUR configuration information related to a repetition number of uplink signal transmission based on the PUR; the receiver to receive, from the user equipment transitioning from the RRC connected state to a specific state for a PUR operation, an uplink signal on a first resource of the PUR transmitted based on the repetition number; and the transmitter to transmit, to the user equipment, an early acknowledgment (early ACK) on a PUR SS after a specific time offset from a transmission timing of the uplink signal, wherein reception of the uplink signal is stopped before a number of transmissions of the uplink signal reaches the repetition number based on a transmission of the early ACK.

Furthermore, in the present disclosure, an apparatus comprising one or more memories and one or more processors operatively coupled to the one or more memories, the apparatus comprising: wherein the one or more processors control the apparatus to: receive, from a base station, PUR configuration information related to a repetition number of uplink signal transmission based on the PUR, in an RRC connected state; transition from the RRC connected state to a specific state for a PUR operation; transmit, to the base station, an uplink signal on a first resource of the PUR based on the repetition number; monitor a PUR SS after a specific time offset from a transmission timing of the uplink signal; receive, from the base station, an early acknowledgment (early ACK) for the uplink signal; and stop, based on a reception of the early ACK, transmission of the uplink signal before a number of transmissions of the uplink signal reaches the repetition number.

Furthermore, in the present disclosure, a non-transitory computer readable medium (CRM) storing one or more instructions, comprising: wherein the one or more instructions executable by the one or more processors causes a user equipment to: receive, from a base station, PUR configuration information related to a repetition number of uplink signal transmission based on the PUR, in an RRC connected state; transition from the RRC connected state to a specific state for a PUR operation; transmit, to the base station, an uplink signal on a first resource of the PUR based on the repetition number; monitor a PUR SS after a specific time offset from a transmission timing of the uplink signal; receive, from the base station, an early acknowledgment (early ACK) for the uplink signal; and stop, based on a reception of the early ACK, transmission of the uplink signal before a number of transmissions of the uplink signal reaches the repetition number.

Advantageous Effects

According to the present disclosure, there is an effect that a search space through a preconfigured uplink resource (PUR) can be monitored.

Further, according to the present disclosure, there is an effect that a PUR search space related to uplink data transmission through the preconfigured uplink resource (PUR) can be defined.

Further, according to the present disclosure, there is an effect that PUR search space monitoring can be efficiently performed through PUR search space monitoring based on an early positive acknowledgement (ACK).

Further, according to the present disclosure, there is an effect that it is possible to avoid a collision between a PUR search space related to uplink data transmission through a preconfigured uplink resource (PUR) and a search space related to uplink data transmission through a resource other than the PUR.

Advantages which can be obtained in the present disclosure are not limited to the aforementioned advantages and other unmentioned advantages will be clearly understood by those skilled in the art from the following description.

DESCRIPTION OF DRAWINGS

The accompanying drawings, which are included as part of the detailed description to help understand the present disclosure, provide embodiments of the present disclosure, and describe technical features of the present disclosure together with the detailed description.

FIG. 1 is a perspective view of an augmented reality electronic device according to an embodiment of the present disclosure.

FIG. 2 illustrates an AI device according to an embodiment of the present disclosure.

FIG. 3 illustrates an AI server according to an embodiment of the present disclosure.

FIG. 4 illustrates an AI system according to an embodiment of the present disclosure.

FIG. 5 illustrates an example of a network structure of an evolved universal terrestrial radio access network (E-UTRAN) to which the present disclosure may be applied.

FIG. 6 illustrates physical channels and general signal transmission used in a 3GPP system.

FIG. 7 illustrates the structure of the uplink subframe used in LTE.

FIG. 8 is a diagram illustrating an example of an LTE radio frame structure.

FIG. 9 is a diagram illustrating an example of a resource grid for a downlink slot.

FIG. 10 illustrates an example of a structure of a downlink subframe.

FIG. 11 illustrates an example of a structure of an uplink subframe.

FIG. 12 illustrates an example of frame structure type 1.

FIG. 13 is a diagram illustrating another example of frame structure type 2.

FIG. 14 illustrates a structure of a radio frame used in NR.

FIG. 15 illustrates a slot structure of an NR frame.

FIG. 16 illustrates a structure of a self-contained slot.

FIG. 17 illustrates MTC communication.

FIG. 18 illustrates physical channels used in MTC and general signal transmission using the same.

FIG. 19 illustrates cell coverage enhancement in MTC.

FIG. 20 illustrates a signal band for MTC.

FIG. 21 illustrates scheduling in legacy LTE and MTC.

FIG. 22 illustrates physical channels used in NB-IoT and general signal transmission using the same.

FIG. 23 illustrates a frame structure when a subframe spacing is 15 kHz and

FIG. 24 illustrates a frame structure when a subframe spacing is 3.75 kHz.

FIG. 25 illustrates three operation modes of NB-IoT.

FIG. 26 illustrates a layout of an in-band anchor carrier at an LTE bandwidth of 10 MHz.

FIG. 27 illustrates transmission of an NB-IoT downlink physical channel/signal in an FDD LTE system.

FIG. 28 illustrates an NPUSCH format.

FIG. 29 illustrates case in which only an anchor-carrier is configured for UE1, a DL/UL non-anchor carrier is additionally configured for UE2, and a DL non-anchor carrier is additionally configured for UE3.

FIG. 30 is a diagram illustrating an example of a scheme of configuring a PUR resource to a UE.

FIG. 31 is a diagram illustrating an example of an operation of updating a PUR configuration of the UE.

FIG. 32 is a diagram illustrating an example in which the UE performs PUR search space monitoring in a PUR search space monitoring interval defined based on a timer.

FIG. 33 is a diagram illustrating examples in which a PUR SS monitoring method for supporting an early ACK is performed.

FIG. 34 illustrates an example in which a UE receiving the early ACK performs an operation related to PUR SS monitoring.

FIG. 35 is a diagram illustrating an example of a UE operation of performing PUR transmission by reflecting a PUR configuration update based on an early NACK.

FIG. 36 is a diagram illustrating an example of an operation implemented in a UE performing a method for monitoring a search space (SS) through a preconfigured uplink resource in a wireless communication system proposed in the present disclosure.

FIG. 37 is a diagram illustrating an example of an operation implemented in a base station for performing a method for monitoring a search space through a preconfigured uplink resource in a wireless communication system proposed in the present disclosure.

FIG. 38 is a flowchart showing an example of a method of performing an idle mode DRX operation.

FIG. 39 is a diagram illustrating an example of the idle mode DRX operation.

FIG. 40 is a flowchart showing an example of a method for performing a C-DRX operation.

FIG. 41 is a diagram illustrating an example of a C-DRX operation.

FIG. 42 is a diagram illustrating an example of power consumption depending on a state of a UE.

FIG. 43 illustrates a communication system applicable to the present disclosure.

FIG. 44 illustrates a wireless device applicable to the present disclosure.

FIG. 45 illustrates another example of the wireless device applied to the present disclosure.

FIG. 46 illustrates an XR device applicable to the present disclosure.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be illustrated in a block diagram form centering on core capabilities of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to coexistence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, "A and/or B" may be interpreted as the same meaning as "including at least one of A or B".

5G Scenario

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of an operation so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the operations of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select an operation or operation sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a perspective view of an augmented reality electronic device according to an embodiment of the present disclosure.

As illustrated in FIG. 1, the electronic device according to an embodiment of the present disclosure may include a frame 1000, a control unit 2000, and a display unit 3000.

The electronic device may be provided as a glass type (smart glass). The glass-type electronic device may be configured to be worn on the head of the human body and may include a frame (case, housing, etc.) 1000 therefor. The frame 1000 may be made of a flexible material to facilitate wearing.

The frame 1000 is supported on the head and has a space on which various components are mounted. As illustrated, electronic components such as the control unit 2000, a user input unit 1300, or an audio output unit 1400 may be mounted on the frame 1000. Furthermore, a lens covering at least one of a left eye and a right eye may be detachably mounted on the frame 1000.

As illustrated in FIG. 1, the frame 1000 may have a glass form worn on a face in the human body of a user, but the present disclosure is not limited thereto and the frame 100 may have a form such as goggles, etc., which are worn in close contact with the face of the user, etc.

Such a frame 1000 may include a front frame 1100 having at least one opening and a pair of side frames 1200 which extend in a first direction y intersecting the front frame 1100 and are parallel to each other.

The control unit 2000 is provided to control various electronic components provided in the electronic device.

The control unit 2000 may generate an image to be shown to the user or a video in which the images are continued. The control unit 2000 may include an image source panel generating the image and a plurality of lenses which diffuses and converges light generated from the image source panel.

The control unit 2000 may be fixed to any one side frame 1200 of both side frames 1200. For example, the control unit 2000 may be fixed to an inside or an outside of any one side frame 1200 or embedded and integrally formed in any one side frame 1200. Alternatively, the control unit 2000 may be fixed to the front frame 1100 or provided separately from the electronic device.

The display unit 3000 may be implemented in the form of Head Mounted Display (HMD). The HMD form refers to a display scheme that is mounted on the head and displays the video directly in front of the user's eye. When the user wears the electronic device, the display unit 3000 may be disposed to correspond to at least one of the left eye and the right eye so as to provide the video directly in front of the user's eye. In this figure, it is illustrated that the display unit 3000 is located at a portion corresponding to the right eye so as to output the video toward the right eye of the user.

The display unit 3000 may allow the image generated by the control unit 2000 to be displayed to the user while the user visually recognizes an external environment. For example, the display unit 3000 may project the image to a display area using a prism.

In addition, the display unit 3000 may be formed to be light-transmitting so that the projected image and a general field of view (a range which the user seeds through the eyes)

may be seen at the same time. For example, the display unit 3000 may be translucent and may be formed by an optical element including glass.

In addition, the display unit 3000 may be inserted into or fixed to the opening included in the front frame 1100 or located on a rear surface (i.e., between the opening and the user) of the opening to be fixed to the front frame 1100. In the figure, a case where the display unit 3000 is located on the rear surface of the opening and fixed to the front frame 1100 is illustrated as an example, but unlike this, the display unit 3000 may be arranged and fixed at various locations of the frame 1000.

As illustrated in FIG. 1, in the electronic device, when image light for the image is incident on one side of the display unit 3000 by the control unit 2000, the image light is emitted to the other side through the display unit 3000 to show the image generated by the control unit 2000 to the user.

As a result, the user may view the image generated by the control unit 2000 simultaneously while viewing the external environment through the opening of the frame 1000. That is, the video output through the display unit 3000 may be viewed as overlapping with the general field of view. The electronic device may provide augmented reality (AR) that superimposes a virtual image on a real image or a background by using such display characteristics.

FIG. 2 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 2, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 3 illustrates an AI server 200 according to an embodiment of the disclosure.

Referring to FIG. 3, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 4 illustrates an AI system 1 according to an embodiment of the disclosure.

Referring to FIG. 4, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 4 may be considered to be detailed embodiments of the AI device 100 shown in FIG. 1.

<AI+Robot>

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's operation or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' operation or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

General Description of System

FIG. 5 illustrates an example of a network structure of an evolved universal terrestrial radio access network (E-UTRAN) to which the present disclosure may be applied.

The E-UTRAN system as a system evolved from the legacy UTRAN system may be, for example, a 3GPP LTE/LTE-A system. The E-UTRAN is constituted by base stations (eNB) providing control plane and user plane protocols, and the base stations are connected through an X2 interface. An X2 user plane interface (X2-U) is defined between the base stations. The X2-U interface provides a non guaranteed delivery of a user plane packet data unit (PDU). An X2 control plane interface (X2-CP) is defined between two neighboring base stations. The X2-CP performs a function such as a context delivery between the base stations, a control of a user plane tunnel between a source base station and a target base station, a delivery of a hand-over related message, an uplink load management, etc. The base station is connected to the UE through a radio interface and connected to an evolved packet core (EPC) through an S1 interface. An S1 user plane interface (S1-U) is defined between the base station and a serving gateway (S-GW). An S1 control plane interface (S1-MME) is defined between the base station and a mobility management entity (MME). The S1 interface an evolved packet system (EPS) bearer service management function, a non-access stratum (NAS) signaling transport function, network sharing, an MME load balancing function, etc. The S1 interface supports a may-to-many-relation between the base station and the MME/S-GW.

Physical Channel and General Signal Transmission

FIG. 6 illustrates physical channels and general signal transmission used in a 3GPP system. In a wireless communication system, the UE receives information from the station through Downlink (DL) and the UE transmits information from the base station through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the BS (S201). To this end, the UE receives a Primary Synchronization Channel (PSCH) and a Secondary Synchronization Channel (SSCH) from the BS to synchronize with the base station and obtain information such as a cell identity (ID), etc. Furthermore, the UE receives a Physical Broadcast Channel (PBCH) from the base station to obtain in-cell broadcast information. Furthermore, the UE receives a Downlink Reference Signal (DL RS) in an initial cell search step to check a downlink channel state.

Upon completion of the initial cell search, the UE receives a Physical Downlink Control Channel (PDCCH) and a Physical Downlink Control Channel (PDSCH) corresponding thereto to acquire more specific system information (S202).

Thereafter, the UE may perform a random access procedure in order to complete an access to the base station (S203 to S206). Specifically, the UE may transmit a preamble through a Physical Random Access Channel (PRACH) (S203) and receive a Random Access Response (RAR) for the preamble through the PDCCH and the PDSCH corresponding thereto (S204). Thereafter, the UE may transmit a Physical Uplink Shared Channel (PUSCH) by using scheduling information in the RAR (S205) and perform a Contention Resolution Procedure such as the PDCCH and the PDSCH corresponding thereto (S206).

The UE that performs the above-described procedure may then perform reception of the PDCCH/PDSCH (S207) and transmission of PUSCH/Physical Uplink Control Channel (PUCCH) (S208) as the general uplink/downlink signal transmission procedure. Control information transmitted from the UE to the base station is referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indication (CQI), a Precoding Matrix Indicator (PMI), Rank Indicator (RI), etc. The UCI is generally transmitted through the PUCCH, but may be transmitted through the PUSCH when the control information and data are to be transmitted simultaneously. Furthermore, the UE may transmit the UCI aperiodically through the PUSCH according to a request/instruction of the network.

FIG. 7 illustrates the structure of the uplink subframe used in LTE.

Referring to FIG. 7, a subframe 500 is constituted by two 0.5 ms slots 501. Each slot is constituted by a plurality of symbols 502 and one symbol corresponds to one SC-FDMA symbol. An RB 503 is a resource allocation unit corresponding to 12 subcarriers in a frequency domain and one slot in a time domain. The structure of the uplink subframe of LTE is largely divided into a data region 504 and a control region 505. The data region refers to a communication resource used to transmit data such as voice and packet transmitted to each UE and includes a physical uplink shared channel (PUSCH). The control region refers to a communication resource used to transmit an uplink control signal, for example, a downlink channel quality report from each UE, a reception ACK/NACK for a downlink signal, an uplink scheduling request, etc., and includes a physical uplink control channel (PUCCH). A sounding reference signal (SRS) is transmitted through an SC-FDMA symbol located last on a time axis in one subframe.

FIG. 8 is a diagram showing an example of an LTE radio frame structure.

In FIG. 8, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 9 is a diagram showing an example of a resource grid for a downlink slot.

In FIG. 9, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 10 shows an example of a downlink subframe structure.

In FIG. 10, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 11 shows an example of an uplink subframe structure.

In FIG. 11, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000\times 2048)$ seconds.

Downlink and uplink transmissions are organized into radio frames with $T_f=307200\times T_s=10$ ms duration. Two radio frame structures are supported:

Type 1: applicable to FDD

Type 2: applicable to TDD

Frame Structure Type 1

FIG. 12 illustrates an example of frame structure type 1.

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Frame Structure Type 2

Frame structure type 2 is applicable to TDD. Each radio frame of length $T_f=307200\times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720 \cdot T_s=1$ ms. Each subframe is defined as two slots, 2i and 2i+1 of length $T_{slot}=15360 \cdot T_2=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission. FIG. 13 is a diagram showing another example of a frame structure type 2.

Table 1 shows an example of the configuration of a special subframe.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 14 illustrates a structure of a radio frame used in NR.

In NR, uplink and downlink transmission is configured by the frame. The radio frame has a length of 10 ms and is defined as two 5 ms half-frames (HFs). The half-frame is defined as 5 1 ms subframes (SFs). The subframe is split into one or more slits and the number of slots in the subframe depends on the subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

Table 3 shows that when the normal CP is used, the number of symbols for each slot, the number of slots for each frame, and the number of slots for each subframe vary according to the SCS.

TABLE 3

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: The number of symbols in slot
*$N^{frame,u}_{slot}$: The number of slots in frame
*$N^{subframe,u}_{slot}$: The number of slots in subframe Table 4 shows that when the extended CP is used, the number of symbols for each slot, the number of slots for each frame, and the number of slots for each subframe vary according to the SCS.

TABLE 4

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, OFDM(A) numerology (e.g., SCS, CP length, etc.) may be differently set between a plurality of cells merged into one UE. As a result, an (absolute time) section of the time resource (e.g., SF, slot or TTI) (for convenience, collectively referred to as Time Unit (TU)) constituted by the same number of symbols may be configured differently between the merged cells.

FIG. 15 illustrates a slot structure of an NR frame.

The slot includes a plurality of symbols in the time domain. For example, in the case of the normal CP, one slot includes 14 symbols, but in the case of the extended CP, one slot includes 12 symbols. A carrier includes a plurality of subcarriers in the frequency domain. The resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

FIG. 16 illustrates a structure of a self-contained slot.

In the NR system, a frame is characterized by a self-complete structure in which all of a DL control channel, DL or UL data, and UL control channel may be included in one slot. For example, first N symbols in the slot may be used to transmit a DL control channel (hereinafter, referred to as a DL control area), and last M symbols in the slot may be used to transmit a UL control channel (hereinafter, a UL control area). N and M are each an integer of 0 or more. A resource region (hereinafter, referred to as the data area) between the DL control area and the UL control area may be used for DL data transmission or UL data transmission. As an example, the following configuration may be considered. Each period is listed in chronological order.

1. DL only configuration
   2. UL only configuration
   3. Mixed UL-DL configuration
      DL area+Guard Period (GP)+UL control area
      DL control area+Guard Period (GP)+UL control area DL area: (i) DL data area, (ii) DL control area+DL data area UL area: (i) DL data area, (ii) DL data area+DL control area The PDCCH may be transmitted in the DL control area, and the PDSCH may be transmitted in the DL data area. The PUCCH may be transmitted in the UL control area, and the PUSCH may be transmitted in the UL data area. In the PDCCH, downlink control information (DCI), e.g., DL data scheduling information, UL data scheduling information, etc., may be transmitted. In PUCCH, uplink control information (UCI), e.g., Positive Acknowledgement/Negative Acknowledgement (ACK/NACK) information, Channel State Information (CSI) information, Scheduling Request (SR), etc., for DL data may be transmitted. The GP provides a time gap in the process of switching the BS and the UE from the transmission mode to the reception mode or the process of switching from the reception mode to the transmission mode. Some symbols at a switching timing from DL to UL may be configured as GP.

Machine Type Communication (MTC)

MTC as a type of data communication including one or more machines and may be applied to Machine-to-Machine (M2M) or Internet-of-Things (IoT). Here, the machine is an entity that does not require direct human manipulation or intervention. For example, the machine includes a smart meter with a mobile communication module, a vending machine, a portable terminal having an MTC function, etc.

In 3GPP, the MTC may be applied from release 10 and may be implemented to satisfy criteria of low cost and low complexity, enhanced coverage, and low power consumption. For example, a feature for a low-cost MTC device is added to 3GPP Release 12 and to this end, UE category 0 is defined. UE category is an index indicating how many data the UE may process in a communication modem. The UE of UE category 0 uses a half-duplex operation having a reduced peak data rate and relieved radio frequency (RF) requirements, and a single receiving antenna to reduce baseband/RF complexity. In 3GPP Release 12, enhanced MTC (eMTC) is introduced and the MTC terminal is configured to operate only at 1.08 MHz (i.e., 6 RBs) which is a minimum frequency bandwidth supported in legacy LTE to further reduce a price and power consumption of the MTC UE.

In the following description, the MTC may be mixedly used with terms such as eMTC, LTE-M1/M2, Bandwidth reduced low complexity/coverage enhanced (BL/CE), non-BL UE (in enhanced coverage), NR MTC, enhanced BL/CE, etc., or other equivalent terms. Further, the MT CUE/device encompasses a UE/device (e.g., the smart meter, the vending machine, or the portable terminal with the MTC function) having the MTC function.

FIG. 17 illustrates MTC communication.

Referring to FIG. 17, the MTC device 100m as a wireless device providing the MTC may be fixed or mobile. For example, the MTC device 100m includes the smart meter with the mobile communication module, the vending machine, the portable terminal having the MTC function, etc. The base station 200m may be connected to the MTC device 100 by using radio access technology and connected to the MTC server 700 through a wired network. The MTC server 700 is connected to the MTC devices 100m and provides an MTC service to the MTC devices 100m. The service provided through the MTC has discrimination from a service in communication in which human intervenes in the related art and various categories of services including tracking, metering, payment, a medical field service, remote control, and the like may be provided. For example, services including electric meter reading, water level measurement, utilization of a monitoring camera, reporting of an inventory of the vending machine, and the like may be provided through the MTC. The MTC has a characteristic in that a transmission data amount is small and uplink/downlink data transmission/reception occurs occasionally. Accordingly, it is efficient to lower a unit price of the MTC device and reduce battery consumption according to a low data rate. The MTC device generally has low mobility, and as a result, the MTC has a characteristic in that a channel environment is hardly changed.

FIG. 18 illustrates physical channels used in MTC and general signal transmission using the same. In a wireless communication system, the MTC UE receives information from the BS through Downlink (DL) and the UE transmits information to the BS through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the BS (S1001). To this end, the UE receives a Primary Synchronization Signal (PSS) and a Secondary Synchronization Signal (SSS) from the BS to synchronize with the base station and obtain information such as a cell identifier (ID), etc. The PSS/SSS used for the initial cell search operation of the UE may be a PSS/SSS of the legacy LTE. Thereafter, the MTC UE may receive a Physical Broadcast Channel (PBCH) from the base station and obtain in-cell broadcast information (S1002). Meanwhile, the UE receives a Downlink Reference Signal (DL RS) in an initial cell search step to check a downlink channel state.

Upon completion of the initial cell search, the UE receives MTC PDCCH (MPDCCH) and PDSCH corresponding thereto to obtain more specific system information (S1102).

Thereafter, the UE may perform a random access procedure in order to complete an access to the base station (S1003 to S1006). Specifically, the UE may transmit a preamble through a Physical Random Access Channel (PRACH) (S1003) and receive a Random Access Response (RAR) for the preamble through the PDCCH and the PDSCH corresponding thereto (S1004). Thereafter, the UE may transmit a Physical Uplink Shared Channel (PUSCH) by using scheduling information in the RAR (S1005) and perform a Contention Resolution Procedure such as the PDCCH and the PDSCH corresponding thereto (S1006).

The UE that performs the aforementioned procedure may then perform reception of an MPDCCH signal and/or a PDSCH signal (S1107) and transmission of a physical uplink shared channel (PUSCH) signal and/or a physical uplink control channel (PUCCH) signal (S1108) as a general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc.

FIG. 19 illustrates cell coverage enhancement in MTC.

Various cell coverage extension techniques are being discussed in order to extend coverage extension or coverage enhancement (CE) of the base station for the MTC device 100m. For example, for the extension of the cell coverage, the base station/UE may transmit one physical channel/ signal over multiple occasions (a bundle of physical channels). Within a bundle section, the physical channel/signal may be repeatedly transmitted according to a pre-defined rule. A receiving apparatus may increase a decoding success rate of the physical channel/signal by decoding a part or the entirety of the physical channel/signal bundle. Here, the occasion may mean a resource (e.g., time/frequency) in which the physical channel/signal may be transmitted/received. The occasion for the physical channel/signal may include a subframe, a slot, or a symbol set in a time domain. Here, the symbol set may be constituted by one or more consecutive OFDM-based symbols. The OFDM-based symbols may include an OFDM(A) symbol and a DFT-s-OFDM (A) (=SC-FDM(A)) symbol. The occasion for the physical channel/signal may include a frequency band and an RB set in a frequency domain. For example, PBCH, PRACH, MPDCCH, PDSCH, PUCCH, and PUSCH may be repeatedly transmitted.

FIG. 20 illustrates a signal band for MTC.

Referring to FIG. 20, as a method for lowering the unit price of the MTC UE, the MTC may operate only in a specific band (or channel band) (hereinafter, referred to as an MTC subband or narrowband (NB)) regardless of a system bandwidth of a cell. For example, an uplink/downlink operation of the MTC UE may be performed only in a frequency band of 1.08 MHz. 1.08 MHz corresponds to 6 consecutive physical resource blocks (PRBs) in the LTE system is defined to follow the same cell search and random access procedures as the LTE UE. FIG. 20(a) illustrates a case where an MTC subband is configured at a center (e.g., 6 PRBs) of the cell and FIG. 20(b) illustrates a case where a plurality of MTC subbands is configured in the cell. The plurality of MTC subbands may be consecutively/inconsecutively configured in the frequency domain. The physical channels/signals for the MTC may be transmitted/received in one MTC subband. In the NR system, the MTC subband may be defined by considering a frequency range and a subcarrier spacing (SCS). As an example, in the NR system, a size of the MTC subband may be defined as X consecutive PRBs (i.e., a bandwidth of 0.18*X*(2^u) MHz) (see Table 3 for u). Here, X may be defined as 20 according to the size of a Synchronization Signal/Physical Broadcast Channel (SS/PBCH). In the NR system, the MTC may operate in at least one bandwidth part (BWP). In this case, the plurality of MTC subbands may be configured in the BWP.

FIG. 21 illustrates scheduling in legacy LTE and MTC.

Referring to FIG. 21, in the legacy LTE, the PDSCH is scheduled by using the PDCCH. Specifically, the PDCCH may be transmitted in first N OFDM symbols in the subframe (N=1 to 3) and the PDSCH scheduled by the PDCCH is transmitted in the same subframe. Meanwhile, in the MTC, the PDSCH is scheduled by using the MPDCCH. As a result, the MTC UE may monitor an MPDCCH candidate in a search space in the subframe. Here, monitoring includes blind-decoding the MPDCCH candidates. The MPDCCH transmits the DCI and the DCI includes uplink or downlink scheduling information. The MPDCCH is FDM-multiplexed with the PDSCH in the subframe. The MPDCCH is repeatedly transmitted in a maximum of 256 subframes and the DCI transmitted by the MPDCCH includes information on the number of MPDCCH repetitions. In the case of downlink scheduling, when repeated transmission of the MPDCCH ends in subframe #N, the PDSCH scheduled by the MPDCCH starts to be transmitted in subframe #N+2. The PDSCH may be repeatedly transmitted in a maximum of 2048 subframes. The MPDCCH and the PDSCH may be transmitted in different MTC subbands. As a result, the MTC UE may perform radio frequency (RF) retuning for receiving the PDSCH after receiving the MPDCCH. In the case of uplink scheduling, when repeated transmission of the MPDCCH ends in subframe #N, the PUSCH scheduled by the MPDCCH starts to be transmitted in subframe #N+4. When the repeated transmission is applied to the physical channel, frequency hopping is supported between different MTC subbands by the RF retuning. For example, when the PDSCH is repeatedly transmitted in 32 subframes, the PDSCH may be transmitted in a first MTC subband in first 16 subframes and the PDSCH may be transmitted in a second MTC subband in 16 remaining subframes. The MTC operates in a half duplex mode. HARQ retransmission of the MTC is an adaptive asynchronous scheme.

Narrowband Internet of Things (NB-IoT)

NB-IoT represents a narrow-band Internet of Things technology that supports a low-power wide area network through a legacy wireless communication system (e.g., LTE, NR). In addition, the NB-IoT may refer to a system for supporting low complexity and low power consumption through a narrowband. The NB-IoT system uses OFDM parameters such as subcarrier spacing (SCS) in the same manner as the legacy system, so that there is no need to separately allocate an additional band for the NB-IoT system. For example, one PRB of the legacy system band may be allocated for the NB-IoT. Since the NB-IoT UE recognizes a single PRB as each carrier, the PRB and the carrier may be interpreted as the same meaning in the description of the NB-IoT.

Hereinafter, the description of the NB-IoT mainly focuses on a case where the description of the NB-IoT is applied to the legacy LTE system, but the description below may be extensively applied even to a next generation system (e.g., NR system, etc.). Further, in the present disclosure, contents related to the NB-IoT may be extensively applied to MTC which aims for similar technical purposes (e.g., low-power, low-cost, coverage enhancement, etc.). Further, the NB-IoT may be replaced with other equivalent terms such as NB-LTE, NB-IoT enhancement, enhanced NB-IoT, further enhanced NB-IoT, NB-NR, and the like.

FIG. 22 illustrates physical channels used in NB-IoT and general signal transmission using the same. In the wireless communication system, the UE receives information from the base station through Downlink (DL) and the UE transmits information to the base station through Uplink (UL). The information which the base station and the UE transmit and receive includes data and various control information and there are various physical channels according to a type/use of the information which the base station and the UE transmit and receive.

A UE that is powered on again while being powered off or enters a new cell performs an initial cell search operation such as synchronizing with the base station (S11). To this end, the UE receives a Narrowband Primary Synchronization Signal (NPSS) and a Narrowband Secondary Synchronization Signal (NSSS) from the base station to synchronize with the BS and obtain information such as a cell identifier (ID), etc. Thereafter, the UE receives a Narrowband Physical Broadcast Channel (NPBCH) from the base station to obtain in-cell broadcast information (S12). Meanwhile, the UE receives a Downlink Reference Signal (DL RS) in an initial cell search step to check a downlink channel state.

Upon completion of the initial cell search, the UE receives Narrowband PDCCH (NPDCCH) and Narrowband PDSCH (NPDSCH) corresponding thereto to obtain more specific system information in step S12 (S12).

Thereafter, the UE may perform a random access procedure in order to complete an access to the BS (S13 to S16). Specifically, the UE may transmit a preamble through a Narrowband Physical Random Access Channel (NPRACH) (S13) and receive the Random Access Response (RAR) for the preamble through the NPDCCH and the NPDSCH corresponding thereto (S14). Thereafter, the UE may transmit a Narrowband Physical Uplink Shared Channel (NPUSCH) by using scheduling information in the RAR (S15) and perform a Contention Resolution Procedure such as the NPDCCH and the NPDSCH corresponding thereto (S16).

The UE that performs the aforementioned procedure may then perform reception of the NPDCCH signal and/or NPDSCH signal (S17) and NPUSCH transmission (S18) as the general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc. In the NB-IoT, the UCI is transmitted through the NPUSCH. According to the request/instruction of the network (e.g., base station), the UE may transmit the UCI through the NPUSCH periodically, aperiodically, or semi-persistently.

An NB-IoT frame structure may be configured differently according to the subcarrier spacing (SCS). FIG. 23 illustrates a frame structure when a subframe spacing is 15 kHz and FIG. 24 illustrates a frame structure when a subframe spacing is 3.75 kHz. The frame structure of FIG. 23 may be used in downlink/uplink and the frame structure of FIG. 24 may be used only in uplink.

Referring to FIG. 23 the NB-IoT frame structure for the subcarrier spacing of 15 kHz may be configured to be the same as the frame structure of the legacy system (i.e., LTE system). That is, a 10-ms NB-IoT frame may include ten 1-ms NB-IoT subframes and a 1-ms NB-IoT subframe may include two 0.5-ms NB-IoT slots. Each 0.5-ms NB-IoT slot may include seven symbols. The 15-kHz subcarrier spacing may be applied to both downlink and uplink. The symbol includes an OFDMA symbol in downlink and an SC-FDMA symbol in uplink. In the frame structure of FIG. 23, the system band is 1.08 MHz and is defined by 12 subcarriers. The 15-kHz subcarrier spacing is applied to both downlink and uplink and orthogonality with the LTE system is guaranteed, and as a result, coexistence with the LTE system may be facilitated.

Meanwhile, referring to FIG. 24, when the subcarrier spacing is 3.75 kHz, the 10-ms NB-IoT frame may include five 2-ms NB-IoT subframes, and the 2-ms NB-IoT subframe may include seven symbols and one guard period (GP) symbol. The 2-ms NB-IoT subframe may be expressed as an NB-IoT slot or an NB-IoT resource unit (RU). Here, the symbol may include the SC-FDMA symbol. In the frame structure of FIG. 25, the system band is 1.08 MHz and is defined by 48 subcarriers. The subcarrier spacing of 3.75 kHz may be applied only to the uplink and the orthogonality with the LTE system may be impaired, resulting in performance degradation due to interference.

The figure may illustrate an NB-IoT frame structure based on an LTE system frame structure and the illustrated NB-IoT frame structure may be extensively applied even to the next-generation system (e.g., NR system). For example, in the frame structure of FIG. 23, the subframe interval may be replaced with the subframe interval of Table 3.

FIG. 25 illustrates three operation modes of NB-IoT. Specifically, FIG. 25(a) illustrates an in-band system, FIG. 25(b) illustrates a guard-band system, and FIG. 25(c) illustrates a stand-alone system. Here, the in-band system may be expressed as an in-band mode, the guard-band system may be expressed as guard-band mode, and the stand-alone system may be expressed as a stand-alone mode. For convenience, the NB-IoT operation mode is described based on the LTE band, but the LTE band may be replaced with a band of another system (e.g., NR system band).

The in-band mode means an operation mode to perform the NB-IoT in the (legacy) LTE band. In the in-band mode, some resource blocks of an LTE system carrier may be allocated for the NB-IoT. For example, in the in-band mode, specific 1 RB (i.e., PRB) in the LTE band may be allocated for the NB-IoT. The in-band mode may be operated in a structure in which the NB-IoT coexists in the LTE band. The guard-band mode means an operation mode to perform the NB-IoT in a reserved space for the guard-band of the (legacy) LTE band. Accordingly, in the guard-band mode, the guard-band o the LTE carrier not used as the resource block in the LTE system may be allocated for the NB-IoT. The (legacy) LTE band may have a guard-band of at least 100 kHz at the end of each LTE band. The stand-alone mode means an operation mode to perform the NB-IoT in a frequency band independently from the (legacy) LTE band. For example, in the stand-alone mode, a frequency band (e.g., a GSM carrier to be reallocated in the future) used in a GSM EDGE Radio Access Network (GERAN) may be allocated for the NB-IoT.

The NB-IoT UE searches an anchor carrier in units of 100 kHz and in the in-band and the guard-band, a center frequency of the anchor carrier should be located within ±7.5 kHz from a 100 kHz channel raster. Further, six center PRBs among LTE PRBs are not allocated to the NB-IoT. Accordingly, the anchor carrier may be located only in a specific PRB.

FIG. 26 illustrates a layout of an in-band anchor carrier at an LTE bandwidth of 10 MHz.

Referring to FIG. 26, a direct current (DC) subcarrier is located in the channel raster. Since a center frequency spacing between adjacent PRBs is 180 kHz, the center frequency is located at ±2.5 kH from the channel raster in the case of PRB indexes 4, 9, 14, 19, 30, 35, 40, and 45. Similarly, the center frequency of the PRB suitable as the anchor carrier at an LTE bandwidth of 20 MHz is located at ±2.5 kHz from the channel raster and the center frequency of the PRB suitable as the anchor carrier at LTE bandwidths of 3 MHz, 5 MHz, and 15 MHz is located at ±7.5 kHz from the channel raster.

In the case of the guard-band mode, the center frequency is located at ±2.5 kHz from the channel raster in the case of a PRB immediately adjacent to an edge PRB of LTE at the bandwidths of 10 MHz and 20 MHz. In the case of the bandwidths 3 MHz, 5 MHz, and 15 MHz, a guard frequency band corresponding to three subcarriers from the edge PRB is used to locate the center frequency of the anchor carrier at ±7.5 kHz from the channel raster.

The anchor carrier of the stand-alone mode may be aligned in the 100 kHz channel raster and all GSM carriers including a DC carrier may be used as the NB-IoT anchor carrier.

The NB-IoT may support multi-carriers and combinations of in-band and in-band, in-band and guard-band, guard band and guard-band, and stand-alone and stand-alone may be used.

In NB-IoT downlink, physical channels such as a Narrowband Physical Broadcast Channel (NPBCH), a Narrowband Physical Downlink Shared Channel (NPDSCH), and a Narrowband Physical Downlink Control Channel (NPDCCH) are provided and physical signals such as a Narrowband Primary Synchronization Signal (NPSS), a Narrowband Primary Synchronization Signal (NSSS), and a Narrowband
Reference Signal (NRS) are provided.

The NPBCH transfers, to the UE, a Master Information Block-Narrowband (MIB-NB) which is minimum system information which the NB-IoT requires for accessing the system. The NPBCH signal may be repeatedly transmitted eight times in total for coverage enhancement. A Transport Block Size (TBS) of the MIB-NB is 34 bits and is newly updated every 64 ms TTI period. The MIB-NB includes information such as an operation mode, a System Frame Number (SFN), a Hyper-SFN, the number of Cell-specific Reference Signal (CRS) ports, a channel raster offset, etc.

NPSS is configured by a Zadoff-Chu (ZC) sequence with a sequence length of 11 and a root index of 5. The NPSS may be generated according to the following equation.

$$d_l(n) = S(l) \cdot e^{-j\frac{\pi u n(n+1)}{11}}, n = 0, 1, \ldots, 10 \quad \text{[Equation 1]}$$

Here, S(I) for OFDM symbol index I may be defined as in Table 5.

TABLE 5

| Cyclic prefix length | S(3) ... S(13) |
|---|---|
| Normal | 1  1  1  1  −1  −1  1  1  1  −1  1 |

NSSS is constituted by a combination of a ZC sequence with a sequence length of 131 and a binary scrambling sequence such as a Hadamard sequence. The NSSS indicates PCID to NB-IoT UEs in the cell through the combination of the sequences.

The NSSS may be generated according to the following equation.

$$d(n) = b_q(m) e^{-j2\pi\theta_f n} e^{-j\frac{\pi u n'(n'+1)}{131}} \quad \text{[Equation 2]}$$

Here, variables applied to Equation 2 may be defined as follows.

$$n = 0, 1, \ldots, 131 \quad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

Here, the binary sequence $b_q(m)$ is defined as in Table 6, and $b_0(m)$ to $b_3(m)$ correspond to columns 1, 32, 64, and 128 of the 128-th Hadamard matrix, respectively.

The cyclic shift of for the frame number of may be defined as in Equation 4.

TABLE 6

| q | $b_q(0) \ldots b_q(127)$ |
|---|---|
| 0 | [1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 −1 1 −1 1 1 −1 1 −1 −1<br>1 1 −1 1 −1 1 1 1 −1 −1 1 1 −1 −1 1 −1 1 1 1 −1 1 1 −1 −1<br>1 −1 1 1 1 −1 1 −1 1 1 1 −1 1 1 −1 1 −1 −1 1 −1 1<br>1 −1 −1 1 1 1 −1 1 −1 −1 1 1 −1 1 −1 −1 1 1 1 −1 1 −1 1 1 1 −1 1<br>1 1 −1 1 −1 −1 1 −1 1 1 −1 1 1 1 −1 1 1 −1 −1 1 −1 −1 1 −1 1<br>1 −1 −1 1 1 1 −1 −1 1 1 1 −1 1]|
| 2 | [1 −1 −1 1 −1 1 1 1 −1 −1 1 1 1 −1 −1 1 1 −1 −1 1 1 1 −1 −1 1<br>1 1 −1 −1 1 1 −1 1 1 1 −1 1 1 1 −1 1 1 −1 −1 1 −1 −1 1 −1 1<br>1 −1 1 −1 −1 1 1 1 −1 1 1 1 −1 1 −1 −1 1 1 1 −1 −1 1 −1 1<br>1 −1 −1 1 1 1 −1 1 −1 −1 1 1 −1 1 1 −1 1 −1 1 −1 1<br>1 1 −1 −1 1 1 1 −1 −1 1 1 1 −1 −1 1 −1 1 1 −1 −1 1 −1 1<br>1 1 −1 −1 1 1 1 −1 1 −1 1 1]|
| 3 | [1 −1 −1 1 −1 1 1 1 −1 1 1 1 −1 −1 1 1 −1 1 −1 −1 1 1 −1 1 −1 −1<br>1 1 −1 −1 1 1 −1 1 1 1 −1 1 1 1 −1 1 1 1 −1 1 −1 −1 1<br>1 −1 1 −1 −1 1 1 1 −1 1 1 1 −1 1 −1 −1 1 1 1 −1 1 1 1 −1 −1 −1<br>1 1 −1 −1 1 1 −1 1 1 −1 1 1 −1 −1 1 −1 1 1 1 −1 −1 1<br>1 1 −1 −1 1 1 −1 1 1 1 −1 −1 1 1 −1 1 −1 −1 1 −1 1<br>1 −1 −1 1 1 1 −1 −1 1 1 1 −1 1 1 −1]|

$$\theta_f = \frac{33}{132}(n_f/2) \bmod 4 \quad \text{[Equation 4]}$$

Here, of represents a radio frame number. mod represents a modulo function.

A downlink physical channel/signal includes NPSS, NSSS, NPBCH, NRS, NPDCCH, and NPDSCH.

FIG. 27 illustrates transmission of an NB-IoT downlink physical channel/signal in an FDD LTE system. The downlink physical channel/signal is transmitted through one PRB and supports 15 kHz subcarrier spacing/multi-tone transmission.

Referring to FIG. 27, the NPSS is transmitted in a $6^{th}$ subframe of every frame and the NSSS is transmitted in a last (e.g., $10^{th}$) subframe of every even frame. The UE may obtain frequency, symbol, and frame synchronization using the synchronization signals (NPSS and NSSS) and search 504 physical cell IDs (PCIDs) (i.e., base station IDs). The NPBCH is transmitted in a first subframe of every frame and transports the NB-MIB. The NRS is provided as a reference signal for downlink physical channel demodulation and is generated in the same scheme as the LTE. However, Physical Cell ID (NB-PCID) (or NCell ID or NB-IoT base station ID) is used as an initialization value for NRS sequence generation. The NRS is transmitted through one or two antenna ports. The NPDCCH and the NPDSCH may be transmitted in the remaining subframes except for the NPSS/NSSS/NPBCH. The NPDCCH and the NPDSCH may be transmitted together in the same subframe. The NPDCCH transports the DCI and the DCI supports three types of DCI formats. DCI format N0 includes Narrowband Physical Uplink Shared Channel (NPUSCH) scheduling information and DCI formats N1 and N2 include NPDSCH scheduling information. The NPDCCH may be repeatedly transmitted 2048 times in total for coverage enhancement. The NPDSCH is used for transmitting data (e.g., TB) of transmission channels such as a Downlink-Shared Channel (DL-SCH) and a Paging Channel (PCH). The maximum TBS is 680 bits and may be repeatedly transmitted 2048 times in total for coverage enhancement.

The uplink physical channel includes a Narrowband Physical Random Access Channel (NPRACH) and the NPUSCH and supports single-tone transmission and multi-tone transmission. The single-tone transmission is supported for the subcarrier spacings of 3.5 kHz and 15 kHz and the multi-tone transmission is supported only for the subcarrier spacing of 15 kHz.

FIG. 28 illustrates an NPUSCH format.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports the single-/multi-tone transmission, and NPUSCH format 2 supports only the single-tone transmission. In the case of the single-tone transmission, pi/2-Binary Phase Shift Keying (BPSK) and pi/4-Quadrature Phase Shift Keying (QPSK) are used to reduce Peat-to-Average Power Ratio (PAPR). In the NPUSCH, the number of slots occupied by one resource unit (RU) may vary according to resource allocation. The RU represents the smallest resource unit to which the TB is mapped, and is constituted by NULsymb*NULslots consecutive SC-FDMA symbols in the time domain and NRUsc consecutive subcarriers in the frequency domain. Here, NULsymb represents the number of SC-FDMA symbols in the slot, NULslots represents the number of slots, and NRUsc represents the number of subcarriers constituting the RU.

Table 7 shows the configuration of the RU according to the NPUSCH format and subcarrier spacing. In the case of TDD, the supported NPUSCH format and SCS vary according to the uplink-downlink configuration. Table 2 may be referred to for the uplink-downlink configuration.

TABLE 7

| NPUSCH format | Subcarrier spacing | Supported uplink-downlink configurations | $N^{RU}_{sc}$ | $N^{UL}_{slots}$ | $UL_{symb}$ |
|---|---|---|---|---|---|
| 1 | 3.75 kHz | 1, 4 | 1 | 16 | |
| | 15 kHz | 1, 2, 3, 4, 5 | 1 | 16 | |
| | | | 3 | 8 | |
| | | | 6 | 4 | |
| | | | 12 | 2 | |
| 2 | 3.75 kHz | 1, 4 | 1 | 4 | |
| | 15 kHz | 1, 2, 3, 4, 5 | 1 | 4 | |

Scheduling information for transmission of UL-SCH data (e.g., UL-SCH TB) is included in DCI format NO, and the DCI format NO is transmitted through the NPDCCH. The DCI format NO includes information on the start time of the NPUSCH, the number of repetitions, the number of RUs used for TB transmission, the number of subcarriers, resource locations in the frequency domain, and MCS.

Referring to FIG. 28, DMRSs are transmitted in one or three SC-FDMA symbols per slot according to the NPUSCH format. The DMRS is multiplexed with data (e.g., TB, UCI), and is transmitted only in the RU including data transmission.

FIG. 29 illustrates an operation when multi-carriers are configured in FDD NB-IoT.

In FDD NB-IoT, a DL/UL anchor-carrier may be basically configured, and a DL (and UL) non-anchor carrier may be additionally configured. Information on the non-anchor carrier may be included in RRCConnectionReconfiguration. When the DL non-anchor carrier is configured (DL add carrier), the UE receives data only in the DL non-anchor carrier. On the other hand, synchronization signals (NPSS and NSSS), broadcast signals (MIB and SIB), and paging signals are provided only in the anchor-carrier. When the DL non-anchor carrier is configured, the UE listens only to the DL non-anchor carrier while in the RRC_CONNECTED state. Similarly, when the UL non-anchor carrier is configured (UL add carrier), the UE transmits data only in the UL non-anchor carrier, and simultaneous transmission on the UL non-anchor carrier and the UL anchor-carrier is not allowed. When the UE is transitioned to the RRC_IDLE state, the UE returns to the anchor-carrier.

FIG. 29 illustrates a case where only the anchor-carrier is configured for UE1, the DL/UL non-anchor carrier is additionally configured for UE2, and the DL non-anchor carrier is additionally configured for UE3. As a result, carriers in which data is transmitted/received in each UE are as follows.

UE1: Data reception (DL anchor-carrier) and data transmission (UL anchor-carrier)

UE2: Data reception (DL non-anchor-carrier) and data transmission (UL non-anchor-carrier)

UE3: Data reception (DL non-anchor-carrier) and data transmission (UL anchor-carrier)

The NB-IoT UE may not transmit and receive at the same time, and the transmission/reception operations are limited to one band each. Therefore, even if the multi-carrier is configured, the UE requires only one transmission/reception chain of the 180 kHz band.

The present disclosure relates to a method for monitoring a search space (SS) through a preconfigured uplink resource (PUR), and an apparatus therefor.

In the present disclosure, the preconfigured uplink resource (PUR) means an uplink transmission resource which a user equipment (UE) is preconfigured with from a base station through higher layer signaling in an RRC connected state in order to perform uplink transmission without a UL grant in an RRC idle state. That is, the PUR may be interpreted as including an operation and a procedure in which the UE in the RRC connected state is allocated with an uplink (UL) transmission resource in advance, and a UE of which state is transitioned to a specific state for uplink transmission through the PUR in the RRC connected state performs the UL transmission from the allocated UL resource. The specific state may be one of an RRC idle state or an RRC inactive state.

In the present disclosure, an operation in which the UE transmits a UL signal by using the PUR may be briefly expressed as 'PUR transmission'. Further, in the present disclosure, a search space (SS) for the UE to monitor information related to a downlink feedback, UL grant downlink control information (DCI), downlink (DL) assignment DCI, etc., will be referred to as PUR SS. Here, the information related to the downlink feedback may include information for a hybrid automatic repeat request (HARQ) operation, etc. Further, UL grant DCI may be control information scheduling of a resource for uplink transmission of the UE, and DL assignment DCI may be control information for scheduling of a resource for downlink transmission of the BS.

Further, in the present disclosure, a predetermined time interval in which the UE monitors a machine type communication physical downlink control channel (MPDCCH) related to the PUR transmission will be referred to as a PUR SS window.

Further, in the present disclosure, in the case of the UE in the RRC idle state, the UE may be construed as performing the PUR transmission when a timing advance (TA) is valid. The timing advance may mean a parameter related to the uplink transmission timing of the UE.

The PUR may be periodically configured through configuration parameters such as a start point, a period, and a transmission interval.

That is, the UE may perform the PUR transmission on the PUR resource periodically assigned based on the configuration parameters.

For example, when the PUR is periodically configured to the UE, each of the PUR resources configured to the UE may be represented as { . . . , PUR #n, PUR #n+1, . . . }. In this case, there may be a PUR occasion in which the UL transmission is available every PUR resource at each period. One or more PUR occasions may exist in one PUR resource.

FIG. 30 is a diagram illustrating an example of a scheme of configuring a PUR resource to a UE.

A UE receives, from a BS, PUR configuration information including configuration parameters for PUR transmission (3010) to be assigned with a PUR 3000. The PUR 3000 may include at least one PUR resource (3030 to 3050). Here, each of the at least one PUR resource may be assigned every predetermined period T, and may be represented as PUR #1 and PUR #2. Further, the UE may perform the PUR transmission in one or more PUR occasions in each of the at least one PUR resource. The UE may repeatedly perform the PUR transmission based on a parameter for a repetition transmission number included in the PUR configuration information. When the PUR transmission is repeatedly performed, the PUR occasion may be given as a time interval having a predetermined length in which PUR repetition transmission may be performed.

During the PUR transmission of the UE, a PUR configuration parameter(s) configured to the UE may be updated by a need of a communication environment or a BS/network. The update of the PUR configuration parameter may be referred to as a PUR configuration update. The update of the PUR configuration parameter(s) may be performed Layer 1 (L1) signaling. Alternatively, the update of the PUR configuration parameter(s) may be performed medium access control control element (MAC CE) or radio resource control (RRC) signaling. The update through the L1 signaling may mean an update through the DCI. The PUR configuration parameter(s) may mean a parameter(s) related to the PUR configuration for the PUR operation of the UE. Hereinafter, the PUR configuration parameter(s) may be used as the same meaning as the parameter(s) related to the PUR configuration.

FIG. 31 is a diagram illustrating an example of an operation of updating a PUR configuration of the UE.

A UE receives, from a BS, PUR configuration information including configuration parameters for PUR transmission (3110) to be assigned with a PUR 3100. The PUR 3100 may include at least one PUR resource (3130 to 3180). Here, each of the at least one PUR resource may be assigned every predetermined period T1 or T2, and may be represented as PUR #1 and PUR #2. Further, the UE may perform the PUR transmission in one or more PUR occasions in each of the at least one PUR resource.

When a PUR configuration parameter(s) configured based on PUR configuration information 3110 needs to be updated by the need of the communication environment or the BS/network, the UE may receive an L1 signaling (MAC CE) or a radio resource control (RRC) signaling indicating the update of the PUR configuration parameters based on the PUR configuration information 3110 (3120).

The PUR configuration parameters may be updated based on the signaling indicating the update of the PUR configuration parameters, and the UE may perform the PUR transmission based on the updated PUR configuration parameters. PUR resources 3160 to 3180 to which the updated PUR configuration parameters are applied may be assigned to the UE at a predetermined period of T2. The UE may perform the PUR transmission in each of the PUR resources 3160 to 3190 to which the updated PUR configuration parameters are applied.

Even in the PUR resources 3130 to 3180 included in the PUR 3100, the PUR transmission may be repeatedly performed as in the example of FIG. 30, of course.

Contents described by referring to FIG. 31 above are just one example for helping understanding of the method provided in the present disclosure, and the methods provided in the present disclosure are not limited by the descried contents.

The PUR resource and the PUR SS resource may be independently configured. That is, the PUR resource and the PUR SS resource may be configured to have different periods and start points.

In the present disclosure, a serving-cell may mean a cell configuring the PUR and/or a cell receiving the UL transmission through the PUR.

Hereinafter, 'PUR' may be a meaning including both a dedicated PUR configured only to a specific UE with no contention between the UEs and a shared PUR equally configured to multiple UE and shared among multiple UEs. Alternatively, the 'PUR' may mean only the shared PUR. Alternatively, the 'PUR' may mean only the dedicated PUR.

Hereinafter, 'PDCCH' may mean a general physical control channel, and may be used as a meaning including MPDCCH, NPDCCH, etc. Further, 'physical downlink shared channel (PDSCH)' may mean a general physical downlink shared channel, and may be used as a meaning including NPDSCH. Further, 'physical uplink shared channel (PDSCH)' may mean a general physical uplink shared channel, and may be used as a meaning including NPUSCH.

Further, in the present disclosure, LTE MTC Physical Downlink Control Channel (MPDCCH) may be used as a meaning including PDCCH, NB-IoT Physical Downlink Control Channel (NPDCCH), etc. Further, the PDSCH may mean a general Physical Downlink Shared CHannel, and include NPDSCH. Further, SIB1-BR may be extended to a term such as SIB, SIB1-NB, etc.

In the present disclosure, 'early positive acknowledgement (ACK)' means an operation of the BS/network transmitting uplink HARQ ACK feedback information through the MPDCCH before uplink repetition transmission of the UE is completed for a purpose of power saving when the BS/network successfully decodes an uplink signal transmitted by the UE before completion of the uplink repetition transmission of the UE during uplink repetition transmission of the UE. Hereinafter, for convenience of description, PUR SS may be construed as a concept including MPDCCH SS, NPDCCH, etc.

The present disclosure relates to a method for designing the PUR SS and a method for monitoring the PUR SS by the UE.

Hereinafter, the method for supporting the uplink transmission through the PUR and procedures therefor will be described in detail.

PUR Search Space Monitoring Method—(Method 1)

The PUR SS may be temporally defined by a start time and a period, a search space duration based on an absolute time or an absolute subframe index. Here, a PUR SS window or a PUR SS monitoring interval (duration) for monitoring the PUR SS may be determined based on a PUR transmission timing. More specifically, the PUR SS window or the PUR SS monitoring interval (duration) may be relatively determined based on a subframe in which a time interval (duration) performing the PUR transmission starts or a last subframe of the time interval (duration) performing the PUR transmission.

For the PUR SS monitoring of the UE, the PUR SS window or the PUR SS monitoring interval (duration) may be defined through two following methods.

(Proposal 1) Definition of PUR SS Monitoring Interval (Duration) Through Timer Based on PUR Transmission The proposal relates to a method for defining the PUR SS monitoring interval (duration) after a predetermined time interval (duration) from a PUR transmission completion time of the UE. Further, in the proposal, the PUR SS monitoring interval (duration) may also be defined after a predetermined time interval (duration) from a time before the PUR transmission of the UE.

In PUR SS monitoring related to specific PUR transmission, an end timing may be a timing when a value of the timer reaches a specific value for the end of the PUR SS monitoring. For example, when an initial value of the timer is configured to a specific value (value X), after the start of the timer in which the initial value is configured, the value of the timer increases or decreases based on the initial value and reaches a specific value (value Y) of the end of the timer, the PUR SS monitoring of the UE may end.

When the UE fails to receive the HARQ feedback from the BS during an interval (duration) in which the timer starts at the initial value and reaches the specific value for the end of the timer (timer interval), the UE may assume (recognize) non-reception of the HARQ feedback as ACK or NACK.

More specifically, (1) in a case where the UE fails to receive, from the BS, the HARQ feedback for the PUR transmission during the time interval (duration) (within the interval (duration)), the UE may be preconfigured through an RRC message to recognize the case as ACK. (2) Thereafter, when the UE performs the PUR transmission and fails to receive the HARQ feedback itself for the PUR transmission from the BS, the UE may recognize the non-reception of the HARQ feedback as NACK reception. (3) Thereafter, the UE may assume receiving the NACK from the BS and may perform an additional operation (e.g., PUR retransmission, etc.).

On the contrary, (1) in a case where the UE fails to receive, from the BS, the HARQ feedback for the PUR transmission during the time interval (duration) (within the interval (duration)), the UE may be preconfigured through an RRC message to recognize the case as NACK. (2) Thereafter, when the UE performs the PUR transmission and fails to receive the HARQ feedback itself for the PUR transmission from the BS, the UE may recognize the non-reception of the HARQ feedback as NACK reception. (3) Thereafter, the UE may assume receiving the NACK from the BS and may perform an additional operation (e.g., PUR retransmission, etc.).

When the UE receives DCI for the UL grant indicating the PUR retransmission or DL assignment DCI for scheduling the PDSCH during the timer interval (duration), the value of the timer may be reset. In this case, the value of the timer after the reset may be configured to the value X.

When there is only a partial search space in the PUR SS monitoring interval (duration) defined based on the timer, the UE may regard that only the partial search space included is included in the PUR SS monitoring interval (duration) and blind decoding may be completed for only the partial PUR SS included. Alternatively, the UE may not perform the PUR SS monitoring for only the partial search space included for power saving.

FIG. 32 is a diagram illustrating an example in which the UE performs PUR search space monitoring in a PUR search space monitoring interval (duration) defined based on a timer.

Referring to FIG. 32, the UE performs PUR transmission in a PUR resource 3210. Thereafter, the UE performs monitoring of a PUR SS 3220 in a PUR SS monitoring interval (duration) 3200 defined based on a timer. Only a partial PUR SS 3220 is included in the PUR SS monitoring interval (duration) 3200. The UE may recognize that PUR SS #1 3220 of which only a part is included in the PUR SS monitoring interval (duration) belongs to the PUR SS monitoring interval (duration), and perform monitoring (blind decoding) for the PUR SS 3220. Alternatively, the UE may recognize that the PUR SS 3220 of which only a part is included in the PUR SS monitoring interval (duration) 3200 does not belong to the PUR SS monitoring interval (duration), and not perform monitoring (blind decoding) for PUR SS #3230. As another example, the UE may determine whether to perform the monitoring for the PUR SS 3220 based on a ratio of the PUR SS 3220 included in the PUR SS monitoring interval (duration). That is, when a predetermined ratio or more to an entire interval (duration) of the PUR SS 3220 is included in the PUR SS monitoring interval (duration), the UE may perform the monitoring for the PUR SS 3220 and in an opposite case, the UE may not perform the monitoring for the PUR SS 3220. A value related to the predetermined ratio may be preconfigured to the UE through a higher layer signaling.

The contents described by referring to FIG. 32 above are just one example for helping understanding of the method provided in the present disclosure, and the methods provided in the present disclosure are not limited by the descried contents.

A time unit of a timer based PUR SS monitoring interval (duration) may be defined by a system time unit, an Rmax (the maximum repetition number of MPDCCH), unit or a search space number unit. The system time T may be (1/(15000*2048)) seconds).

A timer value(s) (may be the value X and/or value Y) for defining the PUR SS monitoring interval (duration) may be configured differently for each CE mode. As an example, in the case of coverage enhancement (CE) mode B, the timer values may be configured so that an absolute value of (X-Y) has a large value.

(Proposal 2) Definition of PUR SS Window for PUR SS Monitoring

The proposal may be similar to a method for defining an RAR window for monitoring a random access response (RAR) message in a random access procedure.

A start point of the PUR SS window may be configured as a timing after a specific time from a specific timing after PUR transmission. Here, the specific time may be a time corresponding to X subframes.

The PUR SS window may be defined as a specific time interval (duration) linked with a PUR interval (duration) similarly to the RAR window. The specific time interval (duration) may be configured to the number of search spaces or a unit of a search space period. The search space period may be expressed as Rmax*G, and Rmax may become one value of subframes {1, 2, 4, 8, 16, 32, 64, 128, 256}, and G may become one value of {1, 1.5, 2, 2.5, 4, 5, 8, 10}.

The number of search spaces for determining a PUR SS window size may include only an MPDCCH SS for which the UE actually monitors feedback information of the BS for the PUR transmission. In this case, when due to a collision between a specific PUR SS and an MPDCCH SS for a different purpose, monitoring for the specific PUR SS is skipped/dropped or postponed, an absolute time of the PUR SS window may be extended as large as the number of PUR SSs which are skipped/dropped or postponed. The MPDCCH SS for the different purpose may be an MPDCCH SS not related to the PUR transmission.

The PUR SS window may be configured differently for each CE mode. For example, the UE may be configured to monitor more PUR SSs in CE mode B than PUR SSs in CE mode A. That is, since the repetition transmission number in the case of CE mode B may be configured larger than that in the case of CE mode A, it may be preferable that more PUR SSs in CE mode B are configured to be monitored than PUR SSs in CE mode A.

After the PUR transmission of the UE, when the UE receives the DL assignment DCI through the PUR SS within the PUR SS window, the PUR SS window may be automatically extended. That is, the PUR SS window may be automatically extended for monitoring for the PDSCH based on the DL assignment DCI. An operation of automatically extending the PUR SS window based on DL assignment DCI reception may be applied only to a case of supporting PDSCH scheduling through the PUR SS of the BS. The PUR SS window may be automatically extended based on the DL assignment DCI reception for a purpose of extending the MPDCCH monitoring interval (duration) for supporting DL HARQ. Further, an operation of automatically extending the PUR SS window based on DL assignment DCI reception may be applied only to a case of supporting a DL HARQ operation for the PDSCH scheduled based on the DL assignment DCI.

(Proposal 3) PUR SS Monitoring Method of UE when Skipping PUR Transmission

When there is no UL data for the PUR transmission at a PUR transmission timing (PUR transmission occasion) of the UE, UL skipping of the UE may not be permitted for power saving. The UL skipping may mean that the UE drops the PUR transmission on the PUR resource (or at the PUR transmission occasion on the PUR resource).

Even when the UL skipping is performed, the monitoring for the PUR SS may be requested in two following aspects.
 (Case 1) PUR configuration update (using L1 signaling or RRC signaling)
 (Case 2) DL transmission using PUR transmission window In the case of (Case 1), the UE performs the PUR SS monitoring even when there is no UL data for the PUR transmission, and as a result, the UE may performs the PUR configuration, thereby preventing a TA validation fail. Accordingly, the UE may not enter legacy early data transmission or a legacy RACH procedure for TA reacquisition.

When the UE skips the PUR transmission, whether the PUR SS monitoring is performed may be determined based on a situation of the BS/network or a UE type. Even when the UE skips the PUR transmission, indication information regarding whether the PUR SS monitoring is performed may be indicated to the UE through the higher layer signaling in a form of a 1-bit flag. For example, when the indication information indicates '0', the UE may be configured to perform the PUR SS monitoring even in the case of skipping the PUR transmission, and when the indication information indicates '1', the UE may be configured not perform the PUR SS monitoring in the case of skipping the PUR transmission. The example is just one example, and it is natural that the method proposed in the present disclosure is not limited to the example.

The indication information may be included in a PUR configuration. That is, configuration information which the UE receives from the BS for the PUR transmission in the RRC connected state may include the indication information.

When the UE skips the PUR transmission because there is no UL data for the PUR transmission, since the UE skips the PUR transmission, a PUR skipping counter for PUR release may count the PUR skipping as a PUR skip event.

Alternatively, even though the UE skips the PUR transmission on the PUR resource, since the UE may receive a TA update or may be indicated with other operations from the BS/network through downlink reception in the PUR resource, the PUR skipping counter may not count the skipping of the PUR transmission as the PUR skip event. An operation in which the PUR skipping counter does not count the skipping of the PUR transmission as the PUR skip event may be applied only to a case where the UE successfully receives the MPDCCH through the PUR SS.

When the UE performs the monitoring for the PUR SS even though the PUR transmission is skipped, the (Proposal 1), i.e., a method for configuring the PUR SS monitoring based on the timer may operate as follows.
 (Proposal 1-1) The UE which skips the PUR transmission starts the timer at the same timing as a timer start timing in the case of performing the PUR transmission. Based on (Proposal 1-1), when the UE which skips the PUR transmission monitors the early ACK, the UE may monitor the early ACK at the same timing as the case of performing the PUR transmission.
 (Proposal 1-2) The UE which skips the PUR transmission starts the timer at a starting timing of the PUR resource related to the skipped PUR transmission. In the case of (Proposal 1-2), the UE early starts the time as compared with the time start timing in the case of performing the PUR transmission. In this case, the timer value may be separately configured so that an end timing of the PUR SS monitoring interval (duration) is advanced as the timer starts early. Alternatively, the timer value may be separately configured so that a timer end timing in the case of performing the PUR transmission and a timer end timing in the case of skipping the PUR transmission are the same as each other.

For example, the timer value in the case of skipping the PUR transmission may be configured so that the end timings of the PUR SS monitoring interval (duration)s in the case of performing the PUR transmission and in the case of skipping the PUR transmission are the same as each other or the PUR SS monitoring interval (duration) in the case of skipping the PUR transmission may be monitored to be shorter than the P UR SS monitoring interval (duration) in the case of performing the PUR transmission so as to minimize unnecessary power consumption when skipping the PUR transmission. For example, the PUR SS monitoring interval (duration) in the case of skipping the PUR transmission may be configured to include only one or two PUR SSs.

PUR SS Monitoring Method Based on Early ACK—(Method 2)

The method relates to a PUR SS monitoring method based on early ACK received for the PUR transmission of the UE. More specifically, the UE may perform the PUR transmission on the PUR resource (at the PUR transmission occasion on the PUR resource), and performs the monitoring for the PUR SS related to the PUR transmission. The UE may receive the early ACK of the BS for the PUR transmission through the monitoring for the PUR SS, and additional operations related to the monitoring for the PUR SS of the UE may be determined based on the received early ACK.

Hereinafter, specific operations related thereto will be described in detail.

PUR SS Monitoring Method for Supporting Early ACK

In the case of a UE supporting FD-FDD and TDD operations, in order to support the early ACK operation, the UE may perform MPDCCH monitoring for the entirety or a part of a PUR SS which starts (exists) after a predetermined interval (time offset) from a start point (e.g., a first MPDCCH transmission subframe in the case of MPDCCH repetition) of the PUR transmission not after the PUR transmission (after a timing of completing the PUR transmission).

More specifically, when the UE performs the MPDCCH monitoring for the entirety of the PUR SS, a timing after Y (>=0) subframes from the start point of the PUR transmission becomes a start point of the PUR SS window for monitoring the PUR SS. In this case, the UE may perform monitoring for all PUR SSs which exist after the start point.

Further, when the UE performs the MPDCCH monitoring for a part of the PUR SS, the UE may perform the monitoring for the MPDCCH from a specific timing within the PUR transmission interval. Here, the specific timing may be a timing corresponding to {¼, ½, ¾, 1} of the PUR transmission interval. That is, in this case, a start point in a case where the UE performs the MPDCCH monitoring for the entirety of the PUR SS and the start point of the PUR SS monitoring window may be the same as each other, and a point where the PUR SS is actually monitored within the PUR SS window may be a timing corresponding to {¼, ½, ¾, 1} the PUR transmission interval of the UE. For example, the UE may perform monitoring only a PUR SS which starts after Z (>=0) subframes from each point which becomes {¼, ½, ¾, 1} of the PUSCH transmission interval of the UE. For example, if a PUSCH repetition transmission number of the UE IS 256, the UE may monitor the PUR SS every time after performing repetition transmission at 64 times.

FIG. 33 is a diagram illustrating examples in which a PUR SS monitoring method for supporting an early ACK is performed.

FIG. 33(a) illustrates an example for a case where the UE performs the PUR SS monitoring for an entire PUR SS which exists after the start point of the PUR transmission. A PUR SS monitoring interval (window) 3300a may be defined at the start point of the PUR transmission of the UE, i.e., a timing which is as large as a predetermined offset K from a start point of a PUR transmission interval 3311a on a PUR resource 3310a. In this case, the UE may perform monitoring for the entire PUR SS included in the PUR SS monitoring interval 3300a.

FIG. 33(b) illustrates an example for a case where the UE performs the PUR SS monitoring for some of PUR SSs which exist after the start point of the PUR transmission. In this case, the PUR SS monitoring interval may be defined as the same timing as FIG. 33(a). In this case, the UE may perform monitoring an initial PUR SS which exists the predetermined time offset K from the start point of the PUR transmission of the UE, i.e., a specific timing of the PUR transmission interval on the PUR resource 3310b, and a PUR SS which exists after the initial PUR SS. The specific timing may be a timing corresponding to {¼, ½, ¾, 1} of the PUR transmission interval of the UE. In FIG. 33(b), the UE may perform the PUR SS monitoring for the initial PUR SS which exists after the predetermined time offset from the specific timing and subsequent PUR SSs 3322b and 3323b.

The contents described by referring to FIG. 33 above are just one example for helping understanding of the method provided in the present disclosure, and the methods provided in the present disclosure are not limited by the descried contents.

Operation of UE when Receiving Early ACK

When the UE receives the early ACK from the BS in the middle of performing the PUR transmission (i.e., during the PUR repetition transmission based on the PUR configuration), the UE may stop the PUR transmission and/or not perform additional PUR SS monitoring before the repetition transmission number of the PUR transmission reaches a repetition number which is configured or indicated in advance for the power saving. When it is expected that the UE does not perform the additional PUR SS monitoring, the UE may be in the RRC idle state or the RRC inactive state after receiving the early ACK.

Alternatively, when the BS/network may transmit, to the UE, information such as a PUR configuration update, higher layer ACK, etc., through the PDSCH, the UE may perform the additional PUR SS monitoring in order to receive information for the scheduling of the PDSCH. Whether the UE is to perform the additional PUR SS monitoring after receiving the early ACK (reception timing) may be determined according to the situation of the BS/network or the UE type. Further, whether the UE is to perform the additional PUR SS monitoring after receiving the early ACK (reception timing) may be determined according to indication information or configuration information which the BS transmits to the UE through the higher layer signaling.

When the UE is not expected to perform the additional PUR SS monitoring after receiving the early ACK, i.e., when the UE is configured not to perform the additional PUR SS monitoring after receiving the early ACK from the BS through the higher layer signaling, the UE may not perform the additional PUR monitoring after receiving the early ACK.

When the UE is expected to perform the additional PUR SS monitoring after receiving the early ACK, i.e., when the UE is configured to perform the additional PUR SS monitoring after receiving the early ACK from the BS through the higher layer signaling, information related to the early ACK may be implicitly indicated to the UE through whether the UE receives the DL assignment DCI. Alternatively, the DL assignment DCI may explicitly include information related to the ACK.

A method in which the ACK related information is included in the DL assignment DCI may be applied only case of performing additional PDSCH scheduling regardless of whether the BS/network successfully decodes the PUR transmission.

Further, when the UE is expected to perform the additional PUR SS monitoring after receiving the early ACK, a state or a field indicating to stop the PUR SS monitoring may be added to the DL or UL assignment DCI. The state or field indicating stopping the PUR SS monitoring is added within the DL or UL assignment DCI, and as a result, UE power consumption may be reduced.

FIG. 34 illustrates an example in which a UE receiving the early ACK performs an operation related to PUR SS monitoring.

The UE receives, from the BS, the indication information indicating whether to perform the additional PUR SS monitoring after receiving the early ACK through the higher layer signaling (S3410). Thereafter, the UE repeatedly performs the PUR transmission in a PUR transmission interval 3421 on a PUR resource 3420 (3421). The UE receives, from the BS, the early ACK for the PUR transmission in the middle of repeatedly performing the PUR transmission (3430).

In this case, when the indication information indicates not to perform the additional PUR SS monitoring after receiving the early ACK, the UE may not perform the additional PUR SS monitoring after receiving the early ACK.

On the contrary, when the indication information indicates to perform the additional PUR SS monitoring after receiving the early ACK, the UE may perform the additional PUR SS monitoring even after receiving the early ACK. In this case, the early ACK may be explicitly included in the DL assignment DCI, and transmitted. Alternatively, the DL assignment DCI may not explicitly include the information related to the early ACK, but the UE may recognize reception of the DL assignment DCI as early ACK reception.

Further, when the state or field indicating the stop of the additional PUR SS monitoring is included in the DL assignment DCI, and transmitted together with the early ACK, if the state or field indicating the stop of the additional PUR SS monitoring indicates the stop of the additional PUR SS monitoring, the UE may stop the additional PUR SS monitoring after receiving the DL assignment DCI (3430).

Alternatively, the DL assignment DCI may include only the information related to the early ACK. In this case, the state or field indicating the stoop of the additional PUR SS monitoring may be included in next DL assignment DCI or UL assignment DCI which the BS transmits after the DL assignment DCI, and the UE may also determine whether to stop the additional PUR SS monitoring based on the next DL assignment DCI or UL assignment DCI (3450). The contents described by referring to FIG. 34 above are just one example for helping understanding of the method provided in the present disclosure, and the methods provided in the present disclosure are not limited by the descried contents.

Method for Indicating PUR Configuration Update Through Early NACK

In order for the UE to be indicated with the PUR configuration update from the BS through the early NACK in the middle of performing the PUR transmission, the UE may perform the PUR SS monitoring for receiving early NACK at the same timing as the timing of monitoring the PUR SS in order to receive the early ACK. In this case, the BS/network a PUSCH dedicated demodulation reference signal (DM-RS) for UL channel estimation for determining whether to transmit the early NACK.

The early NACK may include explicit indication information for a purpose of indicating the UE to update the PUR configuration parameter by performing a legacy EDT/RACH procedure in addition to the PUR configuration update. The PUR configuration parameter may include a TA, etc.

When the BS/network determines that the early NACK and the resulting subsequent operation of the UE in the middle of receiving the PUR transmission of the UE, the BS/network may indicate the early NACK through a PUR SS defined before completion of the PUR transmission and the PUR SS monitoring interval o the UE.

The early NACK information may be indicated to the UE in the form of some bits or a specific state of the UL grant DCI. Further, the UL grant DCI including the early NACK may have a DCI size including only minimum information for reliability enhancement and/or low power consumption. In this case, the UL grant DCI including the early NACK may indicate to be updated, which includes the PUR configuration parameter, and may indicate to change all or some of PUR transmission parameters in the middle of the PUR transmission or at a subsequent specific timing. The specific timing may be a timing after a predetermined interval after the PUR SS for receiving the early NACK or a specific timing within the PUR transmission interval. When the specific timing is the specific timing within the PUR transmission interval, the specific timing may be a timing which becomes {¼, ½, ¾, 1} of the entire PUR transmission interval within the PUR transmission interval.

The PUR transmission parameter indicated to be updated may be UE Tx power adjustment. The parameter indicted to be updated may be applied to PUSCH (repetition) transmission after current PUR transmission is completed (e.g., next PUR). This method may be applied to a case to increase UE Tx power for coverage extension.

As another example, the PUR transmission parameter indicated to be updated may be a PUSCH repetition number. In this case, the PUSCH repetition number transmitted through the UL grant DCI may be a total PUSCH repetition number in the PUR transmission or a PUSCH repetition number to be additionally performed. That is, the PUSCH repetition number transmitted through the UL grant DCI indicates the PUSCH repetition number to be additionally performed, the current PUSCH repetition number is may be 10 and when a PUSCH repetition number requested for an update is 15, the PUSCH repetition number transmitted through the UL grant DCI may be 5.

When the PUSCH repetition number transmitted through the UL grant DCI is the total PUSCH repetition number in the PUR transmission, a value which is semi-statically configured or updated in the related art (before receiving the UL grant DCI) may be overridden to the PUSCH repetition number included in the UL grant DCI.

On the contrary, when the PUSCH repetition number transmitted through the UL grant DCI is the PUSCH repetition number to be additionally performed, the PUSCH repetition number transmitted through the UL grant DCI is added to a total PUSCH repetition number value which is semi-statically configured or updated in the related art (before receiving the UL grant DCI), and applied.

When the PUSCH repetition number increases, a specific timing to which all or some of the PUR transmission parameter(s) transmitted through the UL grant DCI are reflected may be a timing after the PUR repetition number of the UE reaches the PUSCH repetition number which is semi-statically configured or updated in the related art (before receiving the UL grant DCI). That is, all or some of the PUR transmission parameters transmitted through the UL grant DCI may be applied to PUSCH repetition transmission added through the UL grant DCI.

FIG. 35 is a diagram illustrating an example of a UE operation of performing PUR transmission by reflecting a PUR configuration update based on an early NACK.

In FIG. 35, the UE is in a state of being configured with the repetition number as 3 and configured with configuration values for parameters related to a PUR configuration for the PUR transmission in addition to the repetition number.

The UE performs the PUR repetition transmission in the PUR transmission interval twice (3520 to S530). Thereafter, the UE receives, from the BS, the UL grant DCI including the early NACK, and indicating the update of all or some of the parameters related to the PUR configuration (3540). The UL grant DCI includes a value for the PUSCH repetition number to be additionally performed, and the value corresponds to '2'. Next, the UE performs the PUR repetition transmission additionally at three times (3550 to 3570). In this case, the PUR configuration related parameters configured in the related art are applied to Repetition transmission #3 based on the repetition number configured in the related art, and parameters updated at a timing when Repetition transmission #4 is performed are applied to Repetition transmission #4 and Repetition transmission #5 added through the UL grant DCI. The described contents are just one example for helping understanding of the method provided in the present disclosure, and the methods provided in the present disclosure are not limited by the descried contents.

When the UE may expect reception of the DL assignment DCI in an interval of monitoring the early ACK in the middle of the PUR transmission, the BS/network may receive an uplink DMRS, etc., and determine that it is difficult to receive the PUR transmission of the UE based on the received DMRS. In this case, the BS/network may transmit a PDCCH order or an explicit indication for a similar purpose to the PDCCH command through the DL or UL assignment DCI.

The UE may stop the PUR transmission early based on the PDCCH order or the explicit indication and/or reacquire the TA by performing a contention-free or contention based random access procedure derived based on the PDCCH order or the explicit indication. In addition/alternatively, the UE may transmit data (i.e., data which may not be transmitted due to the stop of the PUR transmission) to be transmitted through the PUR through the legacy EDT/RACH procedure.

Determination of the BS for whether to transmit and receive the PUR transmission based on the DMRS may be an operation of deriving an uplink channel environment in which the PUR transmission of the UE is performed by measuring or estimating the TA with the DMRS while detecting only a part of the PUR transmission. The UE may consider a case of updating the PUR configuration parameter based on the PDCCH order or by the higher layer through the DL assignment DCI transmitted with the PUR SS for monitoring the early NACK.

When the UE supports both the method [(Proposal 1) of Method 1] indicating the stop of the PUR SS monitoring based on the timer after the PUR transmission and a method [Method 2] indicating the stop of the PUR SS monitoring based on the early ACK, the UE may operate based on one of two following operation methods.

(First operation) When the early ACK is not received, the UE operates based on the timer based method, i.e., whether to stop the PUR SS monitoring is determined based on the timer. Alternatively, when the early ACK is received, whether to stop the PUR SS monitoring is determined based on the early ACK regardless of the value of the timer.

(Second operation) the stop of the PUR SS monitoring is determined based on the timer regardless of whether to receive the early ACK. That is, the UE continuously performs the PUR SS monitoring until the PUR SS monitoring is stopped by the timer even after receiving the early ACK.

The first operation has an advantage in an aspect of power saving of the UE as compared with the second operation among the operations.

In the case of NB-IoT, since the UE does not perform downlink monitoring during a UL HARQ round trip time (RTT) timer interval, it may be difficult to apply the PUR SS monitoring method based on the early ACK to the UE of the NB-IoT. Accordingly, it may be preferable to apply the PUR SS monitoring method based on the early ACK only to LTE, LTE MTC, NR, etc., capable of DL monitoring of the UE during the UL HARQ RTT timer interval.

The early ACK or the early NACK may be supported even in the RRC connected state, and whether the early ACK or the early NACK is supported for PUR transmission in the RRC idle state may be configured apart from whether the early ACK or the early NACK is supported in the RRC connected state. For convenience of description, the RRC connected state and the RRC idle state is described as an example, but whether the early ACK or the early NACK for the RRC connected state and the RRC inactive state is supported may also be separately configured.

For a purpose of indicating, to, the UE, whether the early ACK or the early NACK is supported in the RRC idle state, the BS/network may make an explicit indication for notifying whether the early ACK or the early NACK is supported at the time of the PUR transmission in the RRC idle state, i.e., indication information be included in the parameter related to the PUR configuration. In other words, the PUR configuration information which the UE receives from the BS in the RRC connected state for the PUR transmission may include indication information indicating whether the early ACK or the early NACK is supported at the time of the PUR transmission in the RRC idle state.

When the BS/network determines that it is not necessary to support the early ACK or the early NACK in the RRC idle state, the BS/network may configure whether the early ACK or the early NACK for the PUR transmission in the RRC idle state is supported differently from the RRC connected state. In other words, the BS/network may configure the early ACK or the early NACK to be supported only in the RRC connected state.

For example, a case where the BS/network determines that it is not necessary to support the early ACK or the early NACK in the RRC idle state may be (i) a case where the UE determines that the additional PUR SS monitoring is to be difficult in the middle of the PUR transmission in the RRC idle state by considering a capability of the UE supporting the early ACK or the early NACK in the RRC connected state, (ii) a case of determining that an early ACK or NACK generation possibility is low in a PUR transmission situation in the RRC idle state of the UE, and as a result, the corresponding operation is not required, etc. In such a case, even though the BS/network supports the early ACK or the early NACK to the UE in the RRC connected state, the BS/network may not support the early ACK or the early NACK in the PUR transmission of the UE in the RRC idle state.

Apart from whether the early ACK or the early NACK is configured may be determined based on the determination of the BS/network, the UE may separately report whether to support the early ACK or the early NACK in the PUR transmission in the RRC idle state to the BS/network apart from the RRC connected state. The UE may perform reporting related to whether to support the early ACK or the early NACK in the form of UE capability information. A reason for separately configuring whether to support the early ACK or the early NACK in the RRC connected state and whether to support the early ACK or the early NACK in the RRC idle state may be similar to the reason in the case of the BS/network.

Further, the case where the BS/network separately configures whether to support the early ACK or the early NACK in the RRC connected state and whether to support the early ACK or the early NACK in the RRC idle state may be based on the separate configuration of the UE. That is, the BS/network may determine whether to support the early ACK or the early NACK at the time of the PUR transmission in the RRC idle state for the UE by referring to whether to support the early ACK or the early NACK at the time of the PUR transmission in the RRC idle state of the UE. The BS/network may refer to whether to support the early ACK or the early NACK at the time of the PUR transmission in the RRC idle state of the UE based on the capability information of the UE.

When there is no configuration for whether to support the early ACK or the early NACK for the PUR transmission in the RRC idle state, the BS/network and the UE may refer to the configuration for whether to support the early ACK or the early NACK in the RRC connected state (as a default configuration).

When the UE receives the early ACK or the early NACK through the DCI, the UE may stop the PUR transmission after X subframes from a subframe receiving the DCI or stop the PUR SS monitoring. The X may have a value such as 4, etc.

Further, in the case of the PUR SS monitoring, when the UE receives the early ACK or the early NACK through the DCI, the UE may stop the PUR SS monitoring immediately after receiving the DCI. For example, when the early ACK or the early NACK DCI is received through the MPDCCH which is repeatedly transmitted, a timing of stopping the PUR transmission or the PUR SS monitoring may be defined as follows.

Upon receiving an early ACK or early NACK DCI ending in subframe n, the UE shall stop the ongoing PUR transmission and/or monitoring PUR SS no later than in subframe n+X, with X=4.

PUR Search Space Collision Avoiding Method—(Method 3)

The PUR SS for monitoring the MPDCCH related to the PUR transmission, etc., may collide with the MPDCCH (SS) or PDSCH which is not related to the PUR transmission. The collision may mean a case where the PUR SS partially or wholly overlaps with the MPDCCH (SS) or the PDSCH which is not related to the PUR transmission in the time and/or frequency domain. Alternatively, the collision may mean a case where the PUR SS exists in a different narrow band (NB) at the same timing as the MPDCCH (SS) or the PDSCH which is not related to the PUR transmission in the time and/or frequency domain.

For example, the PUR SS may collide with PDSCH carrying SIB1-BR in which SIB1-BR is transmitted (PDSCH carrying SIB1-BR), SI messages, or paging messages. Further, the PUR SS may collide with Type1-common search space (CSS) for paging.

As such, when the PUR SS collides with the MPDCCH not related to the PUR transmission, the UE may operate based on methods proposed below in order to avoid the collision.

(Proposal 1) Method for Skipping Monitoring for PUS SS in which Collision Occurs The UE may skip monitoring for a specific PUR SS which collides with the MPDCCH not related to the PUR transmission. In particular, the method described in the proposal may be preferably applied to a case where the PUR SS collides with the Type1-CSS and/or a case where the PUR SS collides with the SI messages.

More specifically, a case where there is a plurality of PUR SSs in the PUR SS monitoring interval or the PUR SS window, and the collision occurs in at least one specific PUR SS among the plurality of PUR SSs may be assumed. In this case, the UE may skip monitoring for the at least one specific PUR SS, and acquire (early) ACK information through the PUR SS after the at least one specific PUR SS. That is, the MPDCC in which the early (ACK) may be transmitted through the PUR SS after the at least one specific PUR SS which does not collide with the MPDCCH not related to the PUR.

In this case, the end timing of the PUR SS monitoring interval or the PUR SS window may be extended. More specifically, the end timing of the PUR SS monitoring interval or the PUR SS window may be extended as large as the number of skipped PUR SSs or as long as a time corresponding to the number of skipped PUR SSs due to the collision.

When the UE does not receive the (early) ACK in the PUR SS monitoring interval (or PUR SS window), the UE may operate similarly to a case of receiving no feedback for the PUR transmission after the PUR transmission. As an example, in the case where the UE receives no feedback for the PUR transmission after the PUR transmission, the UE may regard (recognize) the reception of no feedback for the PUR transmission as ACK or NACK.

(Proposal 2) Method for Skipping PUR Transmission Related to PUS SS in which Collision Occurs When the PUR SS corresponding to the PUR transmission collides with the MPDCCH not related to the PUR transmission, the UE may skip or drop the PUR transmission itself. In particular, the method described in the proposal may be preferably applied only to a case where the UE may previously know whether the PUR SS collides with the MPDCCH before the PUR transmission.

Unlike the case where the UE skips the PUR transmission as corresponding to a situation in which it is impossible for the BS/network to receive the PUR transmission, the PUR skip counter for the PUR release may not count the skipping of the PUR transmission as the skipping event in the case where the UE skips the PUR transmission in order to avoid the collision of the PUR SS. That is, in this case, even though the UE skips the PUR transmission, a value of the PUR skip counter is not changed.

SIB1-BR is transmitted without repetition in consecutive subframes(s) at a predetermined period. Accordingly, the SIB1-BR may be punctured for MPDCCH repetition. In this case, the PUR SS or MPDCCH transmission subframe may be skipped or dropped, or postponed. In this case, if the PUR SS monitoring interval is defined based on the timer, the timer may be counted regardless of the drop or postpone of the PUR SS or MPDCCH transmission subframe.

On the contrary, the SI messages and the Type1-CSS may be repeated at a similar level as the MPDCCH in the LTE MTC. Accordingly, it is possible to access the SI messages and the Type1-CSS in terms of overlap or collision, and the UE may operate based on the methods of (Proposal 1) and (Proposal 2) for the collision between the SI messages and the Type1-CSS, and the PUR SS.

FIG. 36 is a diagram illustrating an example of an operation implemented in a UE performing a method for monitoring a search space (SS) through a preconfigured uplink resource (PUR) in a wireless communication system proposed in the present disclosure.

More specifically, in order to perform the method for monitoring the search space (SS) through the preconfigured uplink resource (PUR) in the wireless communication system, the UE receives, from the BS, PUR configuration information related to a repetition number of uplink signal transmission based on the PUR in a radio resource control (RRC) connected state (S3610).

Next, the UE is transitioned to a specific state for a PUR operation in the RRC connected state (S3620).

In this case, the specific state may be one of an RRC idle state or an RRC inactive state.

Thereafter, the UE transmits, to the BS, an uplink signal on a first resource of the PUR based on the repetition number (S3630).

Next, the UE performs monitoring for a PUR SS after a predetermined time offset from a transmission timing of the uplink signal (S3640).

Here, the monitoring may be performed for (i) all of the PUR SSs or (ii) some of the PUR SSs.

Further, when the monitoring is performed for some of the PUR SSs, the monitoring may be performed after the predetermined time offset from a specific timing within a transmission interval in which the transmission of the uplink signal is performed.

Thereafter, the UE receives, from the BS, an early acknowledgement (ACK) for the uplink (S3650).

In this case, an operation of receiving the early ACK from the BS may further include an operation of receiving, from the BS, downlink control information (DCI) for scheduling a physical downlink shared channel (PDSCH) for an update of a PUR configuration based on the PUR configuration information and/or higher layer ACK transmission. Here, information related to the early ACK may be implicitly indicated based on whether the UE receives the DCI.

Further, when the BS is configured to schedule the physical downlink shared channel (PDSCH) for the update of the PUR configuration based on the PUR configuration information and/or the higher layer ACK transmission regardless of whether the BS receives the uplink signal, the operation of receiving the early ACK from the BS may further include an operation of receiving, from the BS, the downlink control information (DCI) for scheduling the PDSCH. In this case, the DCI may explicitly include the information related to the early ACK.

Further, the DCI may further include may further include indication information related to whether to stop the additional monitoring, and whether to stop the additional monitoring may be determined based on the indication information.

Last, the UE stops the transmission of the uplink signal before a transmission number of the uplink signal reaches the repetition number based on the reception of the early ACK (S3660).

Additionally, before step S3610, between steps S3610 to S3660 or after step S3660, the UE may receive, from the BS, configuration information for whether to perform the additional monitoring for the PUR SS after the timing of receiving the early ACK.

Hereinafter, when the configuration information indicates not to perform the additional monitoring, the additional monitoring may not be performed after the time of receiving the early ACK.

Further, when the configuration information indicates to perform the additional monitoring, the additional monitoring may be performed after the timing of receiving the early ACK.

Further, additionally, before step S3610, between steps S3610 to S3660 or after step S3660, the UE may receive, from the BS, an early negative ACK (NACK) indicating the update of the PUR configuration based on the PUR configuration information on a specific PUR SS before a transmission completion timing of the uplink signal.

Here, some or all of at least one PUR parameter related to the PUR configuration may be updated based on the update of the PUR configuration.

In this case, the operation of receiving the early NACK from the BS may further include an operation of receiving downlink control information (DCI) for scheduling a physical uplink shared channel (PUSCH). Here, the DCI may include the information related to the early NACK and indication information indicating performing of a random access channel (RACH) procedure for an update of a timing advance (TA) related to an uplink transmission timing.

Further, when both a first monitoring step scheme based on a timer for stopping the PUR SS monitoring and a second monitoring stop scheme based on the early ACK are supported, if the early ACK is not received, whether to stop the monitoring may be determined based on only the first monitoring stop scheme and if the early ACK is received, whether to stop the monitoring may be determined based on only the second monitoring step scheme.

Further, whether the early ACK and the early NACK are supported in the specific state may be configured apart from whether the early ACK and the early NACK are supported in the RRC connected state, and the PUR configuration information may further include specific information related to whether the early ACK and the early NACK are supported at the time of the PUR operation in the specific state.

Here, when whether the early ACK and the early NACK are supported is not separately configured in the specific state, whether the early ACK and the early NACK are supported in the specific state may be determined based on whether the early ACK and the early NACK are supported in the RRC connected state.

FIG. 37 is a diagram illustrating an example of an operation implemented in a BS performing a method for monitoring a search space (SS) through a preconfigured uplink resource (PUR) in a wireless communication system proposed in the present disclosure.

More specifically, in order to perform the method for monitoring the search space (SS) through the preconfigured uplink resource (PUR) in the wireless communication system, the BS transmits, to the UE, PUR configuration information related to a repetition number of uplink signal transmission based on the PUR in a radio resource control (RRC) connected state (S3710).

Next, the BS receives an uplink signal transmitted based on the repetition number on the first resource of the PUR from the UE which is transitioned to a specific state for a PUR operation from the RRC connected state (S3720).

Thereafter, the BS transmits, to the UE, early ACK on a PUR SS which starts after a predetermined time offset from the timing of transmitting the uplink signal (S3730).

Here, the reception of the uplink signal is stopped before a transmission number of the uplink signal reaches the repetition number based on the transmission of the early ACK.

Additionally, the methods proposed in the present disclosure may be performed by an apparatus including one or more memories and one or more processors functionally connected to the one or more memories.

More specifically, in the apparatus including one or more memories and one or more processors functionally connected to the one or more memories, the one or more processors control the apparatus to receive, from a base station, PUR configuration information related to a repetition number of uplink signal transmission based on the PUR, in an RRC connected state.

Thereafter, the processors control the apparatus to transition from the RRC connected state to a specific state for a PUR operation.

Next, the processors control the apparatus to transmit, to the base station, an uplink signal on a first resource of the PUR based on the repetition number.

Next, the processors control the apparatus to monitor a PUR SS after a specific time offset from a transmission timing of the uplink signal.

Thereafter, the processors control the apparatus to receive, from the base station, an early acknowledgment (early ACK) for the uplink signal.

Last, the processors control the apparatus to stop, based on a reception of the early ACK, transmission of the uplink signal before a number of transmissions of the uplink signal reaches the repetition number.

Further, the methods proposed in the present disclosure may be performed by one or more instructions executed by one or more processors, which are stored in a non-transitory computer readable medium (CRM) storing one or more instructions.

More specifically, in the non-transitory computer readable medium (CRM) storing one or more instructions, the one or more instructions executable by the one or more processors causes a user equipment to receive, from a base station, PUR configuration information related to a repetition number of uplink signal transmission based on the PUR, in an RRC connected state.

Thereafter, the CRM causes the UE to transition from the RRC connected state to a specific state for a PUR operation.

Next, the CRM causes the UE to transmit, to the base station, an uplink signal on a first resource of the PUR based on the repetition number.

Next, the CRM causes the UE to monitor a PUR SS after a specific time offset from a transmission timing of the uplink signal.

Thereafter, the CRM causes the UE to receive, from the base station, an early acknowledgment (early ACK) for the uplink signal.

Last, the CRM causes the UE to stop, based on a reception of the early ACK, transmission of the uplink signal before a number of transmissions of the uplink signal reaches the repetition number.

Discontinuous Reception (DRX) Operation

Discontinuous Reception (DRX) means an operation mode of allowing the UE to reduce battery consumption so as for the UE to discontinuously receive a downlink channel. In other words, a UE in which the DRX is configured discontinuously receives a DL signal to reduce power consumption. A DRX operation is performed in a DRX cycle representing a time interval in which On Duration is periodically repeated and the DRX cycle includes the On Duration and a slip interval (alternatively, Occasion for DRX). The On Duration represents a time interval which the UE monitors in order to receive the PDCCH. The DRX may be performed in a Radio Resource Control (RRC)_IDLE state (or mode), an RRC_INACTIVE state (or mode), and an RRC_CONNECTED state (or mode). In the RRC_IDLE state and the RRC_INACTIVE state, the DRX is used for discontinuously receiving a paging signal.

- RRC_Idle state: State in which a wireless connection (RRC connection) is not configured between the base station and the UE.
- RRC Inactive state: State in which the wireless connection (RRC connection) is configured between the base station and the UE, but the wireless connection is inactivated.
- RRC_Connected state: State in which the wireless connection (RRC connection) is configured between the base station and the UE.

The DRX is generally divided into Idle mode DRX, Connected DRX(C-DRX), and extended DRX, and DRX applied in the IDLE state is referred to as Idle mode DRX and DRX applied in the CONNECTED state is referred to as Connected mode DRX (C-DRX).

Extended/enhanced DRX (eDRX) as a mechanism capable of extending cycles of Idle mode DRX and C-DRX may be primarily used for application of (massive) IoT. Whether the eDRX is permitted in the Idle mode DRX may be configured by system information (e.g., SIB1). The SIB1 may include an eDRX-Allowed parameter and the eDRX-Allowed parameter is a parameter representing whether Idle mode extended DRX is permitted.

Idle Mode DRX

In the Idle mode, the UE may use the DRX in order to reduce the power consumption. One paging occasion (PO) is a subframe in which Paging-Radio Network Temporary Identifier (P-RNTI) may be transmitted on PDCCH, MPDCCH, or NPDCCH of addressing a paging message for NB-IoT. In the P-RNTI transmitted on the MPDCCH, the PO represents a start subframe of MPDCCH repetition. In the case of the P-RNTI transmitted on the NPDCCH, the PO indicates a start subframe of NPDCCH repetition when a subframe determined by the PO is not a valid NB-IoT downlink subframe. Then, a first valid NB-IoT downlink subframe after the PO is a start subframe of NPDCCH repetition.

One paging frame (PF) is one radio frame which may include one or multiple paging occasions. When the DRX is used, the UE needs to monitor only one PO per DRX cycle. One paging narrowband (PNB) is one narrowband in which the UE receives the paging message. The PF, the PO, and the PNB may be determined based on the DRX parameters provided in the system information.

FIG. 38 is a flowchart showing an example of a method of performing an Idle mode DRX operation.

The UE receives Idle mode DRX configuration information from the base station through higher layer signaling (e.g., system information) (S2410).

In addition, the UE determines a Paging Frame (PF) for monitoring a physical downlink control channel (e.g., PDCCH) in a DRX cycle and a Paging Occasion (PO) in the PF based on the Idle mode DRX configuration information (S2420). Here, the DRX cycle includes On duration and a sleep interval (alternatively, Occasion for DRX).

In addition, the UE monitors the PDCCH in the PO of the determined PF (S2430). The UE monitors only one subframe (PO) per paging DRX cycle.

Additionally, when the UE receives a PDCCH scrambled by P-RNTI for On duration (i.e., when detecting paging), the UE transitions to a connected mode to transmit and receive data to and from the base station.

FIG. 39 is a diagram illustrating an example of an Idle mode DRX operation.

Referring to FIG. 39, when traffic destined for a UE in an RRC_Idle state (hereinafter, referred to as an 'Idle state') occurs, paging occurs to the corresponding UE. The UE wakes up periodically, i.e., every (paging) DRX cycle and monitors the PDCCH. When there is the paging, the UE transitions to a Connected state and receives data and when there is no paging, the UE enters a sleep mode again.

Connected Mode DRX (C-DRX)

C-DRX may be DRX applied in an RRC Connected state and a DRX cycle of the C-DRX may be constituted by a Short DRX cycle and/or a Long DRX cycle. The Short DRX cycle is optional. When the C-DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring PDCCH, the UE enters a sleep state after the On Duration ends. When the C-DRX is configured, a PDCCH reception occasion (e.g., a slot having a PDCCH search space) may be discontinuously configured according to the C-DRX configuration. On the contrary, when the C-DRX is not configured, the PDCCH reception occasion (e.g., the slot having the PDCCH search space) may be continuously configured. Meanwhile, regardless of whether the C-DRX is configured, PDCCH monitoring may be limited in a time interval configured as a measurement gap.

FIG. 40 is a flowchart showing an example of a method of performing a C-DRX operation.

The UE receives from the eNB RRC signaling (e.g., MAC-MainConfig IE) including DRX configuration information (S2610). The DRX configuration information may include the following information.

- onDurationTimer: The number of PDCCH subframes to be continuously monitored a start part of the DRX cycle
- drx-InactivityTimer: The number of PDCCH subframes to be continuously monitored when the UE decodes PDCCH having scheduling information
- drx-RetransmissionTimer: The number of PDCCH subframes to be continuously monitored when HARQ retransmission is predicted
- longDRX-Cycle: On Duration occurrence cycle
- drxStartOffset: subframe number in which the DRX cycle starts
- drxShortCycleTimer: The number of times of short DRX cycle
- shortDRX-Cycle: DRX cycle which operates at the number of times of drxShortCycleTimer when Drx-InactivityTimer is terminated In addition, when DRX 'ON' is configured through a DRX command of MAC command element (CE) (S2620), the UE monitors the PDCCH for ON duration of the DRX cycle based on the DRX configuration (S2630).

FIG. 41 is a diagram illustrating an example of a C-DRX operation.

Referring to FIG. 41, when the UE receives scheduling information (e.g., DL Grant) in an RRC_Connected state (hereinafter, referred to as Connected state), the UE drives a DRX inactivity timer and an RRC inactivity timer.

When the DRX inactivity timer expires, a DRX mode starts and the UE wakes up at the DRX cycle and monitors the PDCCH for a predetermined time (on duration timer). Here, when Short DRX is configured, the UE starts with a short DRX cycle when starting the DRX mode and when the short DRX cycle ends, the UE enters a long DRX cycle. The long DRX cycle is a multiple of the short DRX cycle and the UE wakes up more frequently in the short DRX cycle. When the RRC inactivity timer expires, the UE transitions to the Idle state and performs the Idle mode DRX operation.

IA/RA+DRX Operation

FIG. 42 is a diagram illustrating an example of power consumption depending on a state of a UE.

Referring to FIG. 42, after power on, the UE performs Boot Up for application loading, an initial access/random access procedure for synchronizing downlink and uplink with the base station, a registration procedure with the network, etc., and current (or power consumption) consumed while performing each procedure is illustrated in FIG. 42. When the transmission power of the UE is high, current consumption of the UE increases. In addition, when there is no traffic transmitted to the UE or to be transmitted to the base station, the UE transitions to the Idle mode and performs the Idle mode DRX operation. In addition, when paging (e.g., call occurrence) occurs during the Idle mode DRX operation, the UE transitions to the Connected mode to the Idle mode through a cell establishment procedure and transmits and receives data to and from the base station. In addition, when there is no data which the UE transmits and receives to and from the base station in the connected mode for a specific time or at a configured time, the UE performs the connected DRX (C-DRX) operation.

In addition, when the extended DRX (eDRX) is configured through the higher layer signaling (e.g., system information), the UE may perform the eDRX operation in the Idle mode or Connected mode.

Example of Communication System to which Present Disclosure is Applied

Although not limited thereto, but various descriptions, functions, procedures, proposals, methods, and/or operation flowcharts of the present disclosure, which are disclosed in the present disclosure may be applied to various fields requiring wireless communications/connections (e.g., LTE, 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 43 illustrates communication system 10000 applied to the present disclosure.

Referring to 43, communication system 10000 applied to the present disclosure includes a wireless device, a base station, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 10000*a*, vehicles 10000*b*-1 and 10000*b*-2, an eXtended Reality (XR) device 10000*c*, a hand-held device 10000*d*, a home appliance 10000*e*, an Internet of Thing (IoT) device 10000*f*, and an AI device/server 40000. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even the wireless device and a specific wireless device 20000*a* may operate a base station/network node for another wireless device.

The wireless devices 10000*a* to 10000*f* may be connected to a network 30000 through a base station 20000. An artificial intelligence (AI) technology may be applied to the wireless devices 10000*a* to 10000*f* and the wireless devices 10000*a* to 10000*f* may be connected to an AI server 40000 through the network 30000. The network 30000 may be configured by using a 3G network, a 4G (e.g., LTE) network, or a 5G (e.g., NR) network. The wireless devices 10000*a* to 10000*f* may communicate with each other through the base station 20000/network 30000, but may directly communicate with each other without going through the base station/network (sidelink communication). For example, the vehicles 10000*b*-1 and 10000*b*-2 may perform direct communication (e.g., Vehicle to Vehicle (V2V)/Vehicle to everything (V2X) communication). Furthermore, the IoT device (e.g., sensor) may perform direct communication with other IoT devices (e.g., sensor) or other wireless devices 10000*a* to 10000.

Wireless communications/connections 15000*a*, 15000*b*, and 15000*c* may be made between the wireless devices 10000*a* to 10000*f*/the base station 20000 and between the base station 20000 and the base station 20000. Here, the wireless communication/connection may be made through various wireless access technologies (e.g., 5G NR) such as uplink/downlink communication 15000*a*, sidelink communication 15000*b* (or D2D communication), and inter-base station communication 15000*c* (e.g., relay, Integrated Access Backhaul (IAB)). The wireless device and the base station/the wireless device and the base station and the base station may transmit/receive radio signals to/from each other through wireless communications/connections 15000*a*, 15000*b*, and 15000*c*. For example, the wireless communications/connections 15000*a*, 15000*b*, and 15000*c* may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

FIG. 44 illustrates a wireless device applicable to the present disclosure.

Referring to FIG. 44, a first wireless device 32100 and a second wireless device 32200 may transmit/receive radio signals through various wireless access technologies (e.g., LTE and NR). Here, the first wireless device 32100 and the second wireless device 32200 may correspond to a wireless device 10000*x* and a base station 20000 and/or a wireless device 10000*x* and a wireless device 10000*x* of FIG. 43.

The first wireless device 32100 may include one or more processors 32120 and one or more memories 32140 and additionally further include one or more transceivers 32160 and/or one or more antennas 32180. The processor 32120 may control the memory 32140 and/or the transceiver 32160 and may be configured to implement descriptions, functions, procedures, proposals, methods, and/or operation flows disclosed in the present disclosure. For example, The processor 32120 may process information in the memory 32140 and generate a first information/signal and then transmit a radio signal including the first information/signal through the transceiver 32160. Furthermore, The processor 32120 may receive a radio signal including a second information/signal through the transceiver 32160 and then store in the memory 32140 information obtained from signal processing of the second information/signal. The memory 32140 may connected to The processor 32120 and store various information related to an operation of The processor 32120. For example, the memory 32140 may store a software code including instructions for performing some or all of processes controlled by The processor 32120 or performing the descriptions, functions, procedures, proposals, methods, and/or operation flowcharts disclosed in the present disclosure. Here, The processor 32120 and the memory 32140 may be a part of a communication modem/circuit/chip designated to implement the wireless communication technology (e.g., LTE and NR). The transceiver 32160 may be connected to The processor 32120 and may transmit and/or receive the radio signals through one or more antennas 32180. The transceiver 32160 may include a transmitter and/or a receiver. The transceiver 32160 may be used mixedly with a radio frequency (RF) unit. In the present disclosure, the wireless device may mean the communication modem/circuit/chip.

The second wireless device 32200 may include one or more processors 32220 and one or more memories 32240 and additionally further include one or more transceivers 32260 and/or one or more antennas 32280. The processor 32220 may control the memory 32240 and/or the transceiver 32260 and may be configured to implement descriptions, functions, procedures, proposals, methods, and/or operation flows disclosed in the present disclosure. For example, The processor 32220 may process information in the memory 32240 and generate a third information/signal and then transmit a radio signal including the third information/signal through the transceiver 32260. Furthermore, The processor 32220 may receive a radio signal including a fourth information/signal through the transceiver 32260 and then store in the memory 32240 information obtained from signal processing of the fourth information/signal. The memory 32240 may connected to The processor 32220 and store various information related to an operation of The processor 32220. For example, the memory 32240 may store a software code including instructions for performing some or all of processes controlled by The processor 32220 or performing the descriptions, functions, procedures, proposals, methods, and/or operation flowcharts disclosed in the present disclosure. Here, The processor 32220 and the memory 32240 may be a part of a communication modem/circuit/chip designated to implement the wireless communication technology (e.g., LTE and NR). The transceiver 32260 may be connected to The processor 32220 and may transmit and/or receive the radio signals through one or more antennas 32280. The transceiver 32260 may include a transmitter and/or a receiver. The transceiver 32260 may be used mixedly with a radio frequency (RF) unit. In the present disclosure, the wireless device may mean the communication modem/circuit/chip.

Hereinafter, hardware elements of the wireless devices 32100 and 32200 will be described in more detail. Although not limited thereto, one or more protocol layers may be implemented by one or more processors 32120 and 32220. For example, one or more processors 32120 and 32220 may implement one or more layers (e.g., functional layers such as PHY, MAC, RLC, PDCP, RRC, and SDAP). One or more processors 32120 and 32220 may generate one or more protocol data units (PDUs) and/or one or more service data units (SDUs) according to the descriptions, functions, procedures, proposals, methods, and/or operation flowcharts disclosed in the present disclosure. One or more processors 32120 and 32220 may generate a message, control information, data, or information according to the descriptions, functions, procedures, proposals, methods, and/or operation flowcharts disclosed in the present disclosure. One or more processors 32120 and 32220 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 32160 and 32260. One or more processors 32120 and 32220 may receive the signal (e.g., baseband signal) from one or more transceivers 32160 and 32260 and acquire the PDU, the SDU, the message, the control information, the data, or the information according to the descriptions, functions, procedures, proposals, methods, and/or operation flowcharts disclosed in the present disclosure.

One or more processors 32120 and 32220 may be referred to as a controller, a microcontroller, a microprocessor, or a microcomputer. One or more processors 32120 and 32220 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 32120 and 32220. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 32120 and 32220 or stored in one or more memories 32140 and 32240 and driven by one or more processors 32120 and 32220. The descriptions, functions, procedures, proposals, and/or operation flowcharts disclosed in the present disclosure may be implemented by using firmware or software in the form of a code, the instruction and/or a set form of the instruction.

One or more memories 32140 and 32240 may be connected to one or more processors 32120 and 32220 and may store various types of data, signals, messages, information, programs, codes, instructions, and/or commands. One or more memories 32140 and 32240 may be configured by a ROM, a RAM, an EPROM, a flash memory, a hard drive, a register, a cache memory, a computer reading storage medium, and/or a combination thereof. One or more memories 32140 and 32240 may be positioned inside and/or outside one or more processors 32120 and 32220. Furthermore, one or more memories 32140 and 32240 may be connected to one or more processors 32120 and 32220 through various technologies such as wired or wireless connection.

One or more transceivers 32160 and 32260 may transmit to one or more other devices user data, control information, a wireless signal/channel, etc., mentioned in the methods and/or operation flowcharts of the present disclosure. One or more transceivers 32160 and 32260 may receive from one or more other devices user data, control information, a wireless signal/channel, etc., mentioned in the descriptions, functions, procedures, proposals, methods, and/or operation flowcharts disclosed in the present disclosure. For example, one or more transceivers 32160 and 32260 may be connected to one or more processors 32120 and 32220 and transmit and receive the radio signals. For example, one or more processors 32120 and 32220 may control one or more transceivers 32160 and 32260 to transmit the user data, the control information, or the radio signal to one or more other devices. Furthermore, one or more processors 32120 and 32220 may control one or more transceivers 32160 and 32260 to receive the user data, the control information, or the radio signal from one or more other devices. Furthermore, one or more transceivers 32160 and 32260 may be connected to one or more antennas 32180 and 2208 and one or more transceivers 32160 and 32260 may be configured to transmit and receive the user data, control information, wireless signal/channel, etc., mentioned in the descriptions, functions, procedures, proposals, methods, and/or operation flowcharts disclosed in the present disclosure through one or more antennas 32180 and 2208. In the present disclosure one or more antennas may be a plurality of physical antennas or a plurality of logical antennas (e.g., antenna ports). One or more transceivers 32160 and 32260 may convert the received radio signal/channel from an RF band signal to a baseband signal in order to process the received user data, control information, radio signal/channel, etc., by using one or more processors 32120 and 32220. One or more transceivers 32160 and 32260 may convert the user data, control information, radio signal/channel, etc., processed by using one or more processors 32120 and 32220, from the baseband signal into the RF band signal. To this end, one or more transceivers 32160 and 32260 may include an (analog) oscillator and/or filter.

Utilization Example of Wireless Device to which Present Disclosure is Applied

FIG. 45 illustrates another example of a wireless device applied to the present disclosure. The wireless device may be implemented as various types according to a use example/service (see FIG. 43).

Referring to FIG. 45, wireless devices 4601 and 4602 may correspond to the wireless devices 32100 and 32200 of FIG. 44 and may be constituted by various elements, components, units, and/or modules. For example, the wireless devices 4601 and 4602 may include a communication unit 4610, a control unit 4620, and a memory unit 4630, and an additional element 4640. The communication unit may include a communication circuit 4612 and a transceiver(s) 4614. For example, the communication circuit 4612 may include one or more processors 32120 and/or one or more memories 32140, 32240 of FIG. 44. For example, the transceiver(s) 4614 may include one or more transceivers 32160 and 32260 and/or one or more antennas 32180 and 32280 of FIG. 44. The control unit 4620 is electrically connected to the communication unit 4610, the memory unit 4630, and the additional element 4640 and controls an overall operation of the wireless device. For example, the control unit 4620 may an electrical/mechanical operation of the wireless device based on a program/code/instruction/information stored in the memory unit 4630. Furthermore, the control unit 4620 may transmit the information stored in the memory unit 4630 to the outside (e.g., other communication devices) through the communication unit 4610 via a wireless/wired interface or store, in the memory unit 4630, information received from the outside (e.g., other communication devices) through the wireless/wired interface through the communication unit 4610.

The additional element 4640 may be variously configured according to the type of wireless device. For example, the additional element 4640 may include at least one of a power unit/battery, an input/output (I/O) unit, a driving unit, and a computing unit. Although not limited thereto, the wireless device may be implemented as a form such as the robot 10000a of FIG. 43, the vehicles 10000b-1 and 10000b-2 of FIG. 43, the XR device 10000c of FIG. 43, the hand-held device 10000d of FIG. 43, the home appliance 10000e of FIG. 43, the IoT device 10000f of FIG. 43, a digital broadcasting terminal, a hologram device, a public safety device, an MTC device, a medical device, a fintech device (or financial device), a security device, a climate/environment device, an AI server/device 40000 of FIG. 43, the base station 20000 of FIG. 43, a network node, etc. The wireless device may be movable or may be used at a fixed place according to a use example/service.

In FIG. 45, all of various elements, components, units, and/or modules in the wireless devices 4601 and 4602 may be interconnected through the wired interface or at least may be wirelessly connected through the communication unit 4610. For example, the control unit 4620 and the communication unit 4610 in the wireless devices 3210 and 3220 may be wiredly connected and the control unit 3320 and the first unit (e.g., 3330 or 3340) may be wirelessly connected through the communication unit 3310. Further, each element, component, unit, and/or module in the wireless devices 32100 and 32200 may further include one or more elements. For example, the control unit 4620 may be constituted by one or more processor sets. For example, the control unit 4620 may be configured a set of a communication control processor, an application processor, an electronic control unit (ECU), a graphic processing processor, a memory control processor, etc. As another example, the memory 4630 may be configured as a random access memory (RAM), a dynamic RAM (DRAM), a read only memory (ROM), a flash memory, a volatile memory, a non-volatile memory, and/or combinations thereof.

Example of XR Device to which Present Disclosure is Applied

FIG. 46 illustrates an XR device applied to the present disclosure. The XR device may be implemented as an HMD, a head-up display (HUD) provided in the vehicle, a television, a smartphone, a computer, a wearable device, a home appliance device, a digital signage, a vehicle, a robot, etc.

Referring to FIG. 46, an XR device 10000c may include a communication unit 4610, a control unit 4620, a memory unit 4630, an input/output unit 4640a, a sensor unit 4640b, and a power supply unit 4640c. Here, the blocks 4610 to 4630/4640a to 4640c correspond to the blocks 4610 to 4630/4640 of FIG. 45, respectively.

The communication unit 4610 may transmit/receive a signal (e.g., media data, a control signal, etc.) to/from external devices such as other wireless devices, hand-held devices, or media servers. The media data may include a video, an image, a sound, etc. The control unit 4620 may perform various operations by controlling components of the XR device 10000c. For example, the control unit 4620 may be configured to control and/or perform procedures such as video/image acquisition, (video/image) encoding, metadata generation and processing, etc. The memory unit 4630 may store data/parameters/programs/codes/instructions required for driving the XR device 10000c/generating the XR object. The input/output unit 4640a may output control information, data, etc., from the outside and output the generated XR object. The input/output unit 4640a may include a camera, a microphone, a user input unit, a display unit, a speaker, and/or a haptic module. The sensor unit 4640b may obtain an XR device state, surrounding environmental information, user information, etc. The sensor unit 4640b may include a proximity sensor, an illuminance sensor, an acceleration sensor, a magnetic sensor, a gyro sensor, an inertia sensor, an RGB sensor, an IR sensor, a fingerprint sensor, an ultrasonic sensor, an optical sensor, a microphone, and/or a radar. The power supply unit 4640c may supply power to the XR device 10000a and include a wired/wireless charging circuit, a battery, and the like.

As an example, the memory unit 4630 of the XR device 10000c may include information (e.g., data) required for generating the XR object (e.g., AR/VR/MR object). The input/output unit 4640a may acquire a command for operating the XR device 10000c a from the user and the control unit 2120 may drive the XR device 10000a according to a driving command of the user. For example, when the user intends to watch a movie, news, etc., through the XR device 10000c, the control unit 4620 may transmit contents request information to another device (e.g., hand-held device 10000d) or the media server through the communication unit 4630. The communication unit 4630 may download/stream contents such as the movie, the news, etc., to the memory unit 4630, from another device (e.g., hand-held device 10000d) or the media server. The control unit 4620 may perform control and/or perform the procedures such as video/image acquisition, (video/image) encoding, metadata generation/processing, etc., for contents and generate/output the XR object based on a surrounding space or a reality object acquired through the input/output unit 4640a/the sensor unit 4640b.

Further, the XR device 10000c may be wirelessly connected to the hand-held device 10000d through the communication unit 4610 and the operation of the XR device 10000c may be controlled by the hand-held device 10000d. For example, the hand-held device 10000d may operate as a controller for the XR device 10000c. To this end, the XR device 10000c may acquire 3D positional information of the hand-held device 10000d and then generate and output the XR object corresponding to the hand-held device 10000d.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The method for monitoring the search space through the preconfigured uplink resource according to the present disclosure is described based on an example in which the method is applied to the 3GPP LTE/NR system, but may be applied to various wireless communication systems in addition to the 3GPP LTE/NR system.

The invention claimed is:

1. A method performed by a user equipment in a wireless communication system, the method comprising:
receiving, from a base station, preconfigured uplink resource (PUR) configuration information;
performing uplink transmission using PUR, based on the PUR configuration information; and
monitoring a Physical Downlink Control Channel (PDCCH) related to the uplink transmission using PUR in a PUR search space (SS) window which is based on a timer,
wherein based on receiving downlink control information (DCI) including an uplink grant for a retransmission of the uplink transmission using PUR, based on monitoring the PDCCH related to the uplink transmission using PUR, the timer is restarted.

2. The method of claim 1,
wherein a duration of the PUR SS window is determined based on the timer.

3. The method of claim 2,
wherein the PUR configuration information includes information on the timer.

4. The method of claim 3,
wherein the information on the timer includes a value of the timer.

5. The method of claim 4,
wherein the PUR SS window starts after a specific time offset from a last subframe of subframes related to the uplink transmission using PUR.

6. The method of claim 5,
wherein the value of the timer is configured based on a coverage enhancement mode of the user equipment.

7. The method of claim 1,
wherein the monitoring the PDCCH is performed on a SS which is related to at least one of (i) an uplink grant or (ii) feedback information on the uplink transmission using PUR.

8. The method of claim 7,
wherein, based on the timer which expires based on the feedback information being not received, the uplink transmission using PUR is determined to be failed.

9. The method of claim 7,
wherein, based on only a part of a specific SS being included in the PUR SS window, monitoring on the specific SS is not performed.

10. The method of claim 7,
wherein, based on only a part of a specific SS being included in the PUR SS window, monitoring on the specific SS is performed.

11. A user equipment configured to operate in a wireless communication system, the user equipment comprising:
a transmitter for transmitting a radio signal;
a receiver for receiving a radio signal; and
a processor operatively coupled to the transmitter and the receiver,
wherein the processor is configured to perform operations comprising:
receiving, from a base station, preconfigured uplink resource (PUR) configuration information;
performing uplink transmission using PUR, based on the PUR configuration information; and
monitoring a Physical Downlink Control Channel (PDCCH) related to the uplink transmission using PUR in a PUR search space (SS) window which is based on a timer,
wherein based on receiving downlink control information (DCI) including an uplink grant for a retransmission of the uplink transmission using PUR, based on monitoring the PDCCH related to the uplink transmission using PUR, the timer is restarted.

12. An apparatus comprising one or more memories and one or more processors operatively coupled to the one or more memories, wherein the one or more processors control the apparatus to:
receive, from a base station, preconfigured uplink resource (PUR) configuration information;
perform uplink transmission using PUR, based on the PUR configuration information; and
monitor a Physical Downlink Control Channel (PDCCH) related to the uplink transmission using PUR in a PUR search space (SS) window which is based on a timer,
wherein based on receiving downlink control information (DCI) including an uplink grant for a retransmission of the uplink transmission using PUR, based on monitoring the PDCCH related to the uplink transmission using PUR, the timer is restarted.

13. A base station configured to operate in a wireless communication system, the base station comprising:
a transmitter for transmitting a radio signal;
a receiver for receiving a radio signal; and
a processor operatively coupled to the transmitter and the receiver,
wherein the processor is configured to perform operations comprising:
transmitting, to a user equipment, preconfigured uplink resource (PUR) configuration information;
receiving, from the user equipment, uplink transmission using PUR, based on the PUR configuration information,
wherein a Physical Downlink Control Channel (PDCCH) related to the uplink transmission using PUR is monitored, by the user equipment, in a PUR search space (SS) window which is based on a timer,
wherein based on downlink control information (DCI) including an uplink grant for a retransmission of the uplink transmission using PUR being received by the user equipment based on monitoring the PDCCH related to the uplink transmission using PUR, the timer is restarted.

\* \* \* \* \*